United States Patent [19]

Oshima et al.

[11] Patent Number: 4,638,362
[45] Date of Patent: Jan. 20, 1987

[54] SOLID-STATE IMAGE PICKUP DEVICE

[75] Inventors: Mitsuaki Oshima, Moriguchi; Kazufumi Yamaguchi, Yao, both of Japan

[73] Assignee: Matsushita Electric Industrial Co., Ltd., Osaka, Japan

[21] Appl. No.: 687,426

[22] Filed: Dec. 28, 1984

[30] Foreign Application Priority Data

Dec. 28, 1983 [JP] Japan .................. 58-250930

[51] Int. Cl.⁴ .............................................. H04N 3/14
[52] U.S. Cl. ..................................... 358/213; 357/24
[58] Field of Search ................. 358/212, 213, 224; 357/24 LR

[56] References Cited

U.S. PATENT DOCUMENTS 4,432,014  2/1984  Roos ............................ 358/224
4,527,201  7/1985  Cappels ........................ 358/224
4,539,598  9/1985  Dietrich ....................... 358/213

Primary Examiner—Gene Z. Rubinson
Assistant Examiner—L. C. Schroeder
Attorney, Agent, or Firm—Wenderoth, Lind & Ponack

[57] ABSTRACT

A solid-state image pickup device has photo-sensitive picture elements arranged in a matrix to convert light containing picture element information into electrical charges. A horizontal charge transfer element and a vertical charge transfer element respectively transfer electrical charges corresponding to individual picture elements in a horizontal and vertical direction. At least one of the vertical charge transfer elements and horizontal charge transfer elements is controlled in response to external control signals so that a part of the electrical charges corresponding to individual picture elements in a specified part of the photosensitive picture elements are outputted as picture element output signals.

12 Claims, 40 Drawing Figures

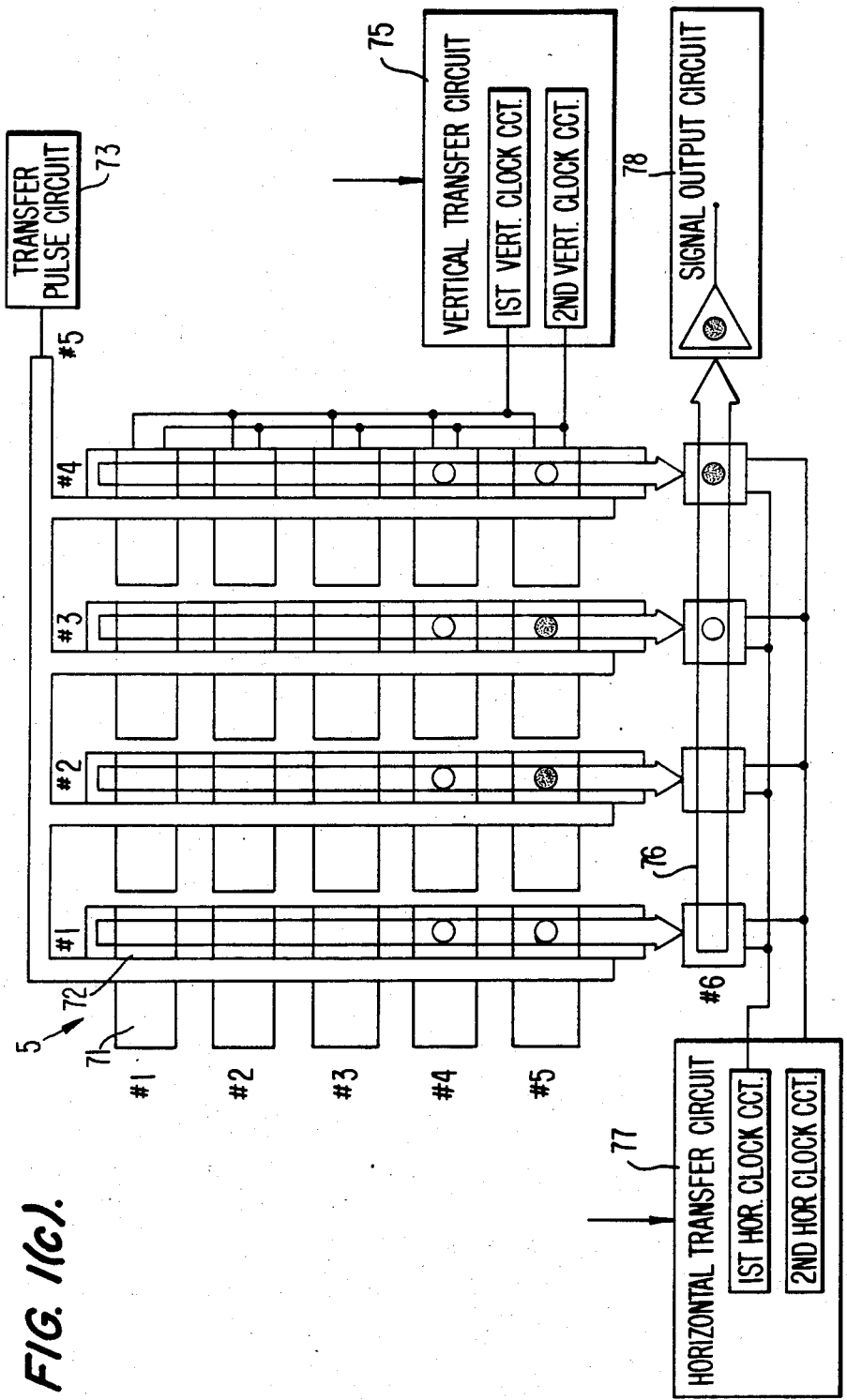

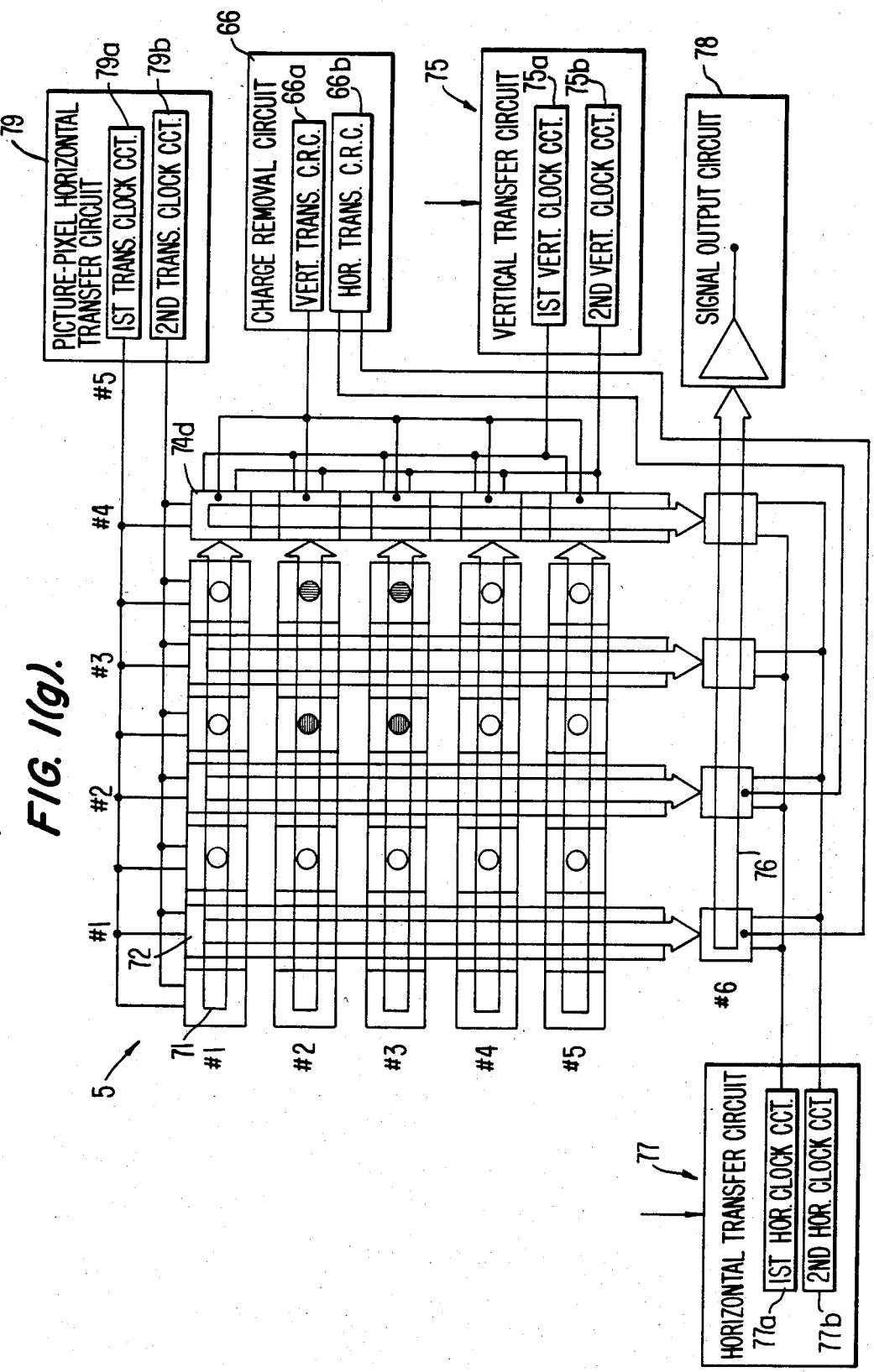

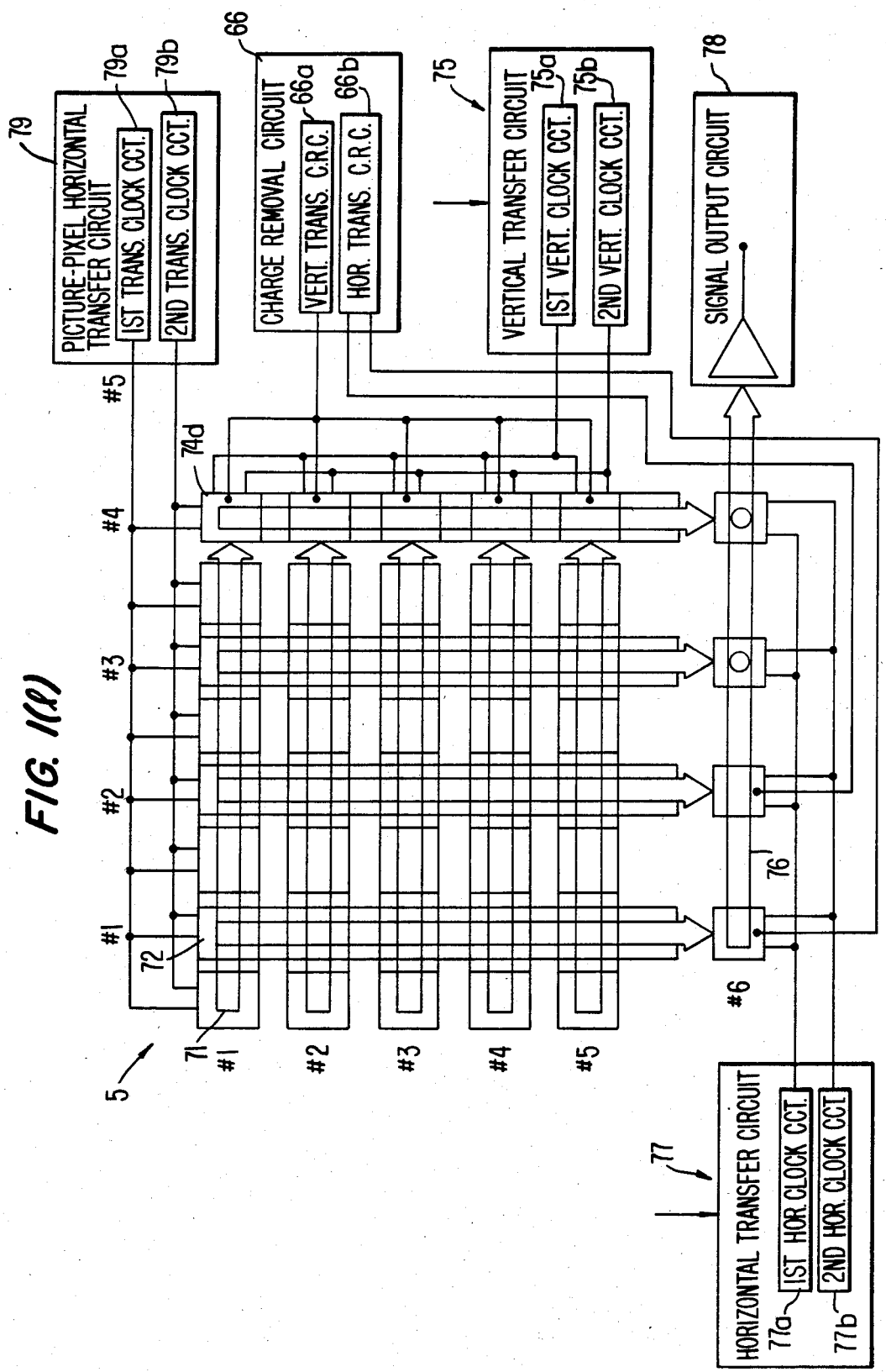
FIG. 1(ℓ)

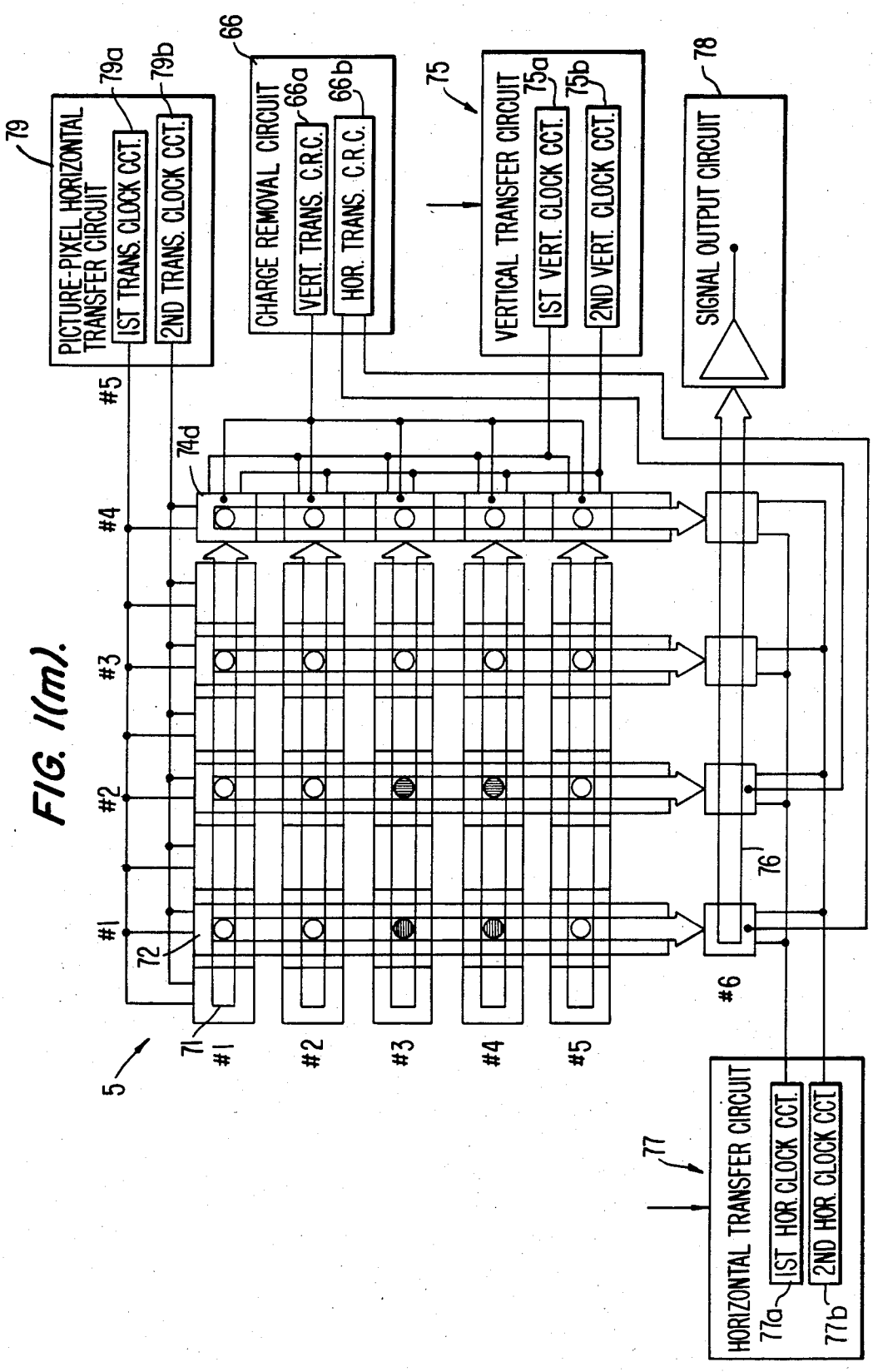

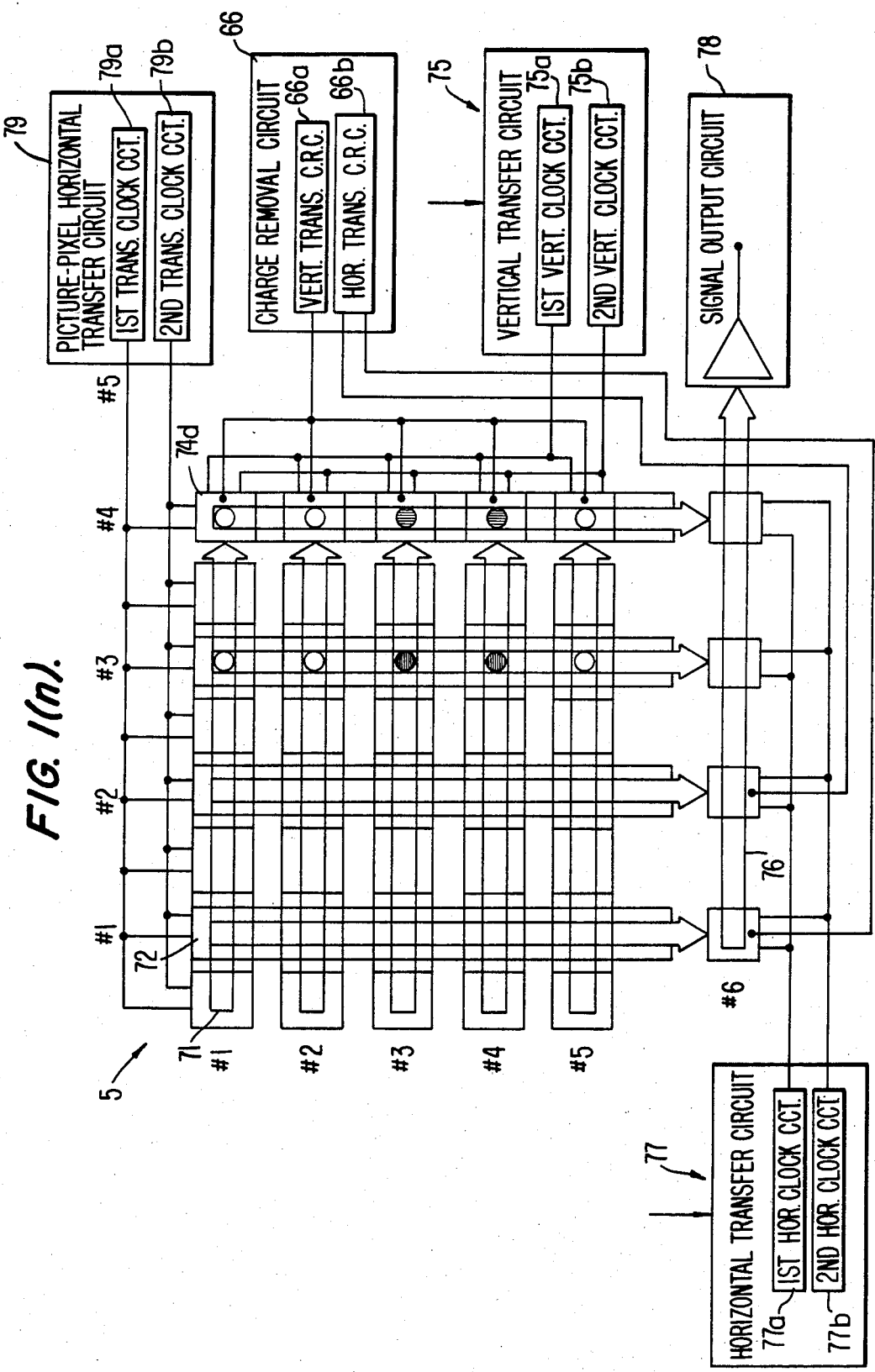

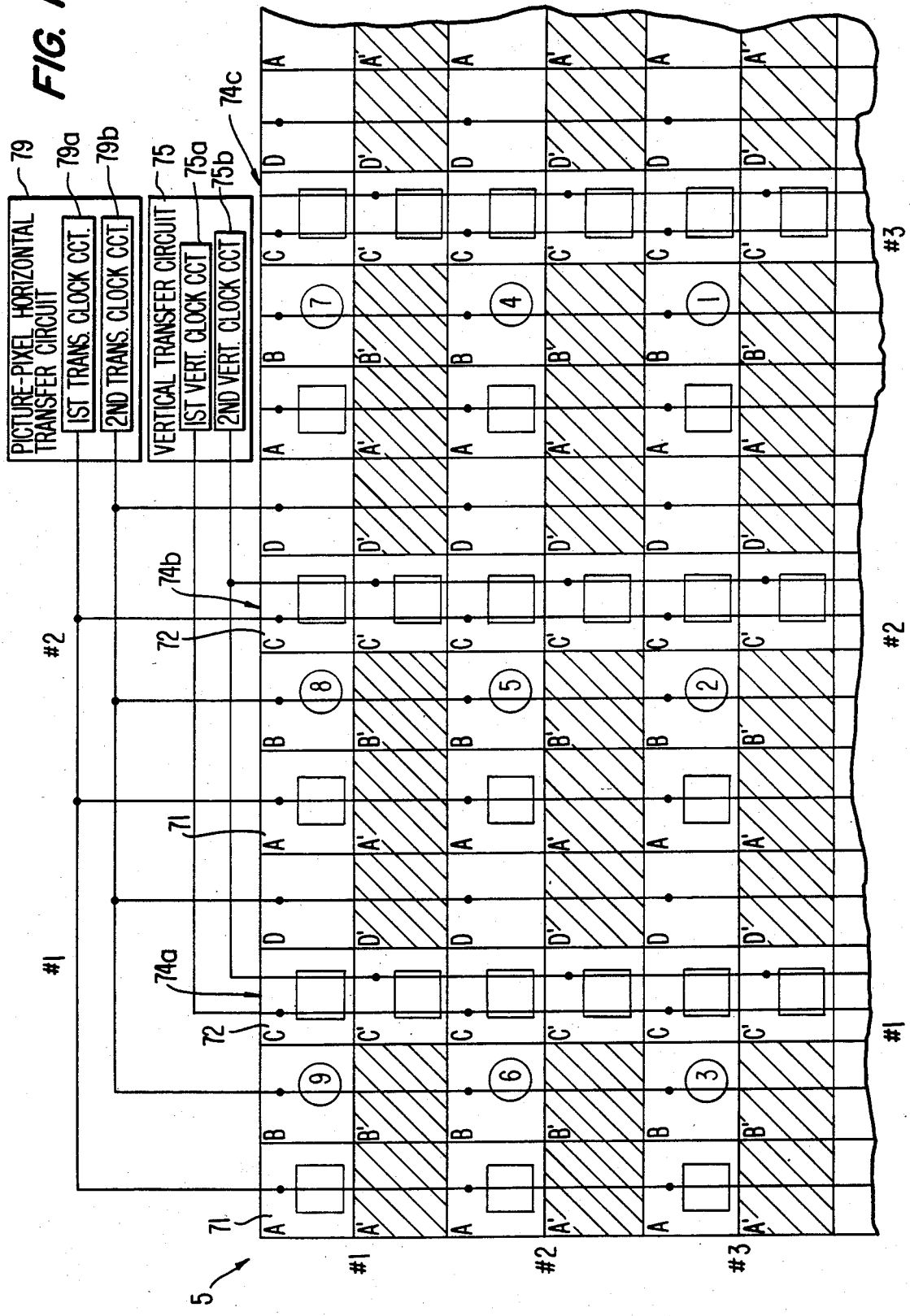

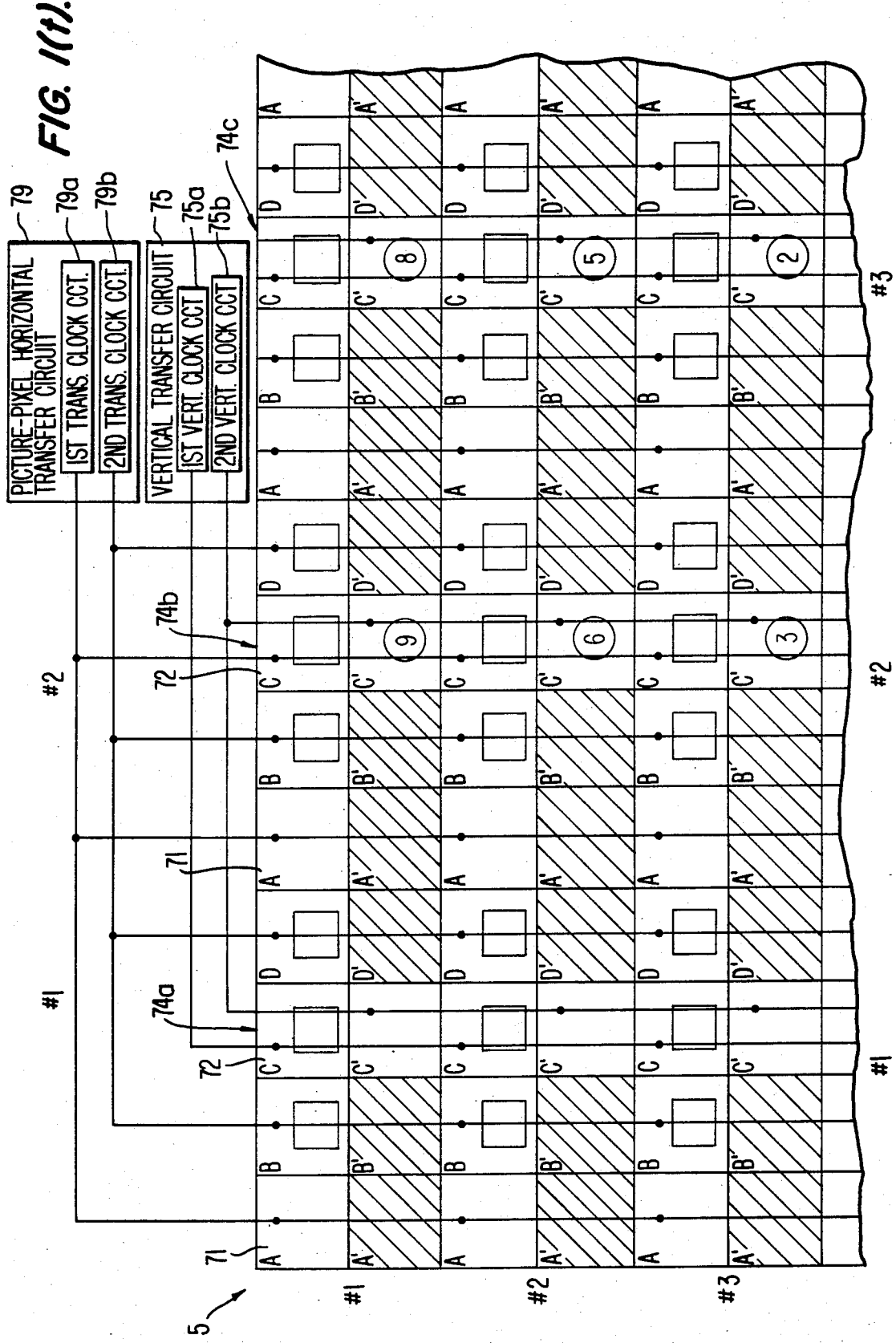

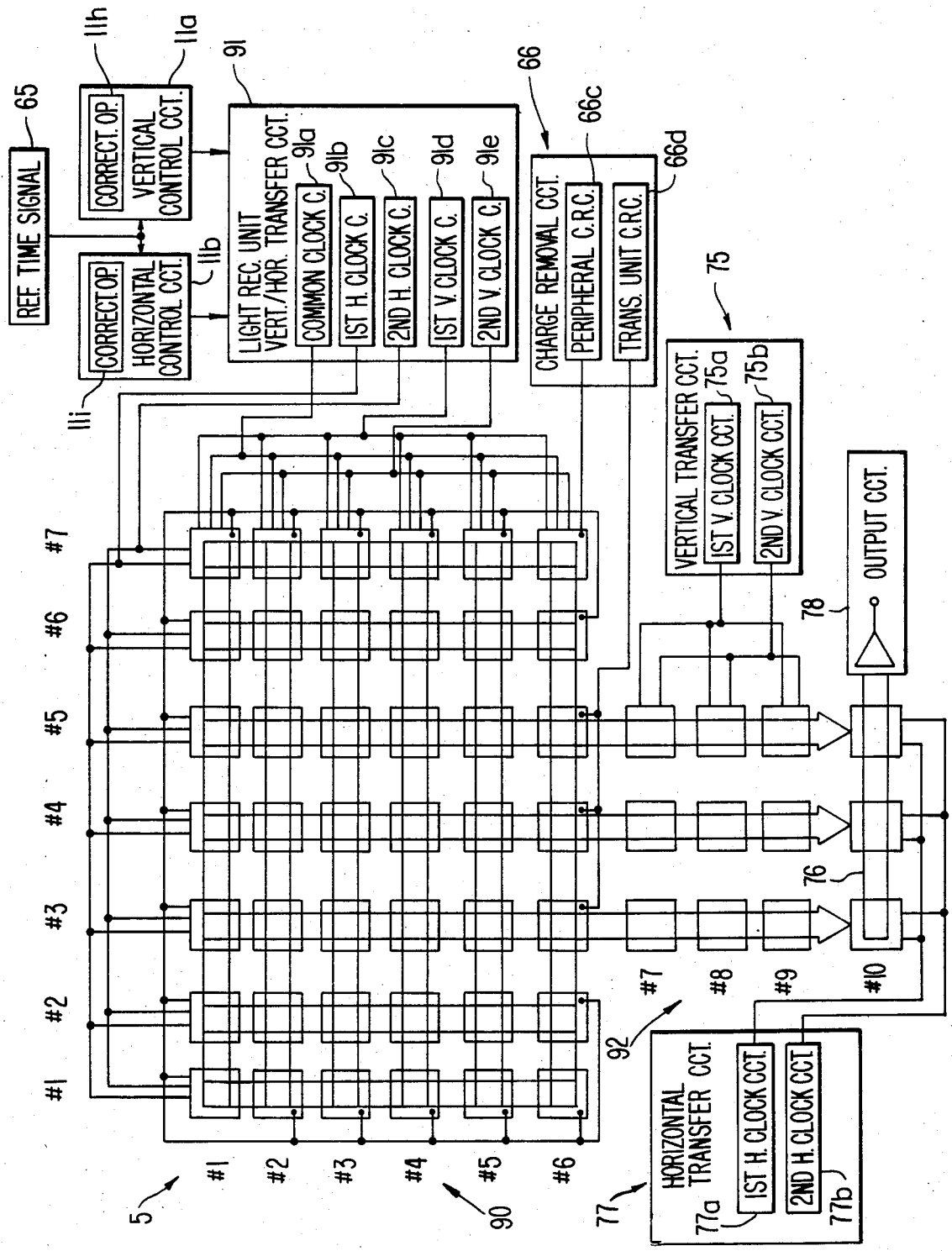

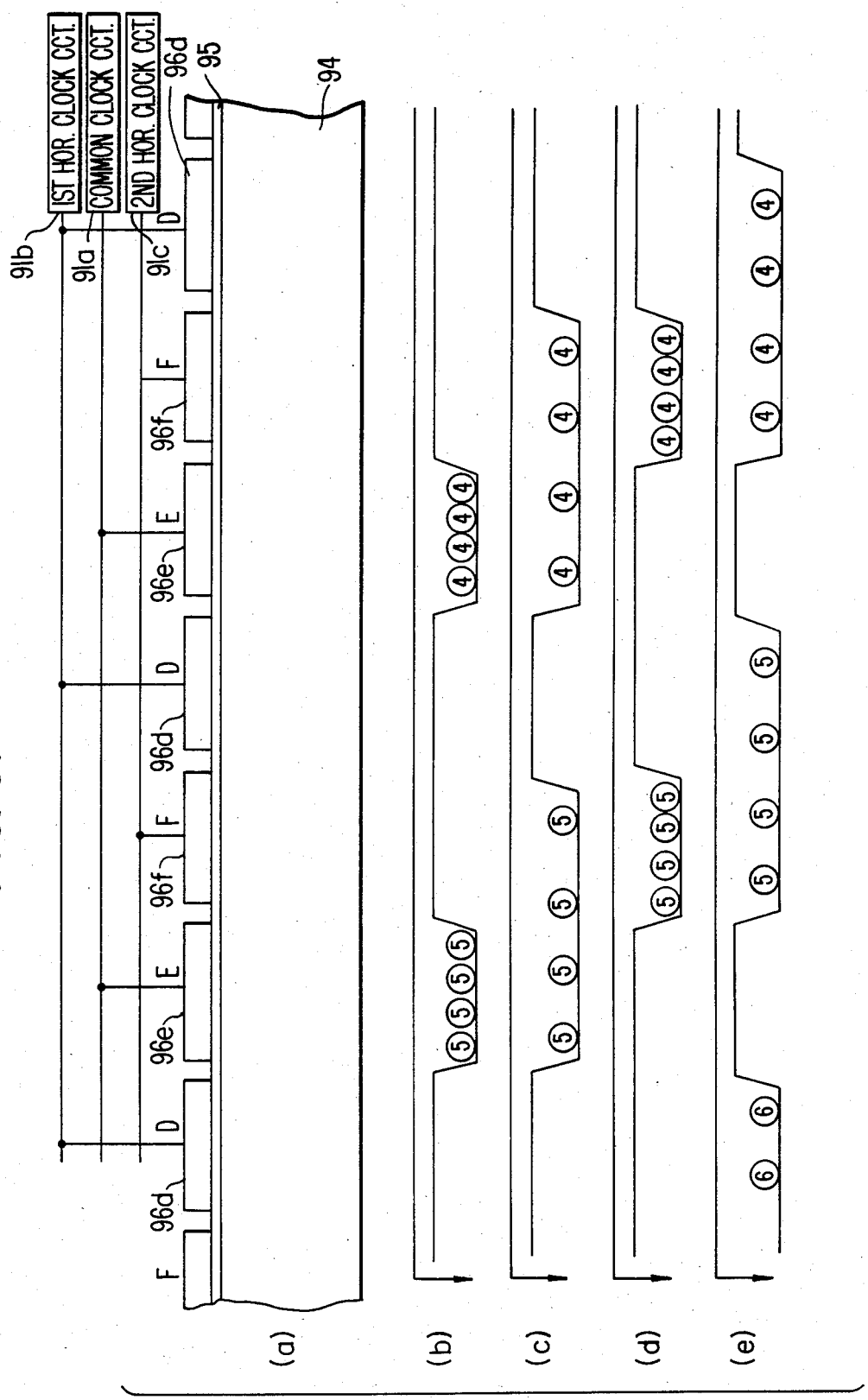

SOLID-STATE IMAGE PICKUP DEVICE

BACKGROUND OF THE INVENTION

1. Field of the Invention

This invention relates to a solid-state image pickup device (or a solid-state image sensor) used as a two-dimensional image sensor in object recognition devices, image information input devices, video cameras, and electronic still cameras, for both home and industrial uses.

2. Description of the Prior Art

As the result of progress in electronic technology, many of the electronic appliances introduced recently are provided with highly intelligent functions which make them practically independent systems, irrespective of whether they are intended for household or industrial applications. Generally, the systems minimally comprise input units, processor units, and output units, most also being equipped with converters at their input units to transform received external information into corresponding electrical signals. More specifically, the systems need sensors which can see, hear, taste, smell and feel by discerning objects as humans do with their five senses and converting the obtained physical and chemical information into corresponding electrical signals. And just as eyes are considered the most important of the human senses, visual sensors, in particular two-dimensional image sensors, which can take over part of the functions of human eyes, come first in the order of importance of all the sensors. To date, various types of two-dimensional image sensors have been developed. With the marked progress in the latest semiconductor technology, solid state two-dimensional image sensors utilizing semiconductors have appeared on the market. Especially noteworthy among them are those using the charge-coupled devices (hereafter called CCD's) which have contributed greatly to the technical developments in this field, finding wide application in both home and industry.

As a natural trend of the times, image pickup tubes (camera tubes), which now constitute the main stay in two-dimensional image sensors, are gradually being replaced by the new solid-state types. It is anticipated that solid-state image sensors will become dominant in the future, excepting special limited applications of image pickup tubes.

Moreover, the recent technical innovations in information processing and electronic circuitry techniques have opened up still newer fields of application for two-dimensional sensors. Example industrial applications can be seen in the object recognition devices used in robots and other automation equipment, in character recognition OA (office automation) devices of the automatic reading of processing parcels and in image information input devices which can take in at a glance full page contents of drafting paper.

In the home electronics category, the compact size and lightweight features of CCD and other new solid-state devices have expanded their use as image pickup elements in portable video cameras. In addition, these devices are now under review for use in burglar alarm systems as external monitors for interphones, making use of their advantages of such as compactness, long life, and less susceptibility to seizing.

It should be noted, however, that the greater the number of new applications for these solid-state image pickup devices, uses not conceived for conventional devices, the greater the probability of their failure to meet such new requirements in any of the many ramifications of such applications, if the new image pickup devices cannot be refined through improvement.

Some symptoms are beginning to surface in some of the new fields of application of such solid-state type image pickup devices, in view of the new requirements for them.

The first problem is that conventional solid state image pickup elements can only output picture element image information within a certain limited area of the overall image information receiving area. Although this has not yet become as a critical problem, it is well foreseen that future demand will require the ability to extract image information within any desired area of the overall receiving area of the solid-state image pickup device, in response to external control signals. In the following paragraphs, the situation calling for this function will be described.

In connection with the initial requirement for solid-state image pickup elements for industrial application, it goes without saying that the image recognition technique will become one of the very important techniques, for example, in robots and other intelligent equipment and appliances to be developed in future.

To obtain better object perception, objects to be perceived must be brought to and maintained at certain specific positions, as at the center of the screen, for instance; as a prerequisite, the objects must be within the area of the screen. To achieve this, it is sufficient to control the orientation of the image pickup unit or the direction of the optical axis in the direction of the centerline of the object, either mechanically or optico-mechanically. However, because of problems with conventional mechanical control systems, such as reduced reliability due to a greater likelihood of moving part failure and mechanical limitations on frequency response performance, in addition to limitations as to size, weight and power consumption, a purely electronic control method is to be used to obtain accurately directed pictures of the objects to be perceived, with the moving parts control system in present use functioning only as a supplemental control for rough positioning in the general direction of the object. Thus we foresee keen demand for image pickup devices capable of selectively picking up only the image within the area of the target objects covered on the screen in the current image pickup direction, selectively and purely electronically in response to external control signals. At the present stage, however, such needs have not yet been clarified as explicit requirements, as only limited aspects of this problem have been solved, by such techniques as tentatively storing image information in solid-state memory for later processing, without direct processing within the image pickup devices. Accordingly, there has not been much technical development with regard to outputting images within any desired area, in particular by using solid-state image pickup devices. As a result, there have been no established techniques in this regard upon which to draw.

Besides in application for object recognition in robots, this problem is becoming evident as well with character recognition OA devices for reading papers, as demand increases for random readout by electronic means, calling for output of the image information within unspecified partial areas, within the overall information provided on the screen, without mechanical movements of chart paper and/or image pickup optical systems.

Now, as to how the first requirement mentioned above poses a problem vis-a-vis solid-state image pickup devices used in home electronics products. One of the most familiar examples is the TV monitor unit used in homes or supermarkets for security purposes, in which mechanical means are employed to expand the range of surveillance by reciprocating motion at small amplitudes. In such installations, electronic control of image pickup ranges is better than the current system of changing the image pickup ranges mechanically, but such a function is not provided in conventional solid-state image pickup devices.

In recent years, video cameras have been diffused among general consumers at a quick pace. In these video cameras for home use as well, image pickup can always be precisely focused on target objects if image pickup range can be properly corrected. The mechanical realization of such correction is very difficult in view of the weight, volume and cost limitations for home-use video camera products which have been made compact (e.g., only 1 kg max.) and low in cost. Also, a mechanical control system is not in line with the general trend toward still more compact products, falling short as well of the demands of general users. Thus we foresee a probable keen demand for new image pickup devices that will permit purely electronic internal image correction, a feature not available with conventional image pickup devices.

The second problem in connection with the new requirements is that clear still images of targets cannot be obtained if either the target objects or the image pickup devices are to move around in actual use. If the solid-state image pickup devices used have very short exposure time or a comparable ultrahigh speed shutter function, as is the case with still cameras, clear still images may be obtained for all fields or frames, throughout the image pickup operation, at the intended high degree of resolution. With a method relying on conventional image pickup devices, however, which have a slow shutter speed equivalent to the unit field, or 1/60 second, degraded still image resolution is inevitable due to the picture drift accompanying the movement of the target or the image pickup device, as mentioned above. As a matter of course, the faster the movement, the more extreme the resultant degradation in resolution. As a countermeasure to this problem, a method has been proposed in which electric charges are intentionally removed during the light receiving period to shorten it. Although equivalent to increasing the shutter speed, this method has the natural consequence of reducing the sensitivity in an inverse proportion to the shutter speed. Thus, it is contrary to the general trend of development aiming at higher sensitivity and at meeting user demand, and suggests the serious problems that may be posed if it is adapted for industrial and home electronics uses.

Now, let us see in more detail how this second problem affects conventional solid-state image pickup devices used in industrial applications. When object perception is intended with movable robots and the like, a problem is posed at the stage of initial image input. In ordinary object perception technique, not an animated picture of the object but at least one clear still picture of the object is necessary, and it is common practice to perceive the object by processing such image information. Accordingly, even when either the object or the device itself is moving, clear still pictures of the object are required to maintain the desired object perception function. However, in such a case, due to the picture movement which occurs during the received light accompanying the aforementioned movements of the object or the device, image resolution input is degraded.

As described above, light reception is effected in the case of CCD and the like devices for relatively longer field periods of around 1/60 second. This causes picture drift at fairly high frequencies during light reception due to the ordinary movements of the target object or the device itself, degrading still picture resolution, which eventually lowers object perception performance. There has thus been a demand for a function that achieves clearer images via counter-correction or cancellation at far higher speeds than the 1/60 second of the image pickup device in response to unit control signals accompanying the movements of target object or the unit itself. In order to realize this function, however, control at fairly high speed is required, a response performance as high as several thousand hertz being needed to obtain perfectly still pictures. Since accomplishing the function by mechanical means is almost impossible, the need for devices which can accomplish the function electronically is anticipated. Although the function have been provided in conventional solid-state image pickup devices, such devices have been limited in application, owing to the resulting marked reduction in sensitivity and low industrial value.

Now, a look at how the second problem affects conventional image pickup devices when used in home electronics products. Some electronic still cameras have been introduced as trial products for public communication use. If existing CCD and the like image pickup devices are employed in such cameras, slippage off of still pictures is likely to occur with respect to the set exposure time, which is determined by the field period of 1/60 second, as described above. This has necessitated increasing shutter speeds by electronic means, as in the case of types used in industrial applications. To meet the requirement for clearer still pictures, a method is under review in which light receiving time is shortened by discharging photoelectric conversion charges so as to shorten the exposure time equivalently, i.e. to increase the shutter speeds. In this case, however, the problem of lowered sensitivity results, asdescribed before. This problem goes counter to the recent trend of technical development aiming at CCD's and other solid-state image pick-up devices with still higher sensitivities, as well as to user needs.

As described above, the two-dimensional solid-state image pickup device employing CCD or MOS devices have only the limited function of regularly outputting image information, within a certain area of the light receiving units, as image signals in response to reference time signals. For this reason, they cannot meet such new requirements as described above and present the problem of the limited image pickup range even in their present limited field of application. It is well anticipated that this will pose a serious problem in future as the scope of application of these elements expands. To date, however, no means of embodying workable image pickup systems, capable of meeting this requirement have been disclosed.

As another approach to this end, a "two-state image processor SI", designed as one chip, was announced in Nikkei Electronics (No. R195-216) of Dec. 19, 1983, in which complete image information is said to be tentatively stored in the digital memory, after A-D conversion, to undergo subsequent image processing for parallel movements or rotations. In this case, however, it takes 0.53μ/bit for parallel movement of the picture alone. This means several seconds are required for parallel movement of an ordinary TV picture; thus it cannot be adapted to real time processing of continuous pictures on a TV screen, which requires 60 fields per second.

Real time processing requires an ultra-high speed processor, and is impracticable with a single-chip setup even if the memory unit is excluded. Such a scheme is as yet some time in the future; thus, the real time approach to TV signal image processing via such a digital image processor has proved to be unrealizable in the near future.

SUMMARY OF THE INVENTION

An object of the present invention is to provide a solid-state image pickup device which has a light receiving unit comprising arrays of two-dimensionally arranged light receiving elements and outputs image information formed of picture elements within any desired range of those contained in the overall image pickup range of the light receiving unit in response to external control signals.

Another object of the present invention is to provide a single chip solid-state image pickup device at low cost.

The solid state image pickup device according to the invention comprises: a photosensitive picture element unit arranged in matrix in horizontal and vertical directions and converting light into electric charges via photoelectric conversion; a horizontal charge coupled unit which transfers the electric charges in the horizontal direction; and a vertical charge coupled unit which transfers the electric charges in the vertical direction.

Information formed of the picture elements within a specified portion of the photosensitive picture element unit is outputted as picture element output signals in response to external control signals. From the overall image information received on the light receiving unit of the solid-state image pickup device, picture element information within a selected range can be internally processed and outputted as desired image signals in response to the external control signals.

This invention permits controlled transfer of electric charges along vertical and horizontal transfer channels in response to external control signals so as to selectively extract picture element information within a desired range from all the picture element information obtained at a light receiving unit. When used in object perception devices for industrial and home use products, the ability to select image pickup ranges of the image input unit within the image pickup elements permits the manufacture of simple, compact, and low cost devices. In addition, this invention allows real time TV signal picture processing with high response, thanks to its unique feature of directly transferring electric charges corresponding to picture elements within the image pickup unit itself. Also, an electronic picture correction method can improve reliability and contribute to the realization of compact and lightweight design, as compared with conventional mechanical correction systems, when applied to industrial and home use image pickup devices. Further, the solid-state image pickup device of the invention can perform picture control that permits transfer of electric charges in four directions on a real-time basis. As it permits follow-up of optically formed images with electric charges resulting from photoelectric conversion of the light received from an object under the control via external signals, it offers remarkable effects, such as no degradation in sensitivity even after picture correction, and controllable follow-up of optical images with electric charges resulting from photoelectric conversion of light received from target objects with markedly improved resolution of individual still pictures, even after screen movement.

BRIEF DESCRIPTION OF THE DRAWINGS

FIGS. 1 (f)–(n) are diagrams for explaining the operating principle of a second electric charge transfer control system used in a solid-state image pickup device according to this invention.

FIGS. 1 (o)–(u) are enlarged views of the operating principle of the second electric charge transfer control system.

FIGS. 3 (b)–(g) are diagrams for explaining the operating principle of the electric charge transfer.

FIGS. 4 (b)–(f) are enlarged diagrams for explaining the operating principle of the electric charge transfer on an enlarged scale.

FIG. 5 (a) is a cross-sectional view in a horizontal direction of the solid-state image pickup device.

FIGS. 5 (b)–(e) are surface potential diagrams for explaining the operating principle of electric charge transfer in the horizontal direction.

FIGS. 6 (b)–(e) are potential diagrams for explaining the operating principle of electric charge transfer in the vertical direction.

DESCRIPTION OF THE PREFERRED EMBODIMENTS

Embodiment 1

Figure 1A:
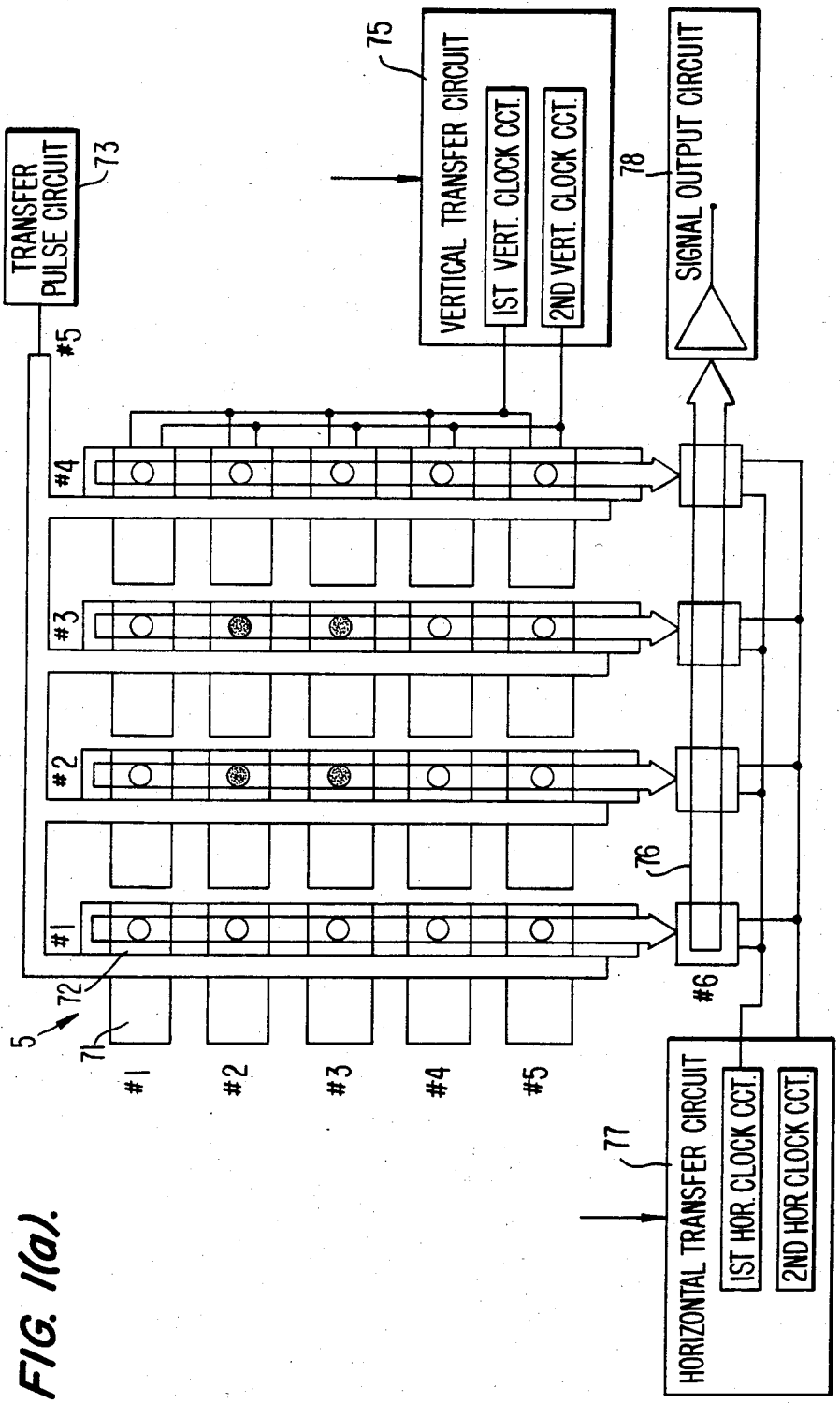
FIGS. 1 (a)–(e) are diagrams for explaining the operation of a first electric charge transfer control system used in a solid-state image pickup device according to this invention.
Figure 1B:
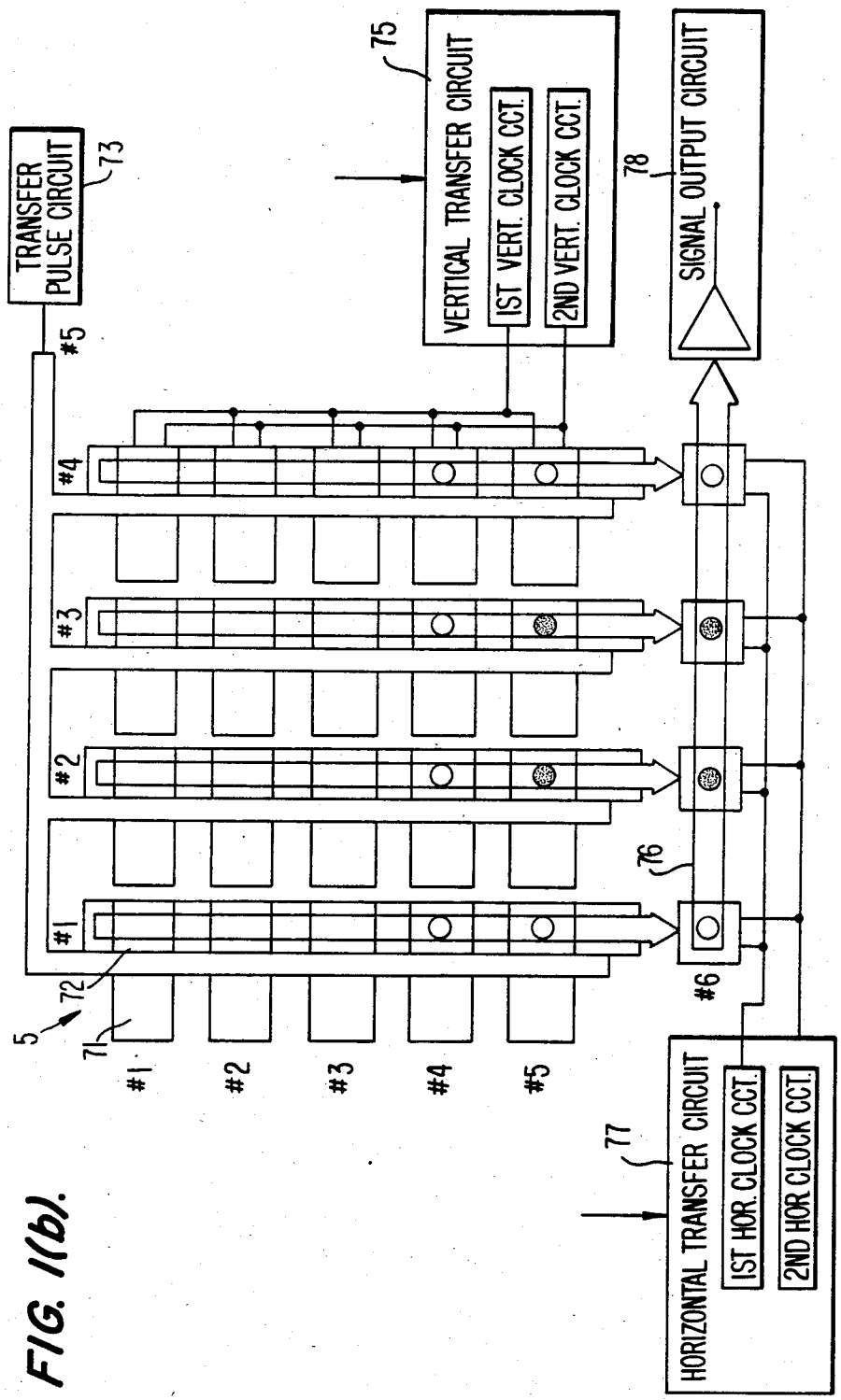
Figure 1D:
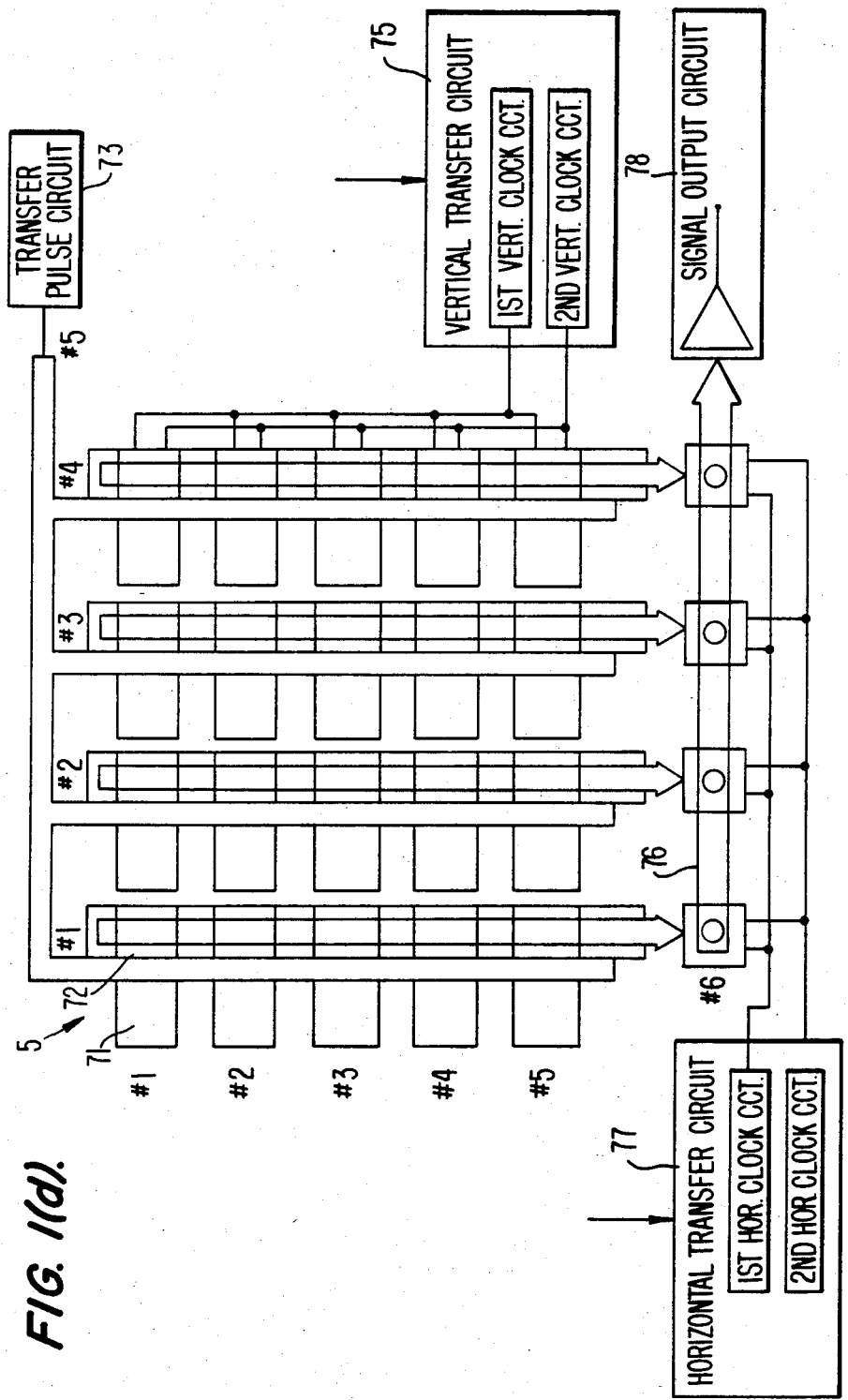

The solid-state image pickup device of embodiment 1 employs CCD, MOS and the like systems to control transfer in both vertical and horizontal directions, in response to the vertical and horizontal control signals, and also to control images in the selected range for output in accordance with the externally applied control signals. FIG. 1 (a) shows a block diagram of an embodiment using image pickup unit (5) in an inter-line type CCD solid-state image pickup plate, in which combinations of photosensitive picture elements (71) made up of photosensitive photo-diodes, etc. and information transfer picture elements (72) are arranged in horizontal and vertical directions to form a matrix. The actual solid-state image pickup device consists typically of 400 to 500 picture elements in the horizontal direction and 250 to 300 in the vertical direction. For purpose of adhering to the limitations of the figurative representation, an example having four picture elements in the horizontal direction and five picture elements in the vertical direction is shown for the purpose of explaining its operating principle.

The image information that has undergone the photoelectric conversion in each of the photosensitive picture elements (71) is transferred en masse to each of the transfer picture elements (72) in the arrow direction for each feed or frame in response to the pulses fed from the transfer pulse feed circuit (73). Each of the transfer picture elements (72) transfers the image information received in the vertical direction.

Image information transfer along the vertical transfer channels (74a, 74b, 74c and 74d) is controlled by the vertical transfer clock signals fed from the first (75a) and second vertical clock signal circuits (75b) of the vertical transfer circuit (75), proceeding toward the bottom of the drawing. Electrical information for individual picture elements thus transferred is transferred along the horizontal transfer channel (76) toward the right of the drawing, being controlled by the horizontal transfer clock signals fed from the first (77a) and second horizontal clock signal circuits (77b) of the horizontal transfer circuit (77), subsequently reaching the signal output circuit (78) for outputting as image signals.

In addition to the above-mentioned basic operating principle, control is effected in both the vertical and horizontal directions as well as in the rotational direction when the picture control function is turned ON. In the system shown in embodiment 1, where the image pickup board is equipped with picture elements arranged in a matrix, solely electronic control in the rotational direction is impractical. To meet this end, an image pickup unit (5) is installed in the rotary drive control unit to permit control according to the desired rotational angle and thus correction of pictures of all components. In the following paragraphs, the principle of electronic control in the vertical and horizontal directions will be explained in detail.

For the correction of images appearing on the screen, vertical transfer clock signals fed from the vertical transfer circuit (75) are modulated via the horizontal control circuit so that equivalent corrections can eventually be made on the screen in the image pickup unit (5), where images are formed, and so that the time required for the desired picture element information to reach the horizontal transfer channel (76) is made to fall within the duration of the vertical blanking period. This means substantial movement of the selectively detected picture element signals in the vertical direction; as a result, controlled image signals in the vertical direction are obtained via the signal output circuit (78).

For the control of pictures on the screen in the horizontal direction, horizontal transfer signals fed from the horizontal transfer signal circuit (77) are modulated by the horizontal control circuit on the basis of the necessary amounts as calculated in the correction amount calculation unit. On the horizontal transfer channel (76), desired picture element information is present together with unwanted peripheral picture element information. Proper access is needed only to the desired picture element information, ignoring the rest. Various types of approaches can be conceived for such access.

With no contraction or extension of the time axis, this can be accomplished by sending out all unwanted picture element information at high speed during the horizontal retracing period, and commencing readout, in the horizontal direction, of the necessary picture element information, starting at the beginning. This method works effectively where a relatively narrow correction range is required for the horizontal direction. Limits to such correction ranges are dependent on the number of picture elements that can be transferred out during the horizontal retracing period. Taking TV signals as an example, the average horizontal retracing periods are on the order of, for example, 11.4µs, though they vary according to the standards applied, as against average horizontal scanning periods of 63.5µs; accordingly, 50 to 100µs or so is normally required for unit picture element transferral in the horizontal direction. To meet this requirement, transfer clock signals fed to the image pickup boards are typically set at 7.2 MHz or 10.7 MHz. Accordingly, transfer of information comprising 100 to 200 picture elements is possible within the horizontal blanking period. If such a range is acceptable, processing with image pickup boards will be possible without contraction or extension of the time axes. In this way, equivalent movements of picture element information in the horizontal direction, that is, image control in the horizontal direction, can be accomplished. For reference, control ranges in the vertical direction are described. Vertical retracing periods are about 600µs, nearly 50 times the horizontal retracing periods. Since, as a natural consequence, the theoretical limit for the number of picture elements that can be transferred during these periods is sufficiently high (5,000 to 10,000 picture elements), nearly 50 times the number that can be transferred in the horizontal direction. Therefore, the control ranges in the vertical direction can be said to be restricted only by the areas of the chips used in the image pickup unit (5) and the image focusing ranges available on the image pickup unit (4).

By contrast, control ranges in the horizontal direction are limited to the narrow ranges due to limitation of transfer speeds in the horizontal direction as described above, unless no time axis contraction signals are supplied. Taking ordinary TV pictures as an example, this method makes it possible to produce solid-state image pickup elements without additional circuitry for as time axis contraction or extension circuit (and hence a lower in cost), which effect control in the vertical direction over wide ranges, as drift in the vertical direction is more dominant, while controlling only 10 to 20% of the screen areas in the horizontal direction. Further control range extension in the horizontal direction can be accomplished by providing a time axis control circuit (78a) that can control time axis extension or contraction, as shown with broken lines in the block diagram of the signal output circuit (78) in FIG. 1 (a).

More specifically, where 500 picture elements are ultimately required in the horizontal direction, 1,000 picture elements, for example, are arranged in the image pickup unit (5) to read out all 1,000 picture elements, for example during the horizontal scanning period of 63.5µs. Since there are 500 picture elements needed for correction during a period of 31.75µs and another 500 picture elements not needed correction during the 31.75µs before and after the aforesaid period, the operation is halted temporarily until the beginning of the 500 needed elements. As soon as the beginning is reached, it is retarded until the demodulation synchronizing signal is set at the latest time zone in the control range, readout of the 500 needed elements commencing synchronously with said demodulation synchronizing signal. In this case, by expanding from 31.75µs to the standard horizontal scanning period of 63.5µs and feeding out in succession, image signals corrected for sway in the horizontal direction can be obtained from the signal output circuit (78).

By providing such a time axis control circuit, transfer speed along the horizontal transfer channel (76) can be kept constant, thus preventing adverse effects of residual charges on the picture due to the difference in high and low speed transfer, where CCD's are used to improve the quality of pictures, while permitting a sufficiently wide range of control in the horizontal direction.

To explain how images are corrected in an actual embodiment, plan views of the image pickup unit (5), as viewed from the side of incident light, in FIGS. 1 (a)–(d) are shown, in which numbers of picture elements are decreased to about 1/100 each in the horizontal and vertical directions. As shown in FIG. 1 (a), the image pickup unit (5) has a matrix of picture elements arranged in 4 columns in the horizontal direction and 5 rows in the vertical direction. If the horizontal transfer channel (76) and the signal output circuit are counted as an additional column and row, respectively, we have a matrix of 5 columns × 6 rows. Let individual columns be identified as No. 1 through No. 5, and individual rows as No. 1 through No. 6, respectively, as shown in FIG. 1 (a), coordinates for each of the picture elements being identified by the numbers assigned to the columns and rows intersecting at the locations of individual picture elements; for example, as (1, 1).

Optical information focused on the associated picture elements represents the state of such information fed to the associated transfer picture elements (72) in response to the pulse signal fed from the transfer pulse signal circuit (73), after photoelectric conversion via the photosensitive picture elements (71) involved. In the interest of brevity, individual picture elements are indicated by small circles, those portions of the picture element information needed after correction being indicated by black circles, the unwanted portions by white circles, as in FIG. 1 (a). It is assumed that all picture elements, (1, 1) through (4, 5), are included in the picture transfer elements (72), of which the picture elements to be selected are identified with black circles (2, 2), (2, 3), (3, 2) and (3, 3).

First, correction is performed in the vertical direction for each field or frame. For this purpose, the speed of the vertical transfer clock signal from the vertical transfer circuit (75) is controlled (or the number of clock signals is controlled with the speed kept constant) during the vertical blanking period by means of the vertical control circuit as described above; the picture element information portions needed after correction enter the locations identified by the coordinates (2, 6) and (3, 6) in horizontal transfer channel 76, as shown in FIG. 1 (b) completing the correction control for this field or frame in the vertical direction.

As described before, control in the horizontal direction is carried out during each horizontal blanking period, or by the time axis control circuit (78a). Here, an explanation of such control using no time axis control circuit (78a).

As described before, horizontal transfer signals from the horizontal transfer circuit (77) are controlled via the horizontal control circuits, each of the picture elements in the horizontal transfer channel (76) being outputted as corrected picture element information, in synchronization with the horizontal scanning start time, upon completion of the vertical blanking period, by either changing the transfer clock speed or the number of clock signals in response to external control signals for transfer toward the right, as shown in FIG. 1 (c) with (5, 6).

FIG. 1 (d) is after such horizontal transfer has been carried out for the necessary number of scanning lines. Here, all electrical signals for the image after correction have already been outputted, with only the portions of the picture element information not needed for correction remaining on the horizontal transfer channel (76); electric charges have been completely swept away from all transfer picture elements (72). To ensure thorough removal of any remaining electric charges, a switching element of the presently available type may be provided in each of the picture elements so that each picture element is free from all trace of electric charge.

During each field or frame image signal readout cycle, a certain amount of electric charge is stored in the photosensitive picture elements (71), consisting of photodiodes, etc., due to photoelectric conversion of light information from the optical image on the photosensitive picture elements (71). By transferring the image information from the photosensitive picture elements (71) to the picture transfer elements (72) during the vertical blanking period by activating the transfer pulse signal circuit (73), the image readout cycle is restored to its original state.

If no movement of the optically formed image takes place during this cycle, the state shown in FIG. 1(a) is restored and the same operation is repeated. If any movement does take place during the cycle, calculation for optimum correction is carried out quickly, either in the solid-state image pickup device or externally, the correction signal being then fed in response to the external control signal.

Figure 1E:
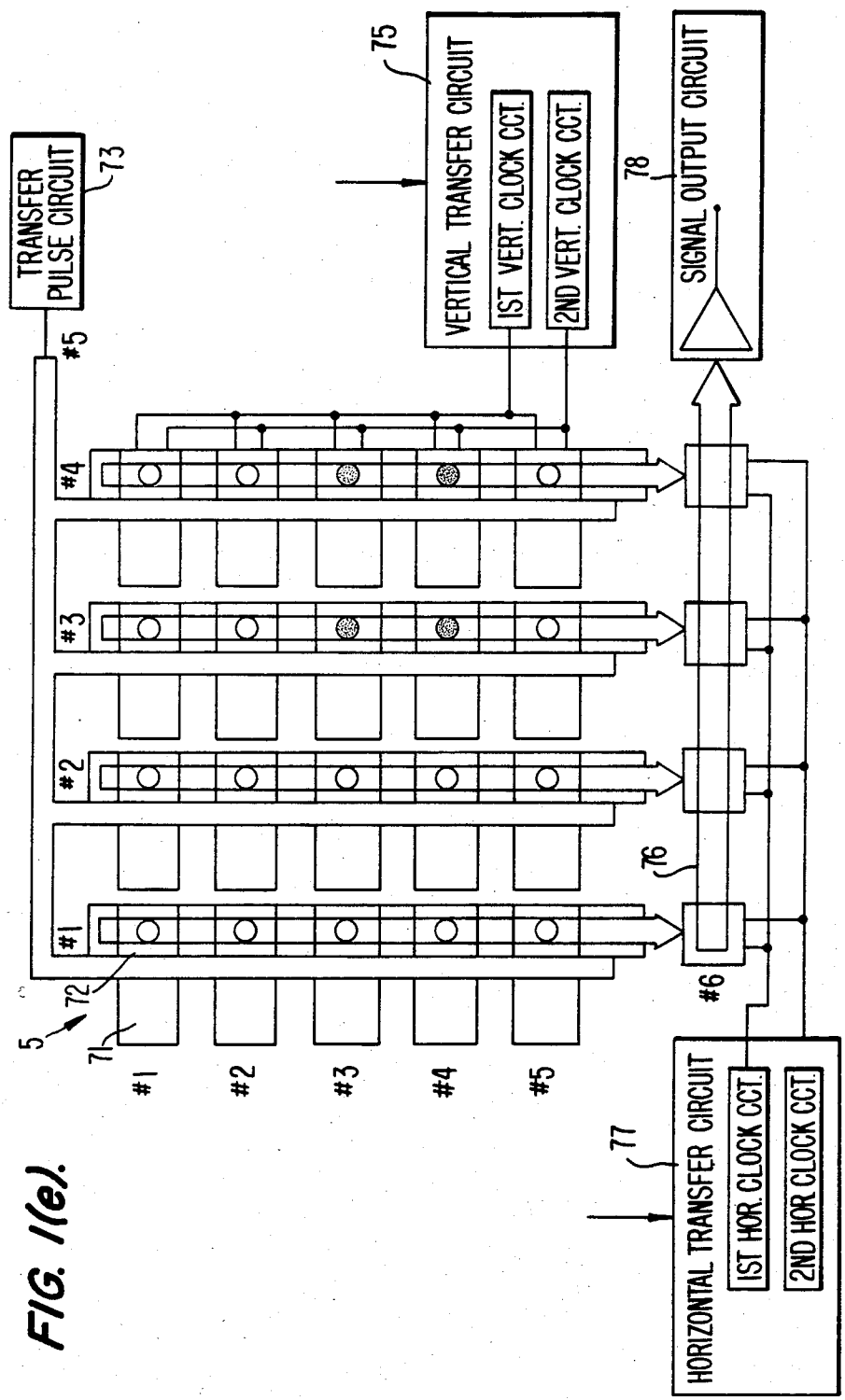

Let us assume that, due to movement of the optically formed image during one cycle, fractions of the image information enter the wrong picture element locations, as shown in FIG. 1(e). More specifically, picture elements which should be entered in locations (2, 2), (2, 3), (3, 2) are erroneously entered in locations (3, 3), (3, 4), (4, 3) and (4, 4), respectively, requiring correction. Amounts of deviation in the vertical and horizontal directions are obtained at a deviation correction calculation unit (not shown in the drawing). To compensate for the deviation, counter-correction is effected in the subsequent image readout cycle by the vertical transfer circuit (75) and the horizontal transfer circuit (77), movement in the vertical and/or horizontal directions being corrected so long as it falls within the control range; thus stable, beautiful and easy-to-perceive continuous images can be obtained. Because of the matrix arrangement of picture elements, which can effect control of transfer in only the vertical and horizontal directions, it is necessary to install the image pickup unit (5) in a rotary drive control unit and let it rotate as previously described in order to handle picture deviation in the rotational direction. In ordinary application, however, sufficiently high control for continuous pictures can be obtained via controls in the vertical and horizontal directions. Accordingly, image pickup devices capable of effecting purely electronic picture control can be realized with the solid-state image pickup elements as disclosed in the embodiment of this invention. Of course picture quality can be further stabilized by additional rotational control.

Because it involves no mechanical parts, this embodiment is very effective in practical application, in view of the continued remarkable development of semiconductor technology expected in future, and as it is obvious that this embodiment will provide highly rigid and compact TV cameras for improved continuous pictures at even lower cost.

Figure 1F:
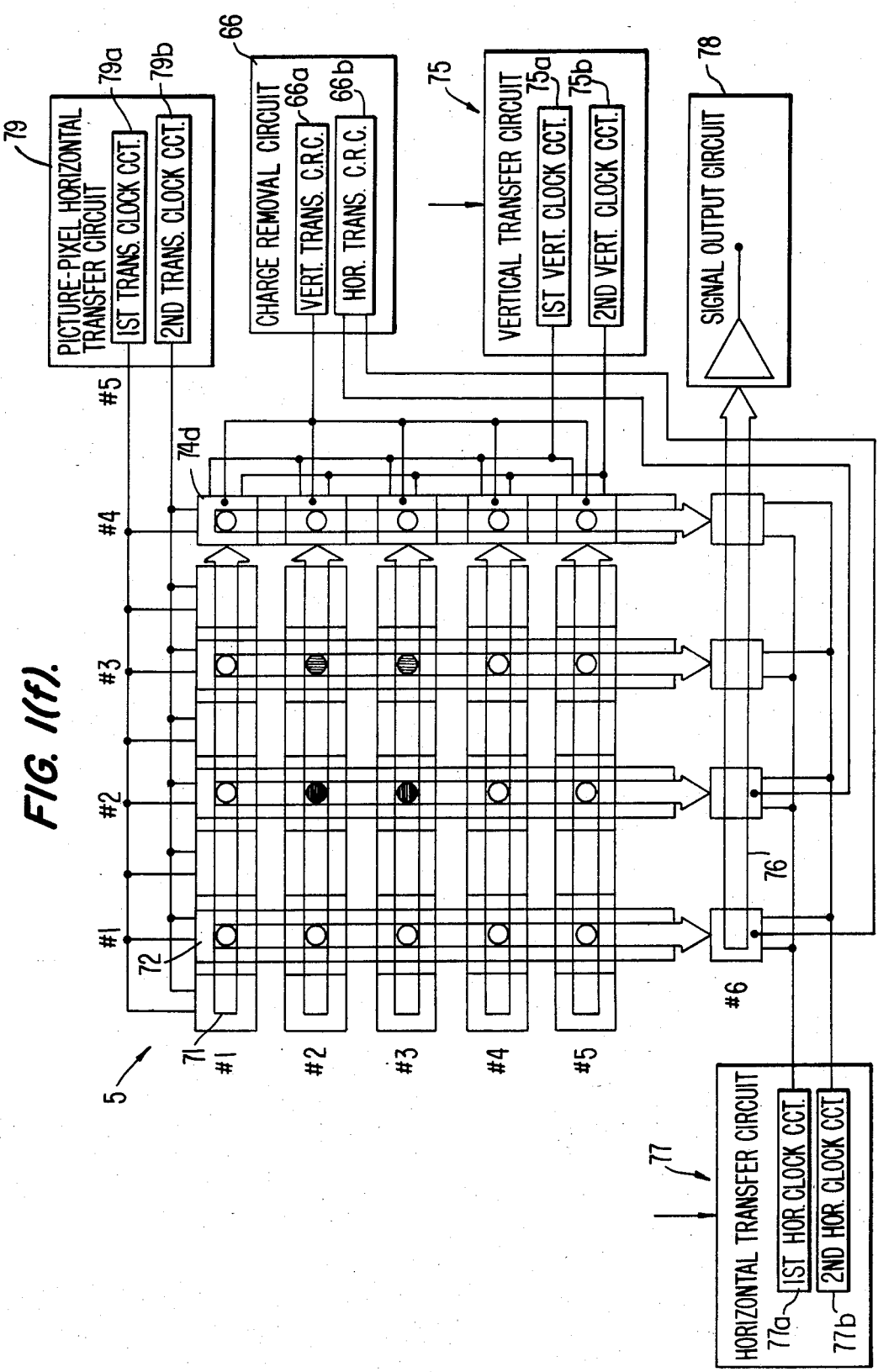

As mentioned previously, it has been a problem that unless a time axis control circuit is provided for contraction or extension of the time axis, many pieces of picture element information must be transferred under the control of the horizontal transfer circuit (76) within the short horizontal blanking period; thus picture correction ranges have been kept narrow owing to the limitations on transfer speeds. However, this problem can be solved by carrying out horizontal transfer of picture elements during the relatively longer vertical blanking period. This is demonstrated in FIG. 1(f), in which, in addition to the composition of FIG. 1(a), transfer electrodes are provided on the photosensitive picture elements (71), the picture transfer elements (72) being arranged in the vertical direction as shown in FIG. 1(f). As well, a picture element horizontal transfer circuit (79) is provided, which with its picture element charge group horizontal transfer function, can transfer part or all of a picture element group uni-directionally in the horizontal direction, each piece of picture image information being transferred toward the right-hand side of the drawing by means of the first (79a) and second transfer clock signal circuits (79b). With this construction, all pieces of picture element information are transferred toward the right by the picture element unit horizontal transfer circuit (79) during the vertical blanking period, having some reserve in terms of time, so that picture control can be effected in the horizontal direction. In addition, a charge removal circuit (66) is added, which consists of two blocks. One is the vertical transfer channel charge removal circuit (66a), which removes electric charge from the vertical transfer channel (74d) via terminals arranged from the vertical transfer channel charge removal circuit (66a) to the vertical transfer channel (74d) at the extreme right. By means of the picture element horizontal transfer circuit (79), it also removes electric charges for unwanted pieces of picture element information transferred toward the right and prevents charge overflow in the potential well in each transfer cell.

Another block is the horizontal transfer channel charge removal circuit (66b), which functions to quickly remove electric charges for unwanted pieces of picture element information in the horizontal transfer channel (76) via the charge removal electrodes provided on some of the cells in the horizontal transfer channel (76) to prevent these charges from mixing with those for pieces of picture element information needed for correction.

The picture element horizontal transfer circuit (79) and unwanted charge removal circuit (66) permit picture correction in the horizontal direction during the vertical blanking period with enough latitude in time to allow sufficient correction range in the horizontal direction.

Figure 1H:
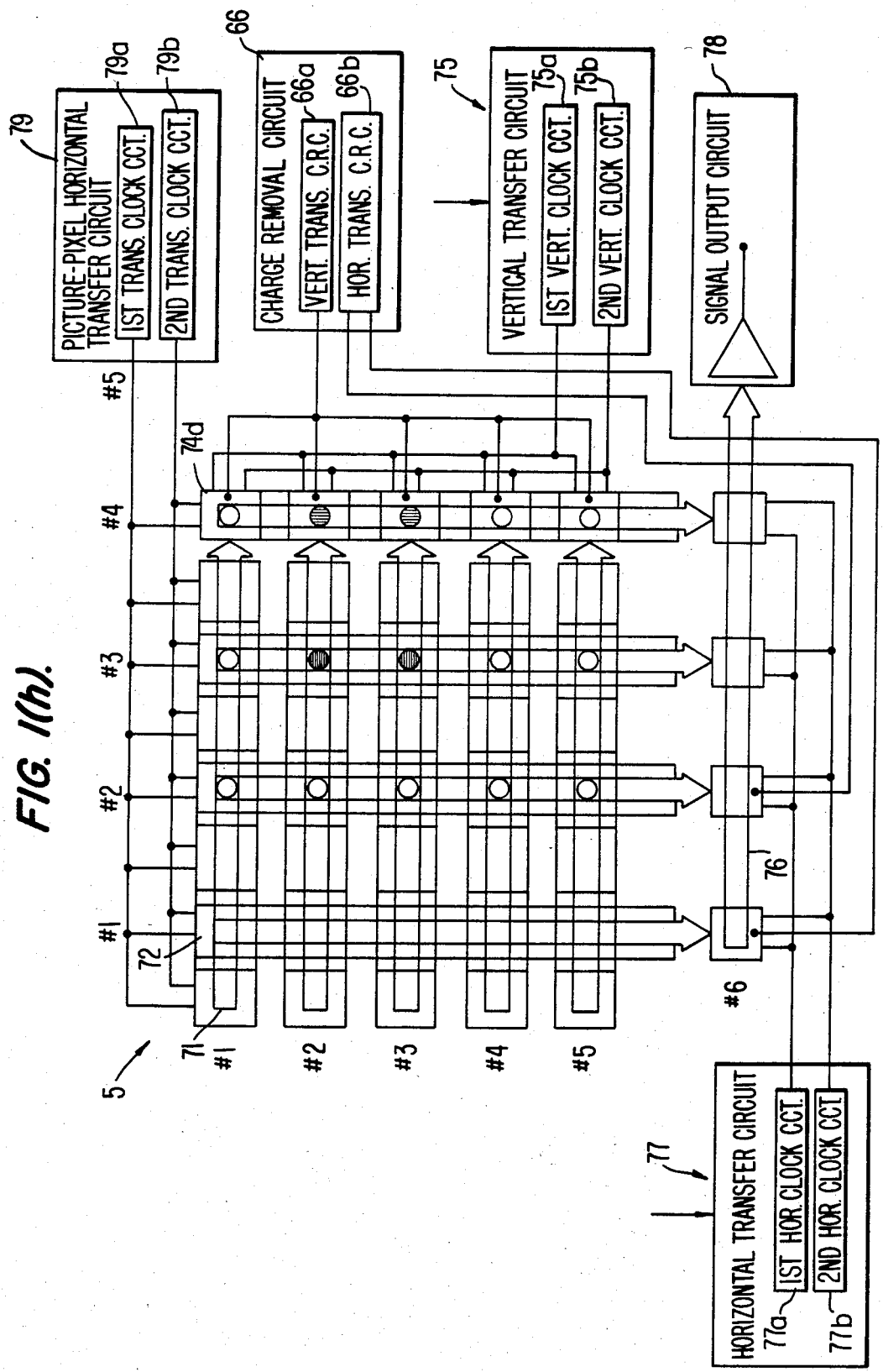
Figure 1I:
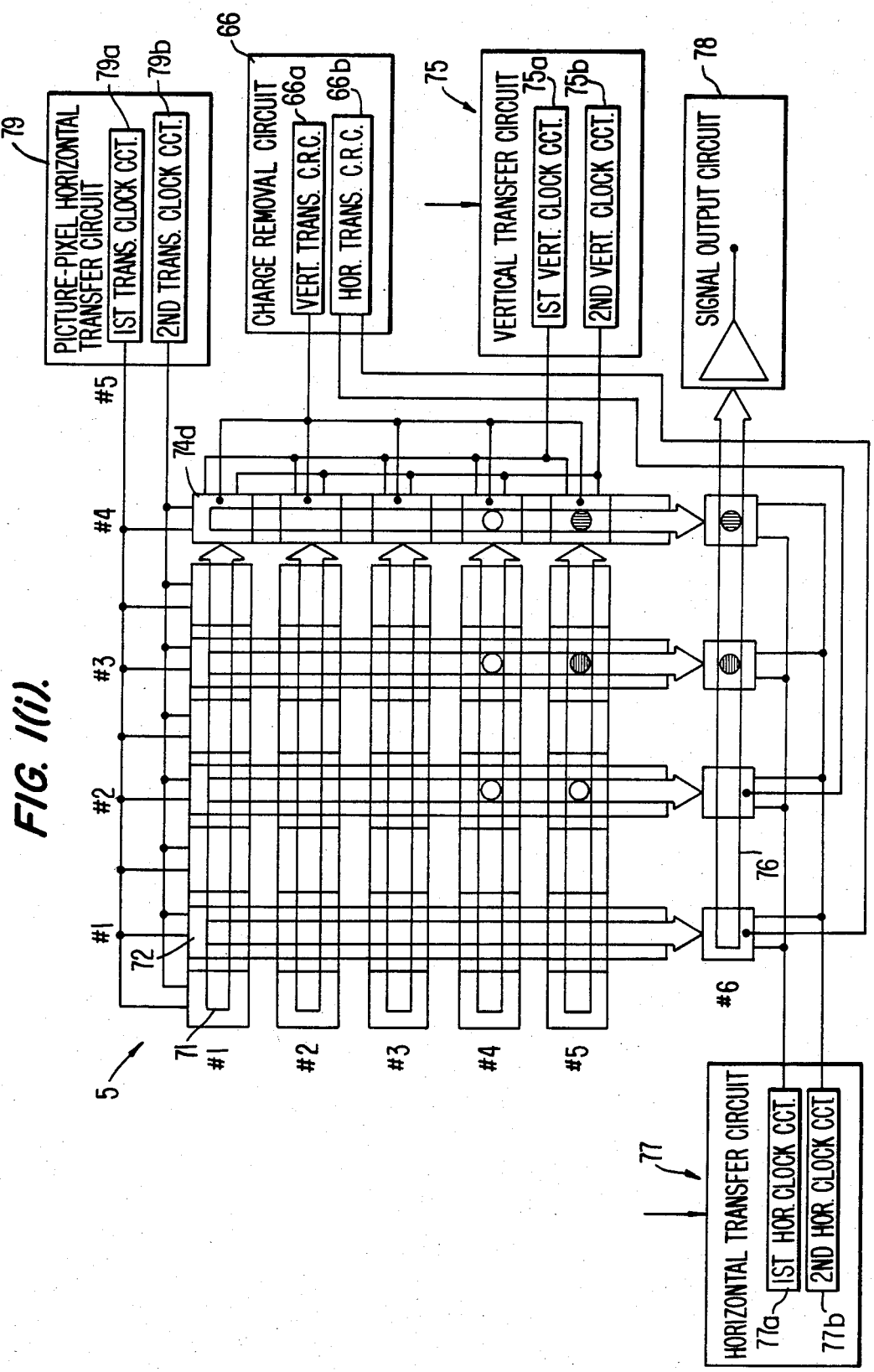

For reference, the operations are explained with reference to FIGS. 1(f) through 1(n). FIG. 1(f) shows the state immediately after pieces of picture element information have been transferred from the photosensitive picture elements (71) to the transfer picture elements (72) by activating the picture element horizontal transfer circuit (79) during the vertical blanking period. As with FIG. 1(a), pieces of picture element information are indicated as small circles placed in a matrix formed of four columns in the horizontal direction and five rows in the vertical direction. Of these, white circles indicate pieces of picture element information assumed to be not needed after correction, circles shaded with horizontal or vertical lines, the four sets of picture elements having coordinates (2, 2), (2, 3), (3, 2) and (3, 3), indicating those pieces of picture element information needed after correction. Since the vertical blanking period is made sufficiently longer than the picture element transfer time, the picture element horizontal transfer circuit (79) transfers each piece of picture element information from the associated transfer picture element (72) to its respective associated photosensitive picture element (71) toward the right side of the drawing, as shown in FIG. 1(g). At this point, electric charges for the pieces of picture element information not needed for correction, which have been transferred to the vertical transfer channel (74d) at the extreme right, have already been removed by means of the vertical transfer channel charge removal circuit (66a). Accordingly, when the succeeding horizontal transfer clock cycle commences, the right end of the picture element information necessary for correction comes to the vertical transfer channel (74d) at the extreme right as shown in FIG. 1(h), the coordinates (4, 2) and (4, 3) being occupied by the pieces of picture element information needed for correction (vertically shaded circles). This means that correction of picture elements in the horizontal direction is completed during the vertical blanking period. Where interline type CCD's are in use, the photosensitive picture elements (71) are normally made translucent and the transfer picture elements (72) are made opaque; the same construction is employed in this embodiment as well. Although electric charges resulting from the receipt of light are added in the form of noise in the course of transfer of picture element information in the horizontal direction via the photosensitive picture elements (71), the duration of exposure to noise-inducing light during transfer is 50 $\mu$s (calculated on the basis of 1,000 picture elements arranged horizontally with a unit picture element transfer time of 50 ns), a negligible duration as compared with the total light receiving time of about 1/60 second or 16.7 ms for unit picture information; it can safely be said that there will be little degradation in picture quality. Further noise reduction can be accomplished by providing a charge removal terminal or Tr on each of the photosensitive picture elements (71) to remove electric charges accumulated during each picture element horizontal transfer cycle.

Figure 1J:
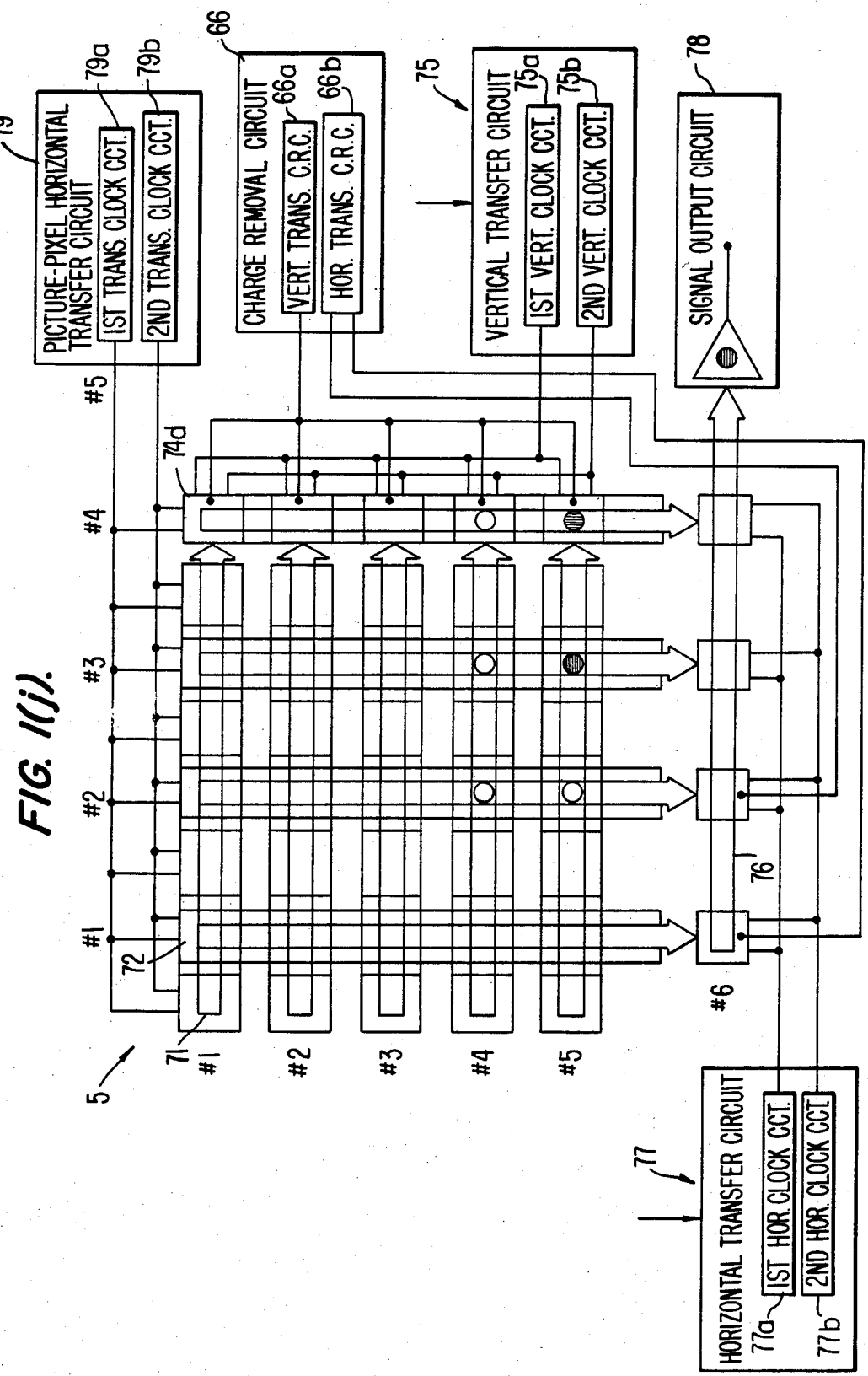
Figure 1K:
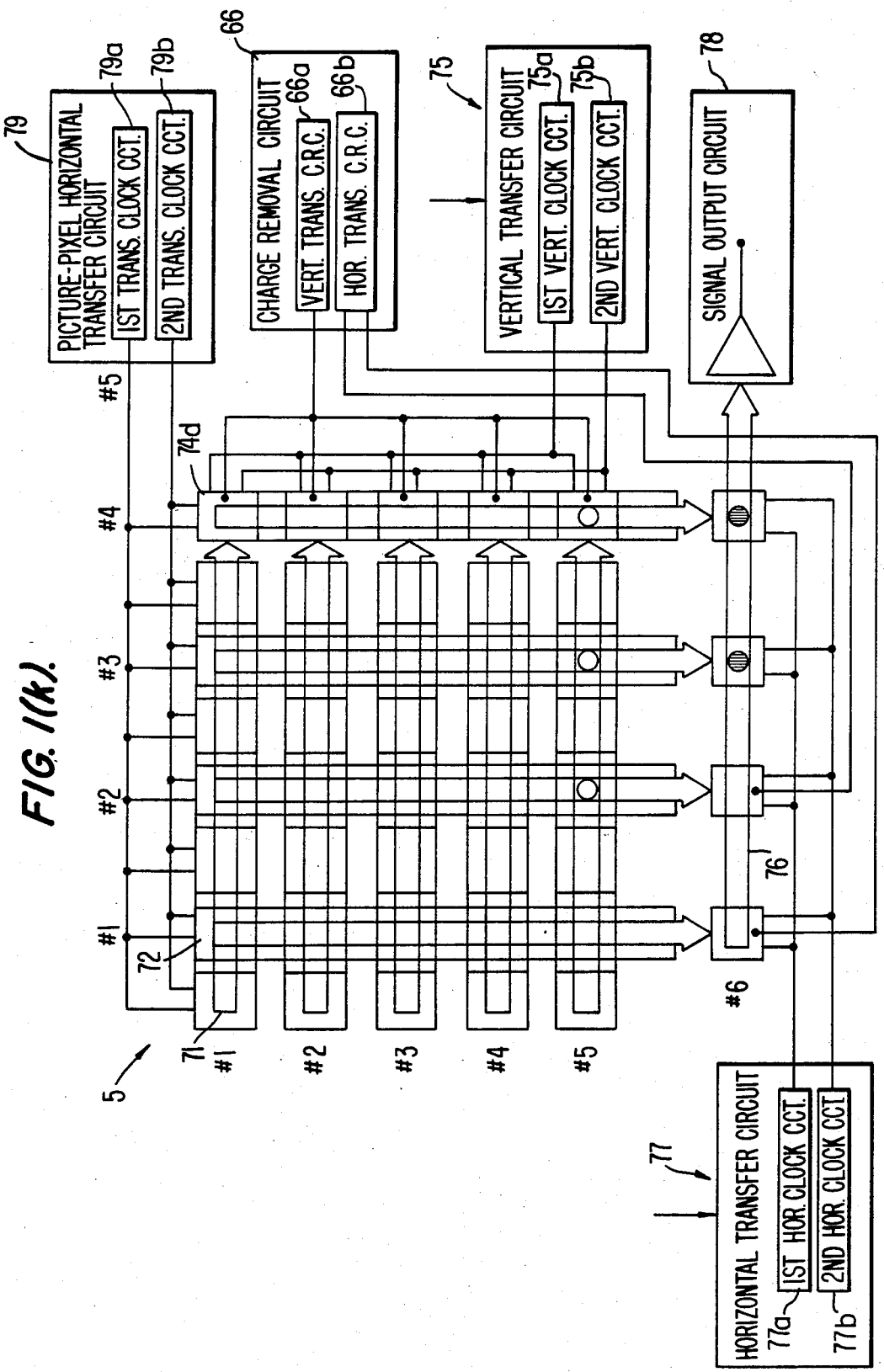

In this way, control of picture correction in the horizontal direction is effected during the vertical blanking period, as shown in FIG. 1(h). Making use of the remaining portion of the vertical blanking period, picture correction in the vertical direction is controlled via the same technique as explained with FIGS. 1(a)–1(e). By transferring pieces of picture element information toward the bottom in the drawing, by the correction amount, along each of the vertical transfer channels (74) via control with the vertical transfer circuit (75), pieces of picture element information needed after correction are transferred to the locations identified by the coordinates (3, 6) and (4, 6) on the horizontal transfer channel (76) as shown in FIG. 1(c). At this state, as the piece of picture element information transferred to the coordinate (2, 6) on the horizontal transfer channel (76) has been relieved of its electric charge by the horizontal transfer charge removal circuit (66b) in the charge removal circuit (66), since it is unwanted after correction, coordinate (2, 6) on the horizontal transfer channel (76) remains void. Thereafter, pieces of the picture element information needed for correction are processed via the signal output circuit (78) and delivered to the outside as picture signals in succession, as shown in FIG. 1(j). Though not shown in the drawing, the photosensitive picture elements (71) are provided with color filters arranged in a mosaic, so that color picture signals can be obtained on either the NTSC system or the PAL or SECAM systems by subjecting the picture element signals to processing via control signals. As shown in FIG. 1(j), pieces of picture element information not needed for correction have been removed from the horizontal transfer channel (76) by the horizontal transfer channel charge removal circuit (66b). Since no electric charges remain on the horizontal transfer channel (76), subsequent picture element information can be transferred there upon commencement of the next horizontal blanking period. And, as shown in FIG. 1(k), pieces of picture element information needed for correction enter the horizontal transfer channel (76), while electric charges are removed from the pieces of picture element information not needed for correction by the horizontal transfer channel charge removal circuit (66b), as shown with the void, for example, at the coordinate (2, 6). When the pieces of picture element information needed for correction on the horizontal transfer channel (76) are delivered via the signal output circuit (78), output for one field picture frame is completed for entering the vertical blanking period. During this period remaining pieces of picture element information not needed for correction are swept to the outside as shown in FIG. 1(l). As shown in FIG. 1(m), electric charges accumulated in the photosensitive picture elements (71) during the scanning period of one field or one frame are transferred in response to the transfer signal fed from the picture element horizontal transfer circuit (79) from each of the photosensitive picture elements (71) to the associated transfer picture elements (72). If, for example, it is desired to make the picture move during the scanning periods of the preceding and succeeding fields, it is possible to effect correction as shown in FIG. 1(m) during the vertical blanking period by control via the horizontal transfer circuit (79) in the horizontal direction and the vertical transfer circuit (75) in the vertical direction, with sufficient reserve in the time period, by amounts of correction which differ from those shown in FIG. 1(f). Although a wide control range is unobtainable with the system shown in FIG. 1(a), that shown in FIG. 1(f) permits sufficiently wide control in the horizontal direction.

FIG. 1(n) shows the state after correction over a wider control range in the horizontal direction by the picture element horizontal transfer circuit (79) during one vertical blanking period.

Figure 1O:
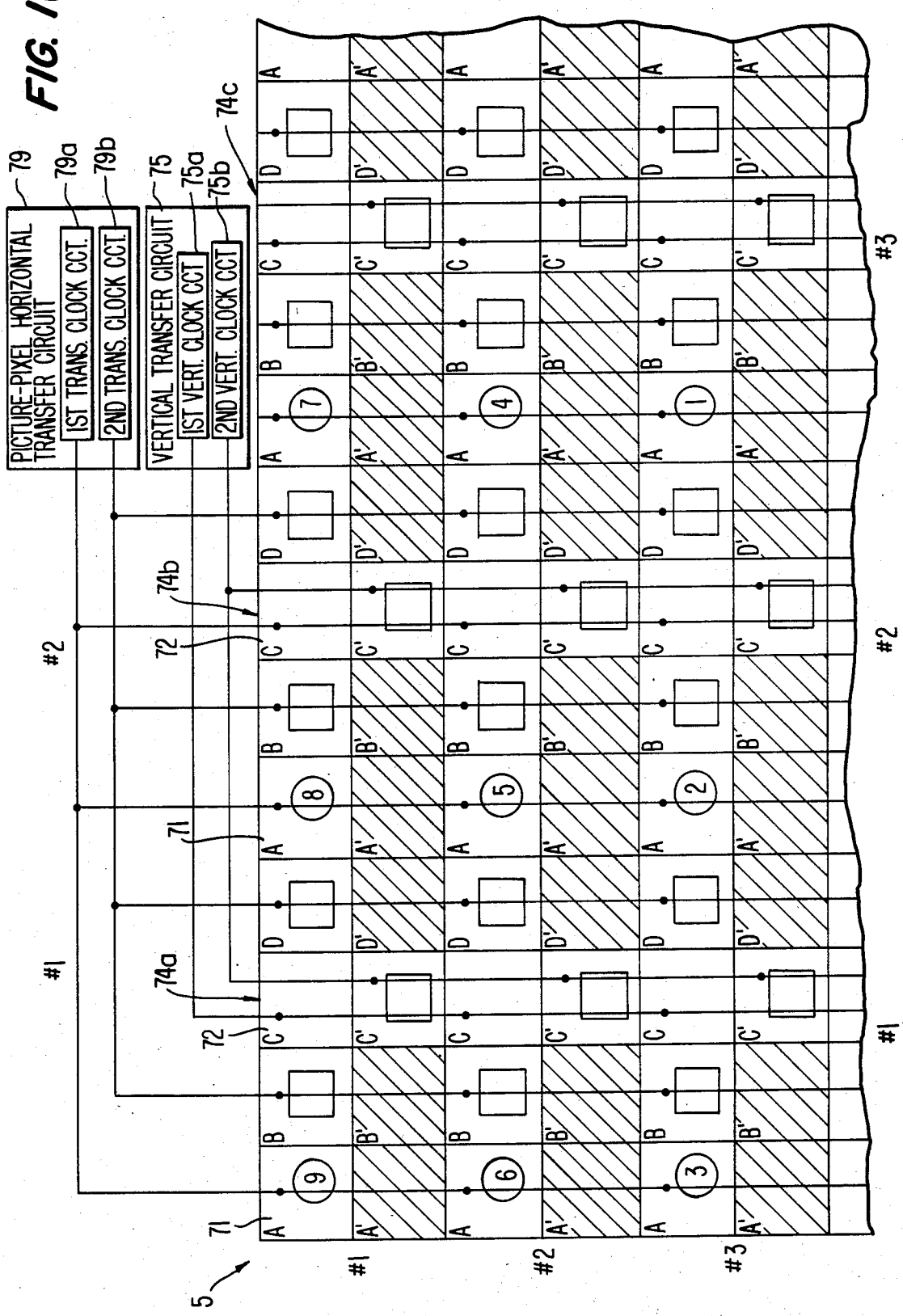

FIG. 1(o) is an enlarged view of the upper left corner of the image pickup unit (5) of the CCD image pickup board in FIG. 1(f), in which only the picture element horizontal transfer circuit (79) and the vertical transfer circuit (75) are shown. The 8 cells (A, B, C, D, A', B', C' and D') at the upper left are a group of unit picture elements. Though they include several hundred thousands of unit picture elements in an actual product, only 9 sets of picture elements are shown here for the sake of brevity, arranged in three rows in the vertical direction and three columns in the horizontal direction. Each unit picture element is of identical construction; cells A, B, C, D and C' of the individual cells included in the unit picture element are provided with electrodes for charge transfer via thin insulation layers, respectively; sections A', B' and D', indicated with oblique lines, represent the channel stoppers provided to block transfer of electric charges by diffusing impurities. Cells A are photosensitive picture elements (71); the electrodes provided thereon are connected with the first transfer clock circuit (79a), which controls transfer in the horizontal direction. Cells B are for horizontal transfer; the electrodes provided thereon are connected with the second transfer clock circuit (79b). Cells C are transfer picture elements (72); electrodes provided thereon are connected with the first vertical clock circuit (75a) in the vertical transfer circuit (75) to form a part of the vertical transfer channel (74). Cells D are horizontal transfer cells which have a function similar to cells B; the electrodes provided thereon are connected with the second transfer clock circuit (79b), which controls transfer in the horizontal direction, as is the case with the cells B. The remaining cells C' are vertical transfer cells which constitute part of the vertical transfer channel (74); the electrodes provided thereon are connected with the second vertical clock circuit (75b). Sections of cells shown with oblique lines, A', B' and D' are channel stoppers which prevent transfer of electric charges.

FIG. 1(o) shows the state right after photoelectric conversion via the optical image focused on each of the photosensitive picture elements (71), with pieces of the picture element information, identified by numerals 1 through 9, in the 9 cells of the picture elements.

Figure 1Q:
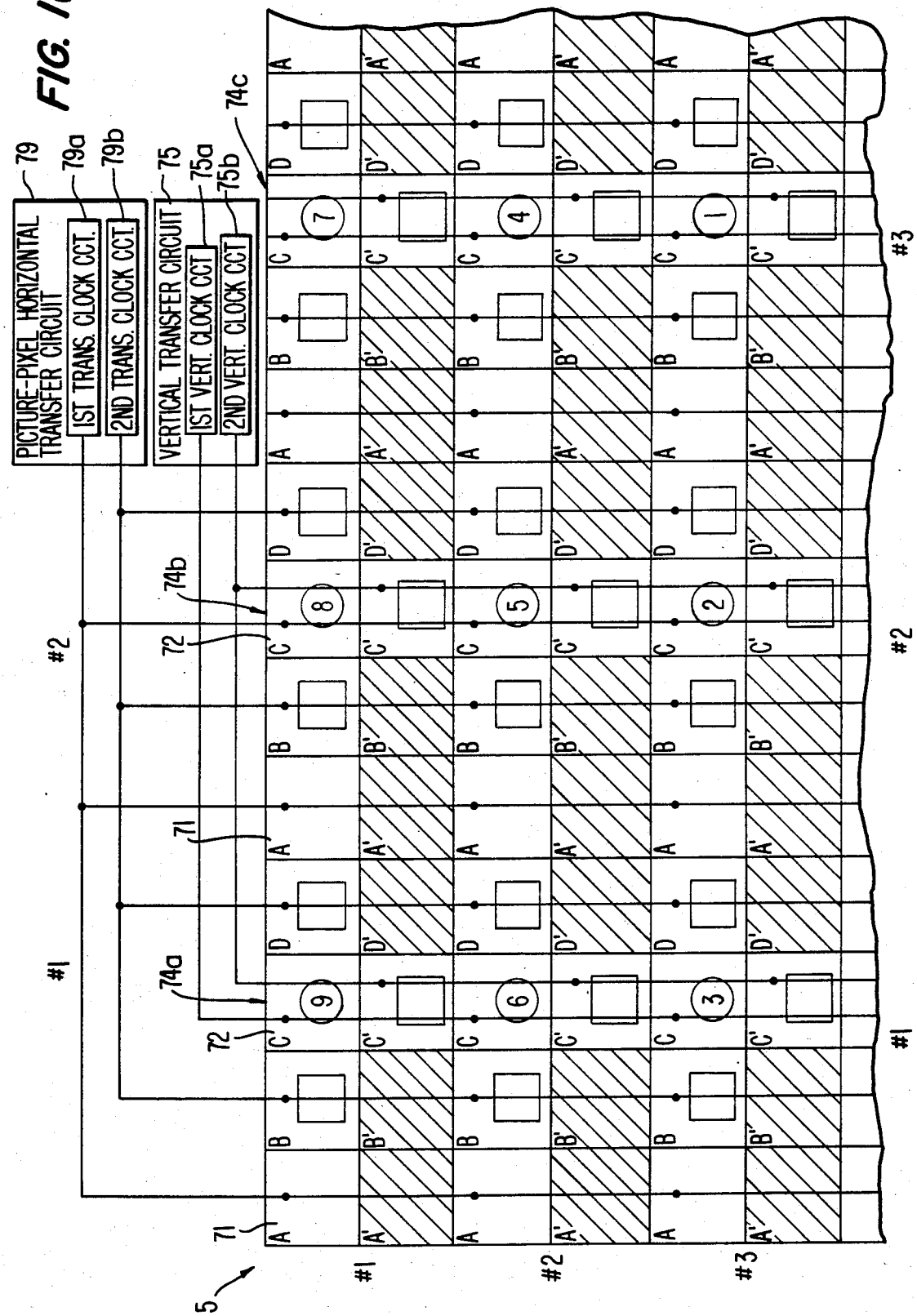
Figure 1R:
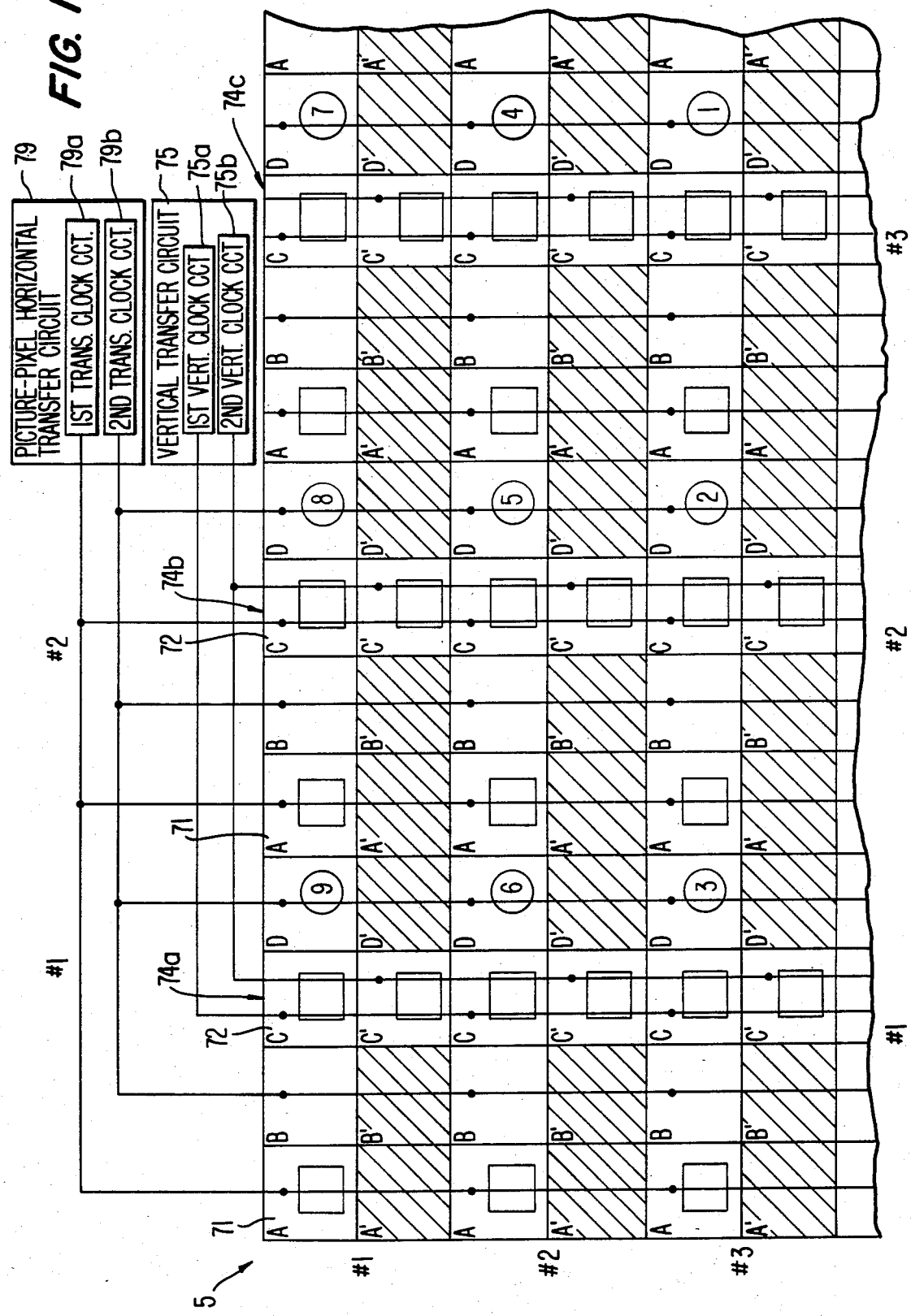
Figure 1S:
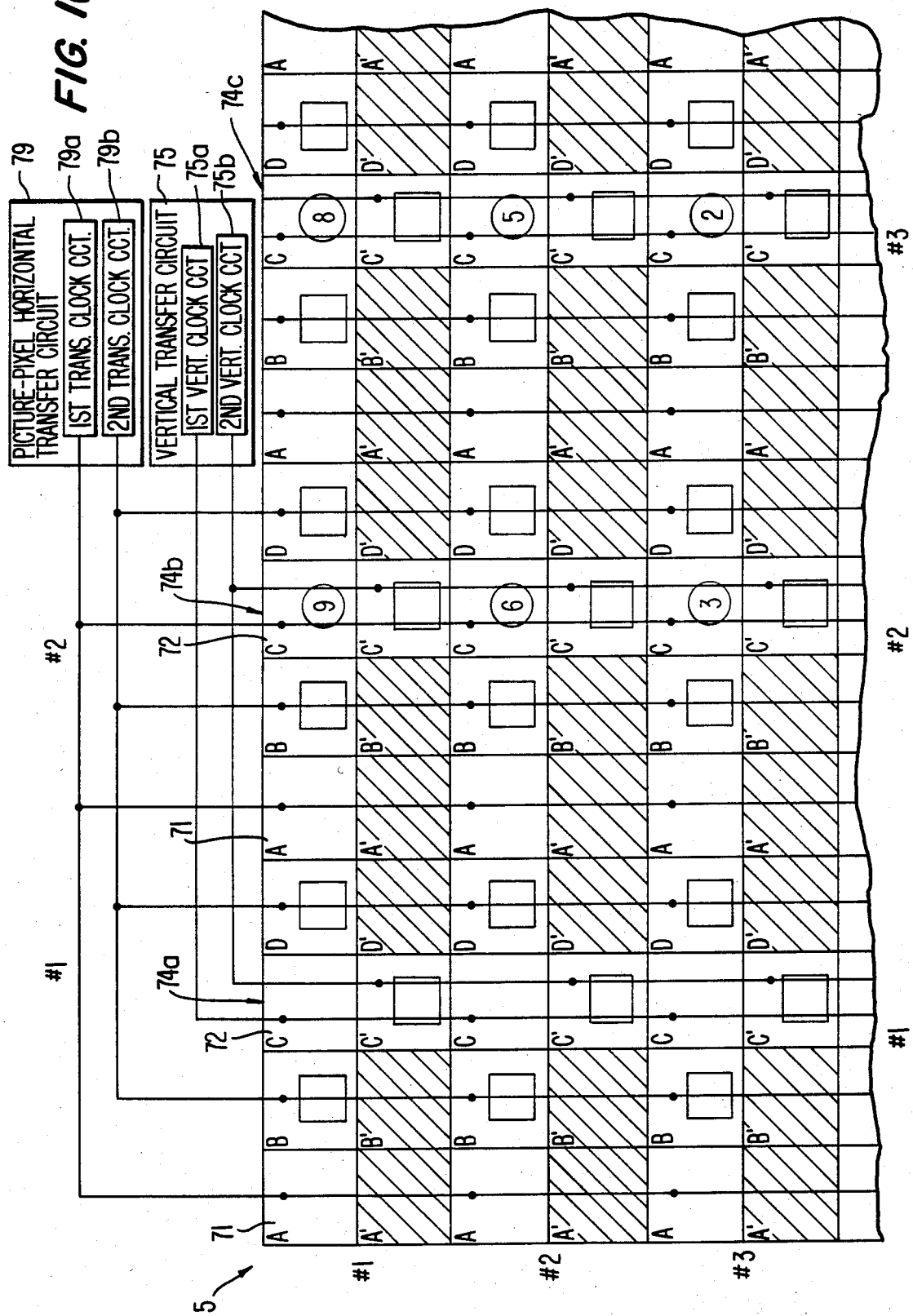
Figure 1U:
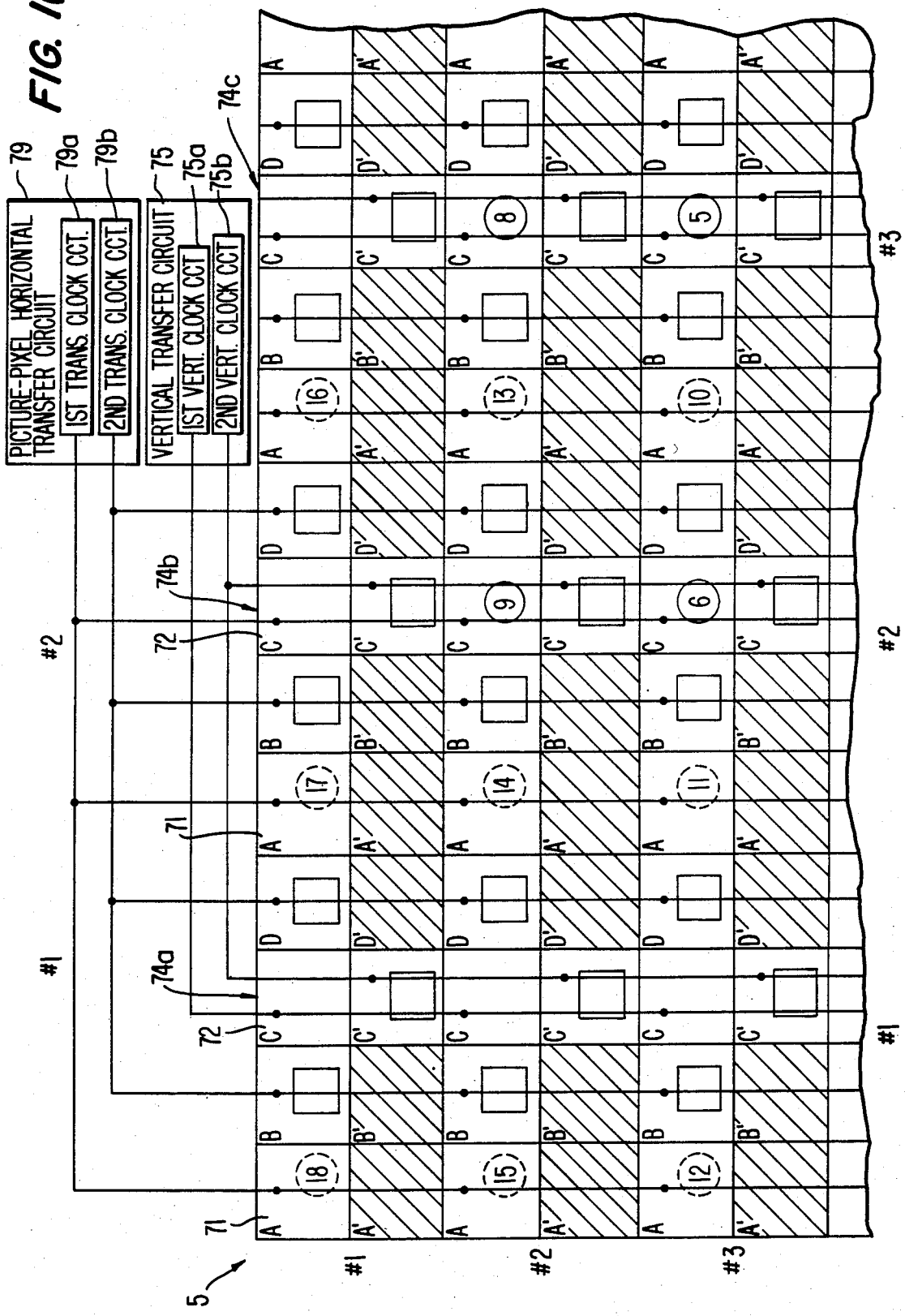

In the case of an N-channel CCD image pickup board using a P-type printed circuit board, it is electrons that are to be transferred, and when voltage is applied at LOW level to a transfer electrode, the well beneath becomes shallow, electric charge being thereby driven out of that part of the electrode subject to the LOW potential. Parts of the electrodes subject to the LOW potential are identified as squares in the figure. Accordingly, in the case of FIG. 1(o), parts B, D and C' in the picture elements are set for LOW potential by their respective clock circuits. As a result, in this state, the pieces of picture element information numbered 1 through 9 are not transferred but serve to hold the image information photoelectric conversion results for the duration of one field or one frame and accumulate electrical information. Upon completion of the time duration for one field or one frame, each piece of picture element information starts moving in the horizontal direction in response to the horizontal transfer clock signal fed from the picture element horizontal transfer circuit (79). As cells A and C are subject to LOW potential and cells B are subject to HIGH potential, as shown in FIG. 1(p), each piece of the picture element information is transferred in the horizontal direction toward the right hand side in the figure. In the subsequent cycle, cells B, D and C' are subject to LOW potential and cells A and C are subject to HIGH potential, as shown in FIG. 1(q); therefore, pieces of picture element information are retained at cells C, and since in this case transfer downward in the figure along the vertical transfer channels (74) is blocked with cells C', which are subject to LOW potential, transfer in the horizontal direction is maintained, to bring about the state shown in FIG. 1(r). In this way, picture correction in the horizontal direction becomes possible with a CCD image pickup board of the above mentioned architecture and construction. The aforementioned amounts of correction in the horizontal direction can be obtained at the correction amount calculation unit on the basis of zoom ratio and other factors, with transfer in the horizontal direction carried out by such properly determined amounts of correction. Such corrections can be completed chiefly during the initial short duration during the relatively longer vertical blanking period; the control range in the horizontal direction can be determined without consideration of the limitations on transfer speed; therefore, a wider control range can be provided. Cells other than the photosensitive picture elements (71) are of opaque construction. Since picture information is transferred via parts of the light-transmissive photosensitive picture elements (71) depending on the sway in the horizontal direction, the system is likely to be affected by noise from unwanted pictures as the amounts of correction for horizontal transfer become greater. To eliminate this problem, a charge removal switch can be provided for each photosensitive picture element to remove electric charges from unwanted pieces of picture element information at each time of transfer in the horizontal direction, in synchronization with the horizontal transfer clock signal. In the case of the NTSC system, however, the time needed for transfer in the horizontal direction, for correction in the horizontal direction, is on the order of 100 μs as compared to that needed for vertical scanning (16.7 ms); thus, this function is not entirely necessary. The state when correction in the horizontal direction has been completed in this manner, shown in FIG. 1(s), is identical to that shown in FIG. 1(h). This is followed with the transfer of picture information in the vertical direction along the vertical transfer channels (74) (toward the bottom part of the drawing) by the controlled amount for correction in the vertical direction. During this period, the state shown in FIGS. 1(s), 1(t) and 1(u) are brought about, in which no transfer in the horizontal direction is carried out and cells A are subject to HIGH potential while cells B and C are subject to LOW potential on the picture element horizontal transfer channels. With electric charges due to the photoelectric conversion accumulating in cells A, cells B and C are held at a LOW potential throughout the vertical transfer process by means of the second transfer clock circuit; thus, any leakage of electric charges under transfer in the horizontal direction along the vertical transfer channels (74) is prevented. When the transfer clock signal is fed from the vertical transfer circuit (75), the transfer of picture information starts toward the bottom part of the drawing. Since each well in each cell on the vertical transfer channels (74) is unidirectional, each cell arranged in the vertical direction repeats a cycle of HIGH and LOW potentials, causing the picture information to move downward during the vertical blanking period in the amount needed for correction of pitch sway, which can be completed when the state in FIG. 1(t) is attained. In parallel with this, accumulation of picture element information starts in the photosensitive picture elements (71) for the succeeding field or frame, as shown with broken circles (10) through (18) in FIG. 1(u). At the moment the scanning for one field or frame is completed, as shown in FIG. 1(l), the pieces of the picture information are transferred from the photosensitive picture elements (71) to the transfer picture elements (72) under the control of the picture element transfer circuit (79), to repeat the aforementioned cycle of the controlled correction of pitch and horizontal sway for each field or frame. In addition to the feature of greater control ranges obtainable in the horizontal direction, as described above, the method shown in FIGS. 1(f) and 1(o) has the additional merit of cost reduction obtainable with existing production facilities as it allows the utilization of conventional transfer speed control systems. Although the area of the opening provided for each of the photosensitive picture elements is small, it can of course be made larger. The structure of each section, composed of 8 cells here, may alternatively consist of 5 cells (A, B, C, D and C') and a channel stopper made up of a set of cells (A', B' and D').

EMBODIMENT 2

Figure 2A:
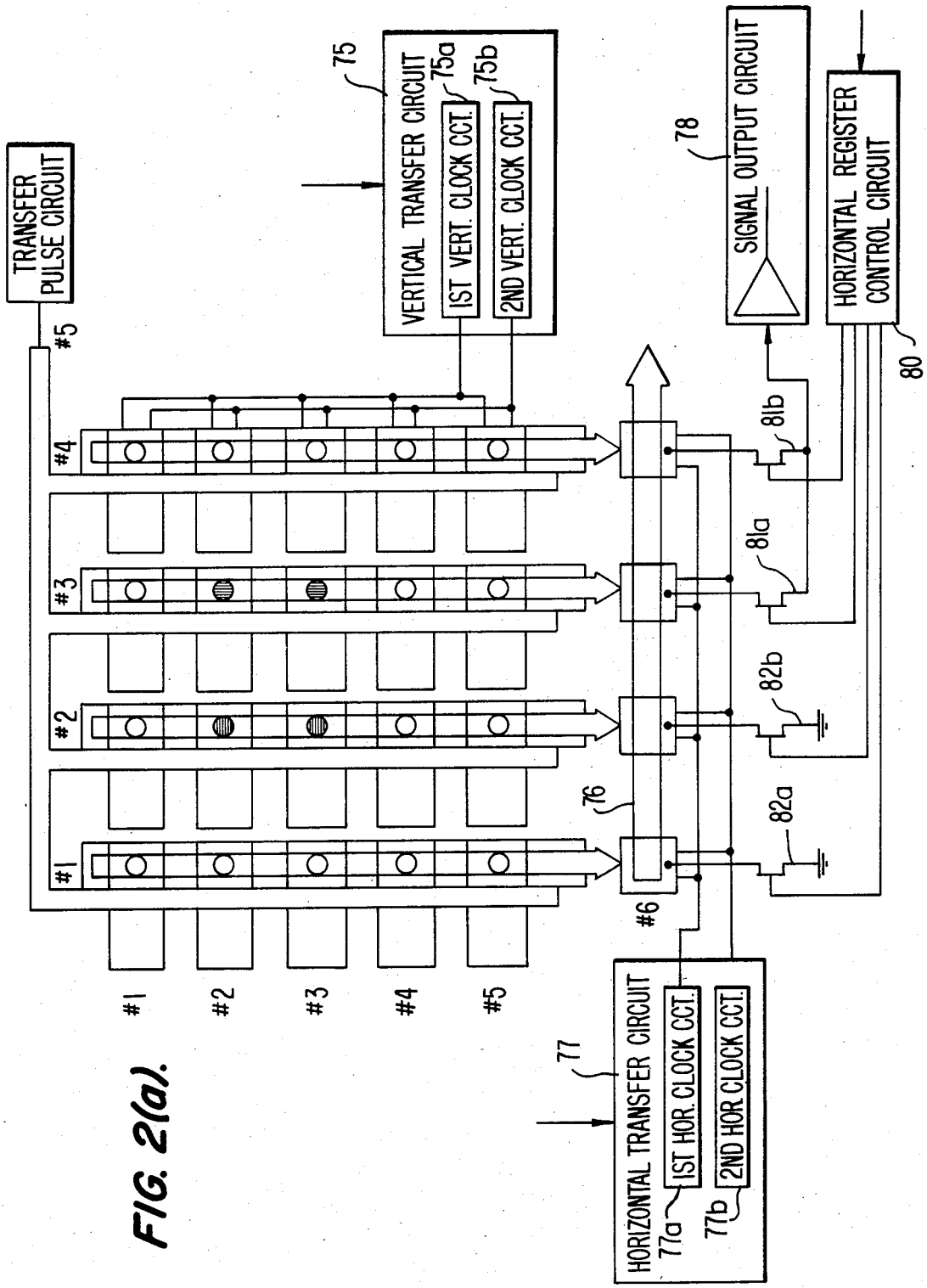
FIGS. 2 (a)–(d) are diagrams for explaining the operating principle of an electric charge transfer control system employed for an image pickup element unit.

It has been explained with reference to embodiment 1 of this invention that provision of greater control ranges in the horizontal direction cannot be attained without control of the time axis or use of a structure permitting transfer en masse of picture elements carrying picture information. Another embodiment has also been shown, one equipped with a time axis control circuit (78a). However, the addition of such a time axis control circuit is likely to increase production costs because of the increased unit picture element area and the increased number of parts needed; as well, an adverse effect upon picture qualities increases due to the control of the time axis. In embodiment 2, a horizontal transfer channel control circuit (80) is added to the setting of embodiment 1, as shown in FIG. 2(a). Here, output unit control switches (SW81a and 81b) are provided which change the levels of transfer outputs fed to individual transfer channels in the horizontal transfer channel (76) under the control of the transfer output control circuit (80a) included in said horizontal transfer control circuit (80), pickup outlets for the outputs from the horizontal transfer channel (76) being controlled depending on the horizontal sway information fed from the horizontal control circuit (11b), which constitutes the major difference from embodiment 1. Since output pickup outlets are selected with the output control switches (SW81a and 81b) jumping unwanted transfer channels, there is no need to increase the horizontal transfer speed to match the sway intensity. This feature provides a control range in the horizontal direction which is equal to or greater than that in the pitch direction, irrespective of the limitation on transfer speed.

Furthermore, by adding a reset circuit (80b), only the pieces of picture element information unnecessary after correction can be swept selectively to ground, etc. to prevent deterioration of picture quality that otherwise may result from the electric charges remaining in the horizontal transfer channel (76). If a charge removal terminal is provided in each of the photosensitive picture elements (71), after-images can be erased by resetting the photoelectrically converted pieces of information in the photosensitive picture elements (71) during the light receiving period for one field or frame by activating the charge removal circuit. When greater amounts of movements accompany the removal within the vertical blanking period, i.e. at an interval of 1/60 second, of charges remaining after the movement of the frame (screen) 20% sway in the screen for 5 Hz with 600 horizontal picture elements, for example, when photo information equivalent to 10 picture elements will pass through one photosensitive picture element (71) during one field, then an accumulation, in one picture element, of information contained in a plurality of picture elements occurs. Therefore, degradation in picture quality is inevitable even with correction at the time of readout. In the case of this example, since the above mentioned 10 picture elements can be detected with the control circuit, a method is employed here in which charges are removed during the field period by activating the charge removal circuit (66). In this case, by so controlling the charge removal circuit that the exposure time becomes 1/10, only the information for the desired picture element out of the ten that pass through is taken over onto the respective photosensitive picture element (71). If the amount of movement of the optical images formed on the image-forming plane is small, the charge removal circuit is left inoperative, and by increasing the number of charge removals by the charge removal circuit as amount of movements increases for extending the charge removal time, influence from afterimages decreases as a matter of course and degradation in picture quality can thus be avoided. This method can reduce afterimages on the same principle as when the shutter speed is increased in a still camera, but on the other hand, this lowers sensitivity. To cope with this problem, the system is equipped with a function in which charge removal circuit activates the iris drive unit to increase the amount of light received, or raises the amplification of the signal output circuit (78) in case of a sudden increase in sway, thus offsetting any reduction in screen brightness.

Figure 2B:
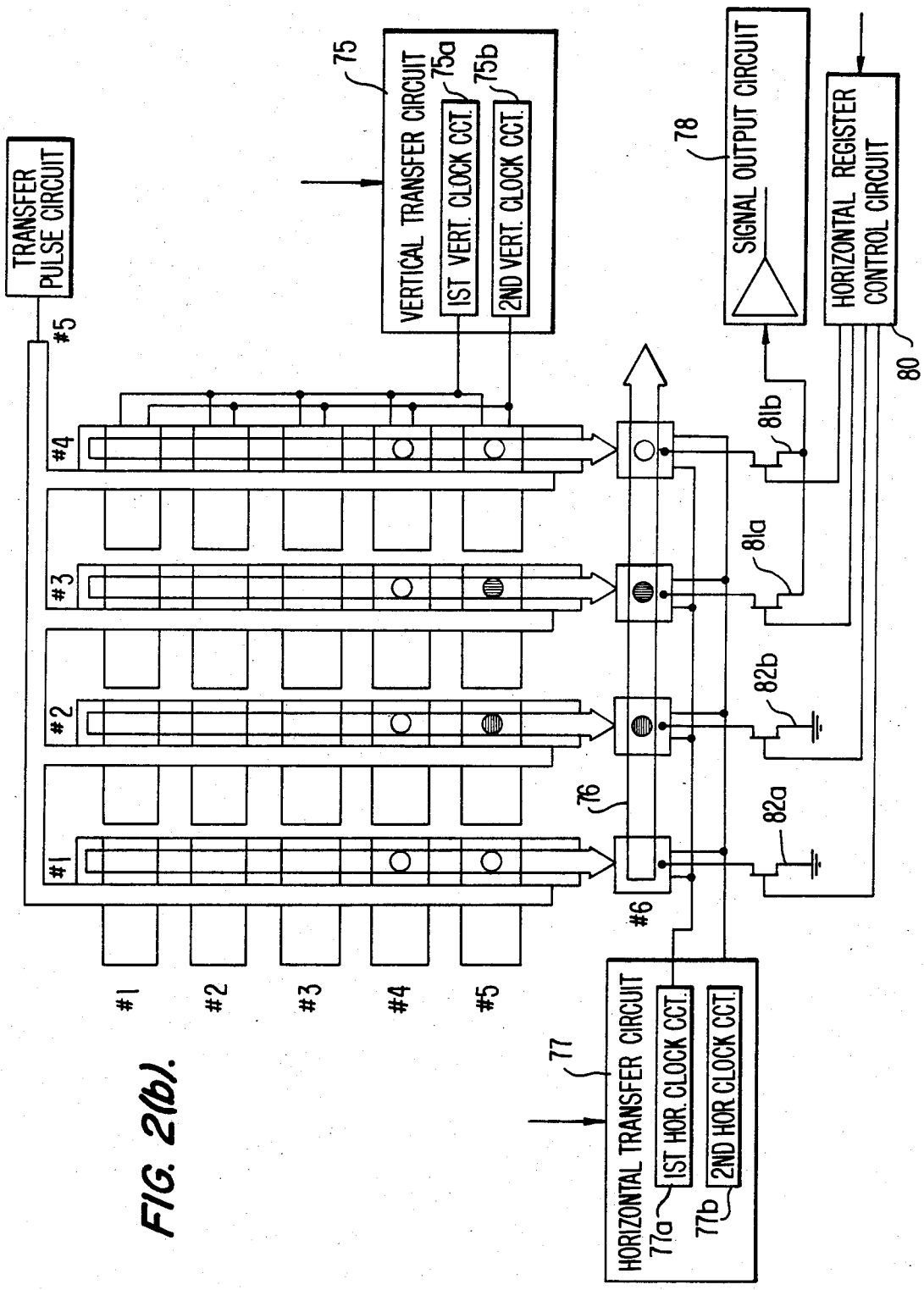
Figure 2C:
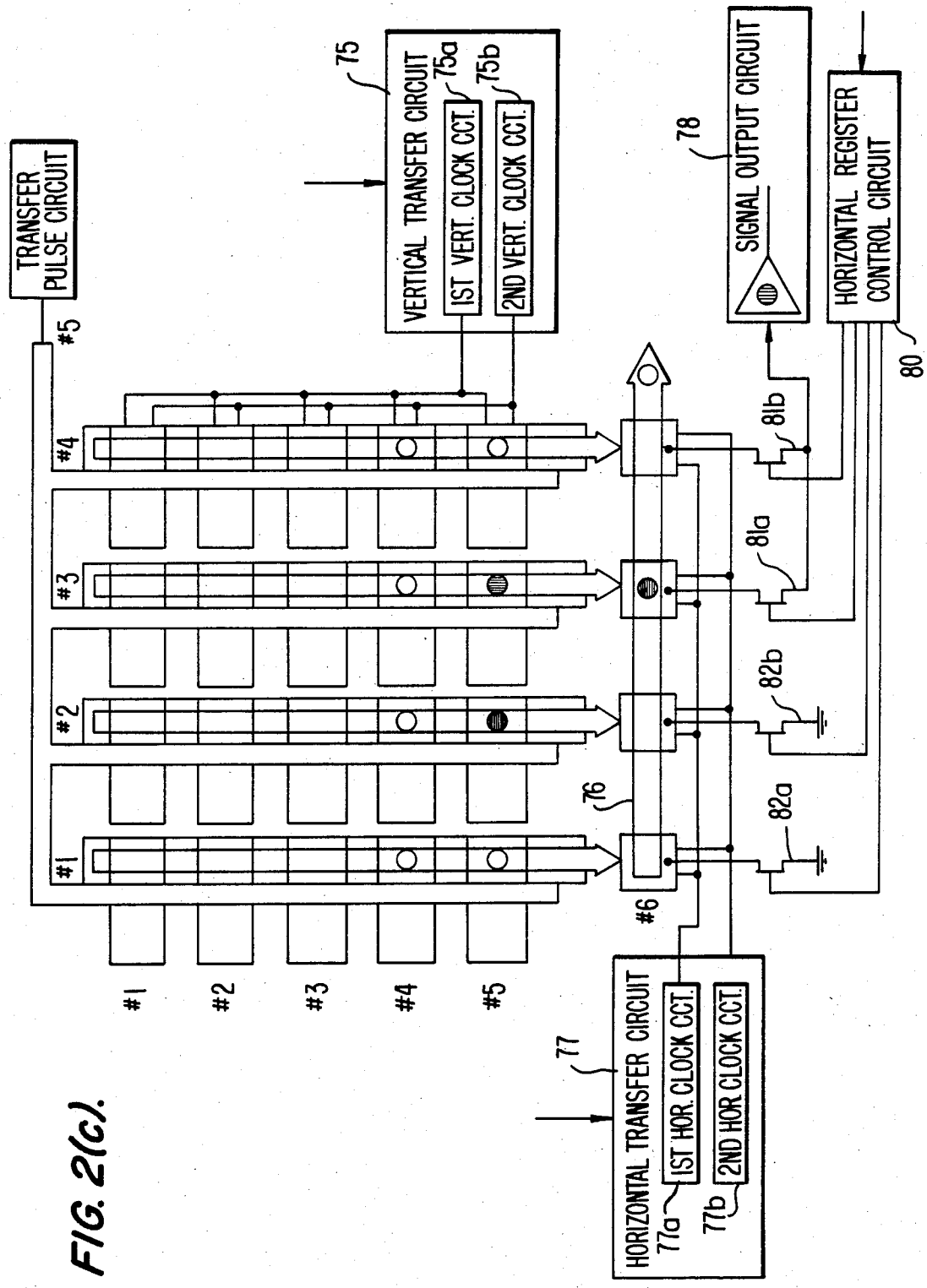

Examples of the actual operation of such a horizontal register control circuit are shown in FIG. 2(a) through 2(d). As with FIG. 1(a), black circles in FIG. 2(a) represent pieces of picture information needed after correction, while FIG. 2(b) shows the state after completion of vertical transfer with necessary correction. When electric charges for desired picture elements have been transferred onto the horizontal transfer channel (76), the desired picture element information located at the coordinate (3, 6) is delivered to the signal output circuit (78) as shown in FIG. 2(c) by turning ON the output control switch SW81a, in this case. In embodiment 1, when the system is so controlled as to allow transfer at high speed for each transfer channel, the control range in the horizontal direction is subject to restriction by the limitation on transfer speeds. However, in this embodiment, output signal pickup outlets can be changed on the horizontal transfer channels, with the advantageous effect of expanding the control range in the horizontal direction, irrespective of the limitation on transfer speeds, as a certain number of horizontal transfer channels can be skipped.

Figure 2D:
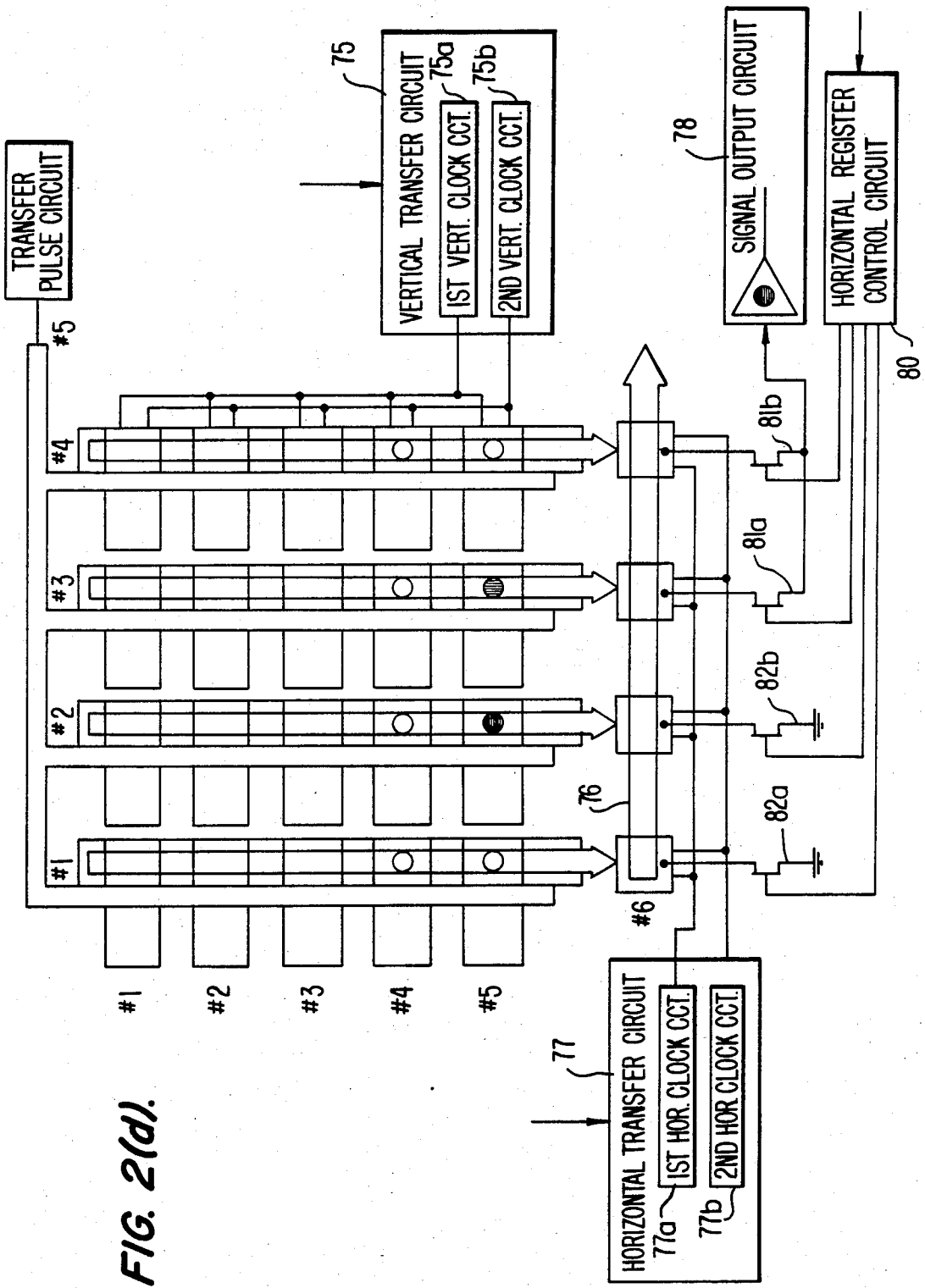

Though not absolutely necessary, unwanted picture element information on the horizontal transfer channels can be removed by turning ON the reset switch (SW82a) under the control of the reset circuit (80b) as shown with coordinates (1, 6) in FIG. 2(b) and (1, 6) and (2, 6) in FIG. 2(c). Also, upon completion of reading of the necessary picture element information, no more electric charges remain on the horizontal transfer channels (76) as shown in FIG. 2(d), in preparation for vertical transfer of the picture element information carried by the subsequent scanning lines.

As described above, this embodiment of the invention, which is capable of jumped output along the horizontal transfer channels, offers the advantage of compact, low cost image pickup device with wider control range in vertical direction without increased transfer speed in the horizontal direction, because it allows wider control range in the horizontal or pitch direction within the framework of the image pickup device.

EMBODIMENT 3

In embodiment 2, electric charge removal is provided for the photosensitive picture elements (71), to cope with the movement of optical images at higher changing speeds, by extending the duration of electric charge discharge time as the speed of change increases. In other words, it shortens the electric charge accumulation time in the photosensitive picture elements, accompanying photoelectric conversion. This is equivalent to shortening exposure time or increasing the shutter time in a still camera to cope with greater target sway. While it allows a corrected clear picture, sensitivity will be degraded commensurate with exposure time shortening. Though it presents no problem for operation outdoors during daytime, it does pose a problem when taking pictures indoors at night. The CCD type image pickup board used in this method transfers electric charges accumulated in the wells by changing the voltages applied across the electrodes provided at the upper part of the charge-carrying wells, thus moving them. For explanatory purpose, it is often likened to the method of carrying water from one person to another in a succession of buckets. If this analogy is used for better understanding of the principle, conventional CCD image pickup devices hold such "buckets" during the exposure time and accumulate electric charges created by the photoelectric conversion occurring during one frame or one field in the "buckets" thus held still in their places. As vertical blanking starts, all the electric charges accumulated in the "buckets" of the photosensitive picture elements (71) are transferred to the adjacent "buckets" in the associated transfer picture elements (72) (the inter-line method), or those contained in all the "buckets" belonging to all the picture elements for one frame are transferred all together to the separately arranged frame accumulation unit (the frame transfer method). Of these two methods employed in conventional image pickup devices, those disclosed in embodiments 1 and 2 of this invention employ that of holding picture element information in the photosensitive picture elements (71) for one field or one frame.

In this connection, the method for changing the exposure time to match the speed of sway, as explained, is employed to cope with the case in which such picture sway cannot be corrected within the set period of 1/30 second or 1/60 second, or the scanning period for one frame or field, which corresponds to normal exposure time. This means that unwanted electric charges accumulated in the "buckets" in the photosensitive picture elements (71) are dumped if picture sway takes place at high speeds, thus resulting in commensurate degradation in sensitivity. In order to avoid such deterioration in sensitivity, the method employed in embodiment 3 permits transfer of electric charges for individual picture elements accumulated in the "buckets" in the photosensitive picture elements (71), even during the scanning period for one field or one frame, on a real-time basis according to the vertically bidirectional picture sway (i.e. up and down) and the horizontally bidirectional sway (i.e. to right and left) in the same fashion as relaying water in buckets, thus permitting transfer in four directions under the control of the control circuit, unlike unidirectional transfer, as employed in conventional image pickup devices. Following up the movements of the optical images focused on the screen of the image pickup unit accompanying the image sway, electric charges accumulated in individual "buckets" move on a real-time basis during one field or one frame in the controlled direction of correction. Therefore, such electric charges can follow up, no matter how fast the sway of images focused on the image pickup screen; electric charges resulting from photoelectric conversion of picture element information during one field or one frame, which are dumped in the case of embodiment 2, can effectively be accumulated for the duration of one field or one frame, and thus can offer the effect of preventing the reduction in sensitivity resulting from the picture control.

Explanation in detail of this function will be given with reference to FIGS. 3(a) through 3(g). FIG. 3 is the main block diagram showing image pickup unit (5), vertical and horizontal transfer circuits and vertical and horizontal control circuits (11a) and (11b). The solid-state image pickup device of embodiment 3 of this invention uses the arrangement of CCD image pickup elements (5), which is very much like that employed in the conventional frame transfer system, of which the upper half of the image pickup unit (5), as shown in FIG. 3, makes up the light receiving unit (90) composed of the photosensitive picture elements (71) arranged in a matrix. In a practical application for an ultimate output with picture elements in a 500×500 arrangement, the unit comprises at least 1,000×1,000 picture elements; however, for the sake of brevity in the drawing, only part of the picture elements arranged in 6 vertical rows and 7 horizontal columns are shown here. The light receiving unit (90) is connected with the vertical/horizontal transfer circuit (91) which transfers picture information, carried with individual picture elements, bidirectionally in both vertical and horizontal directions (four directions in total), and the vertical and horizontal transfer circuit (91) is connected with the pitch control circuit (11a) and the horizontal control circuit (11b) described in embodiment 2. The vertical control circuit (pitch control circuit) (11a) and the horizontal control circuit (horizontal control circuit) (11b) have internally correction amount calculation units (11h) and (11i), respectively.

Figure 3B:
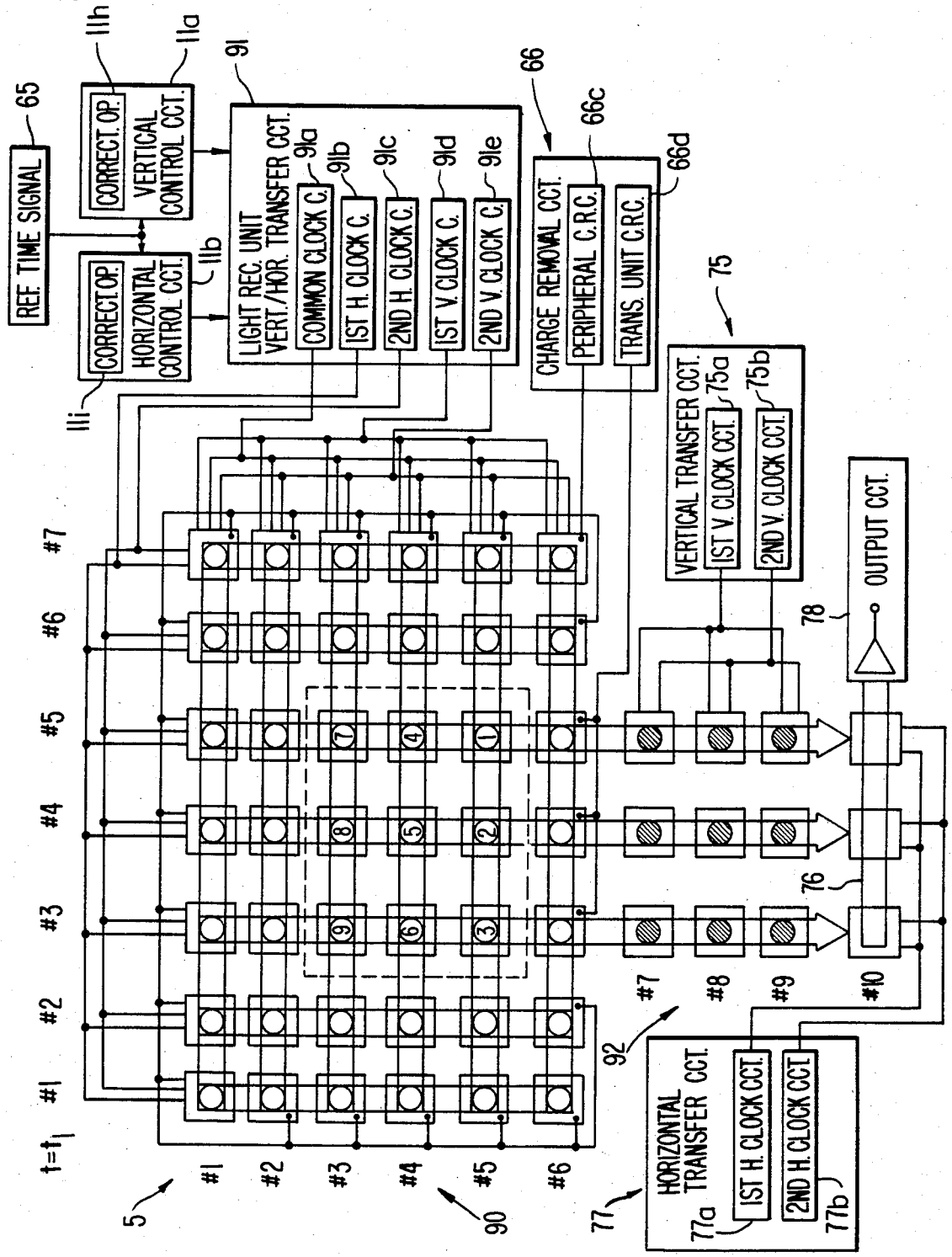
FIG. 3 (a) is a block diagram of a solid-state image pickup device according to an embodiment of this invention.
Figure 3C:
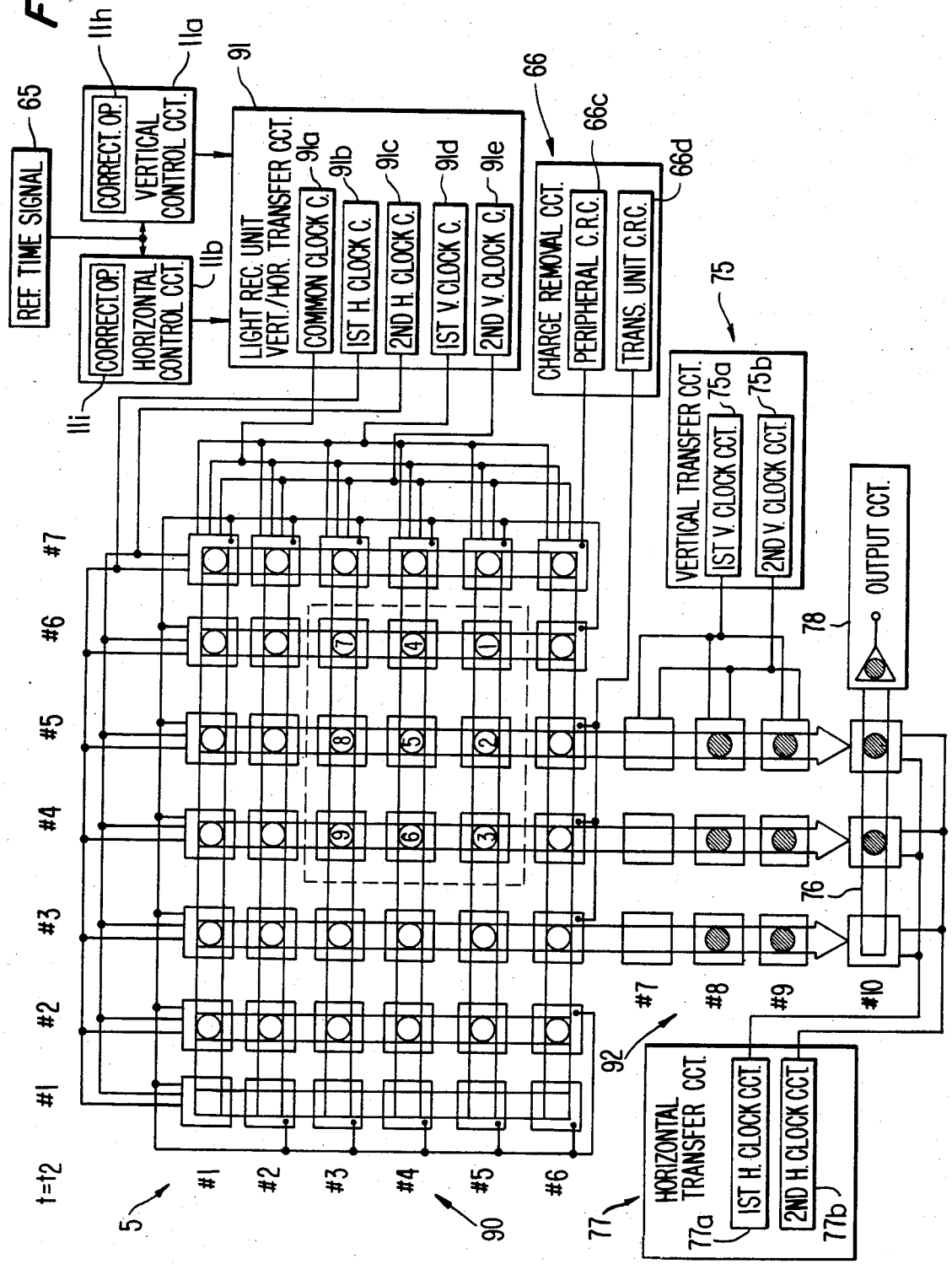

The lower half of the image pickup unit (5) constitutes the accumulation unit (92), where picture element information for one frame or one field is accumulated as a result of the vertical downward transfer of only that part of the picture element information needed for correction done en masse in a short time, chiefly during the vertical blanking period under the control of the horizontal transfer circuit (91) and the vertical transfer circuit (75) at the light receiving unit. In the figure, part of the picture elements are arranged in a matrix of three horizontal columns and in three vertical rows. The accumulation unit (92) in FIG. 3(b) is in the state when transfer for one frame or field has been completed on the condition of $t_2 = t_1$, each piece of accumulated picture element information being indicated with shaded circles.

Consideration is given to removing incoming charges by activating the transfer channel charge removal circuit (66d) so as not to allow electric charges from the light receiving unit (90) to enter the accumulation unit (92) upon completion of the transfer. Until such time as readout for one field or one frame is completed, transfer of picture element information stored in the accumulation unit (92) is taken care of by the vertical transfer circuit (75) and the horizontal transfer circuit (77), independently from the transfer control at the light receiving unit (90), so that they are outputted as picture signals by means of the output circuit (78), to undergo demodulation into color signals.

When $t = t_2$, picture element information transferred downward in the vertical direction by the vertical transfer circuit (75) is fed into the horizontal transfer channels (76). It is then transferred toward the right by the horizontal transfer circuit (77), delivery as image signals then commencing via the output circuit (78).

Figure 3D:
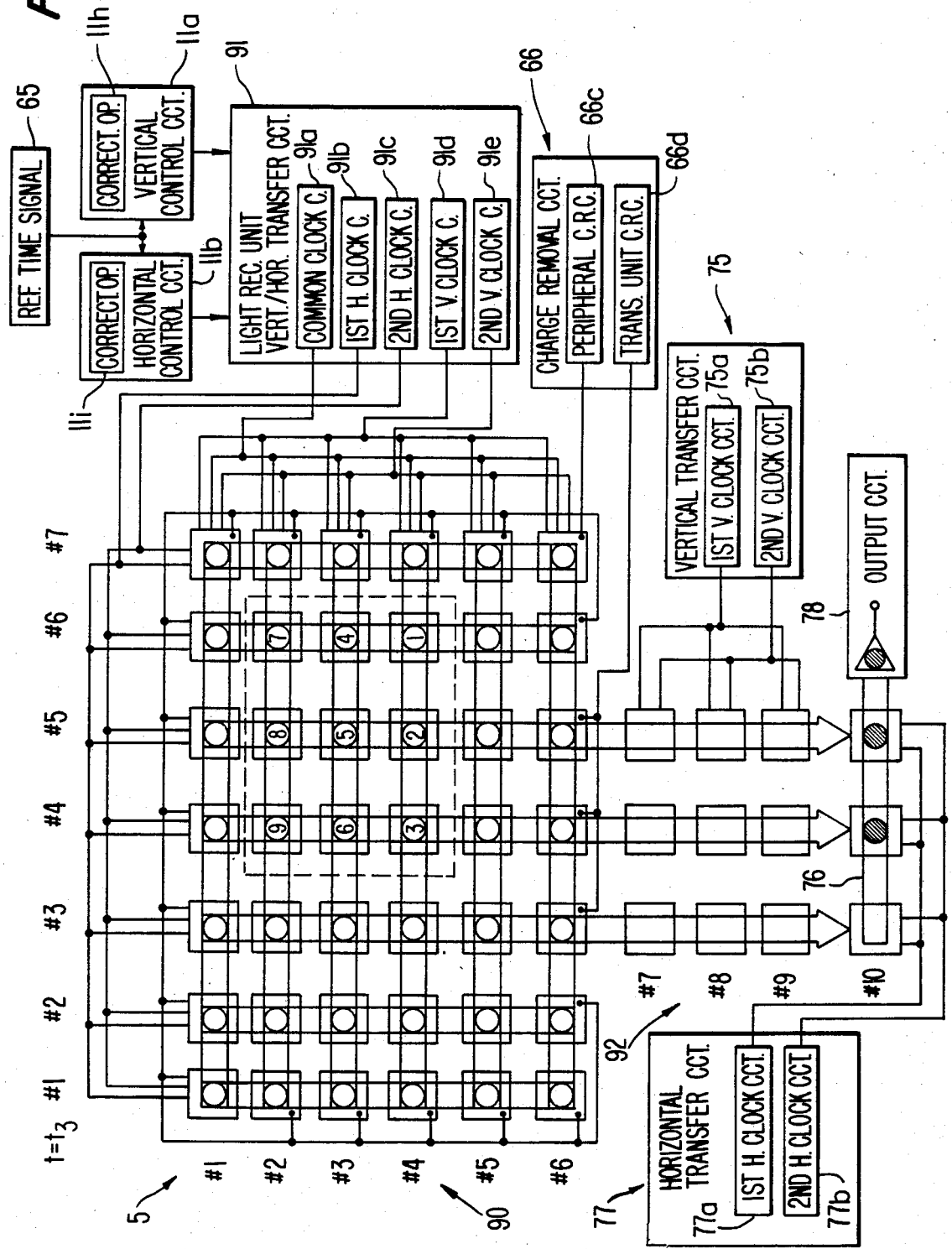
Figure 3E:
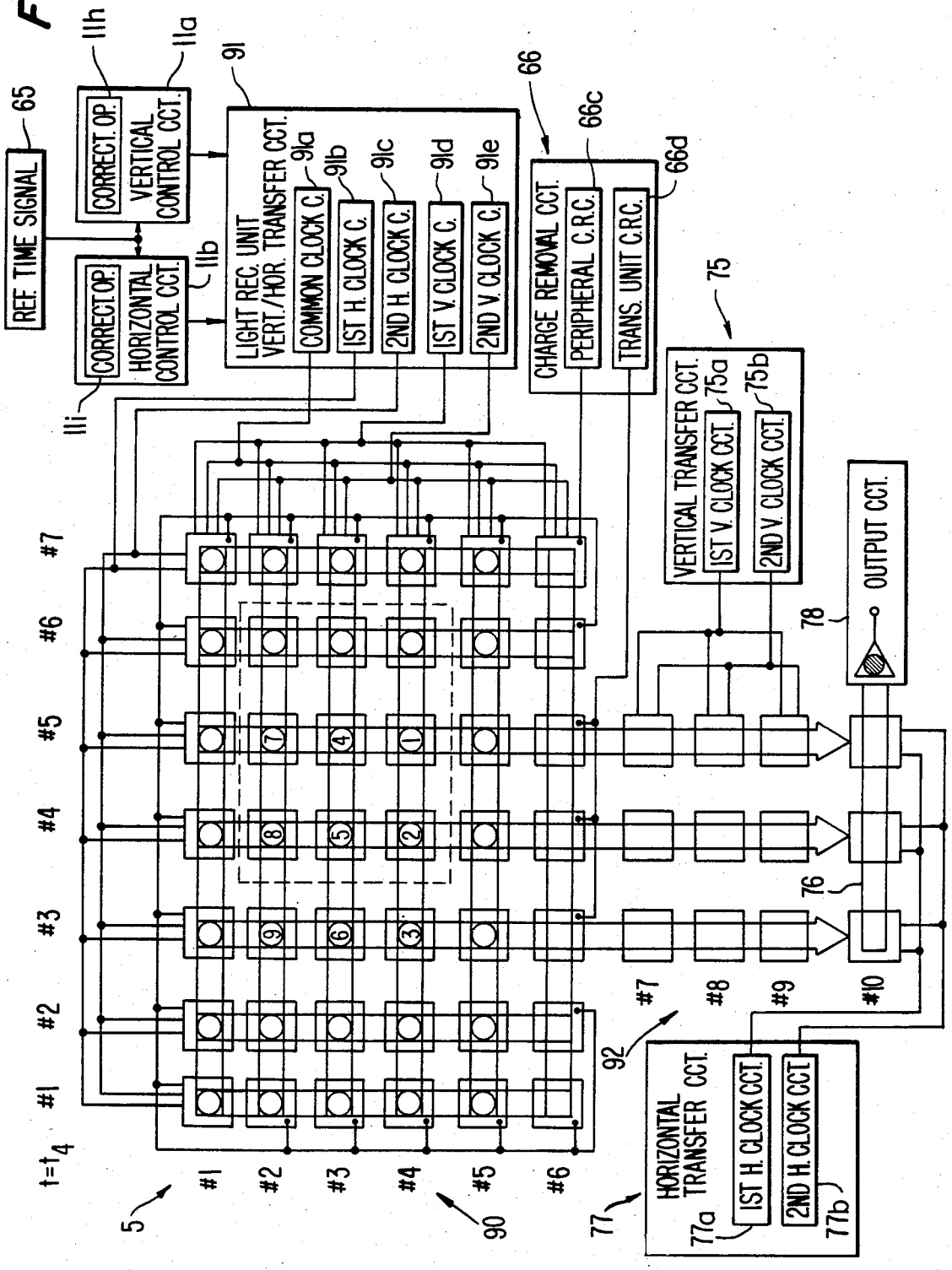
Figure 3F:
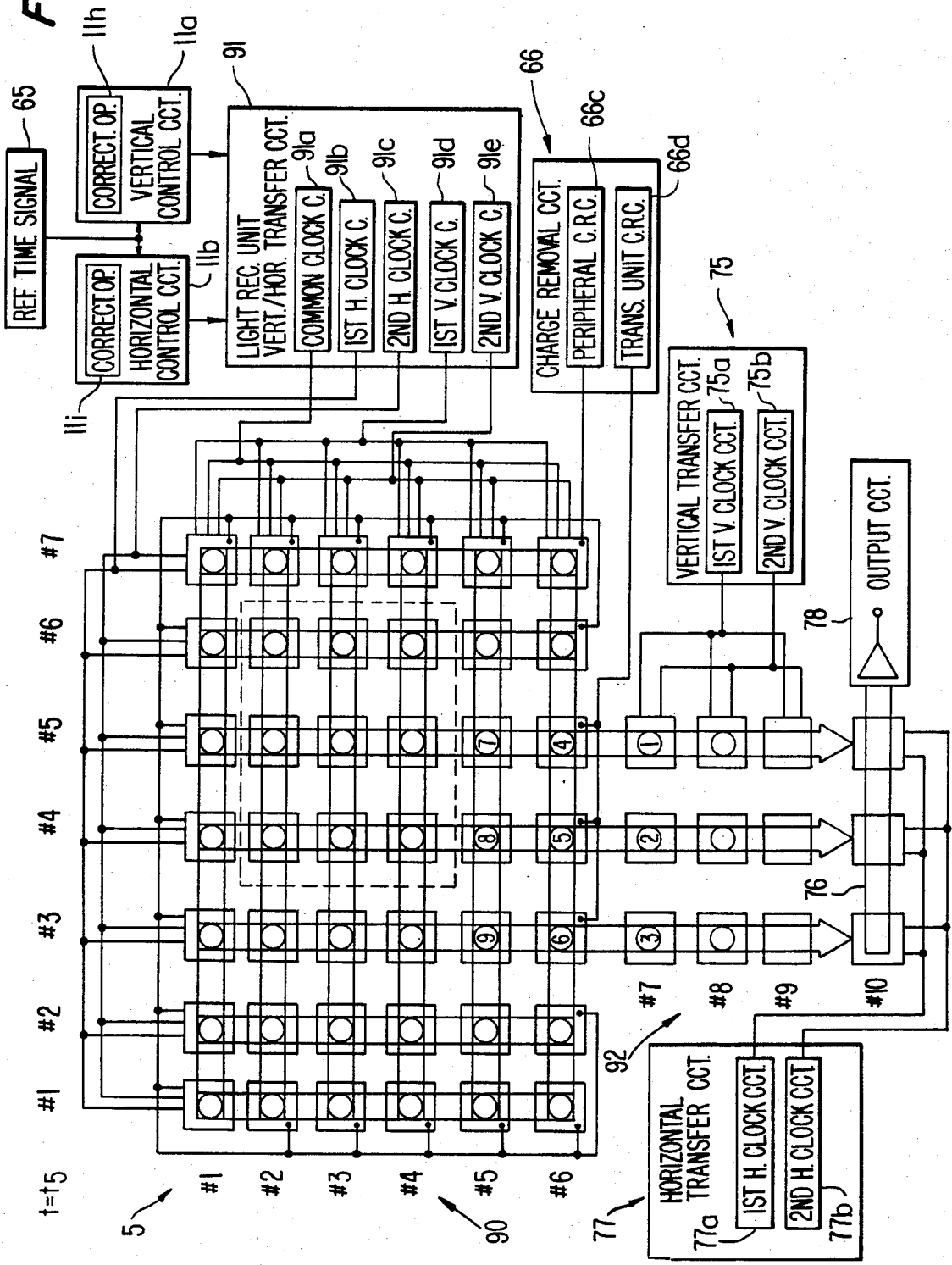
Figure 3G:
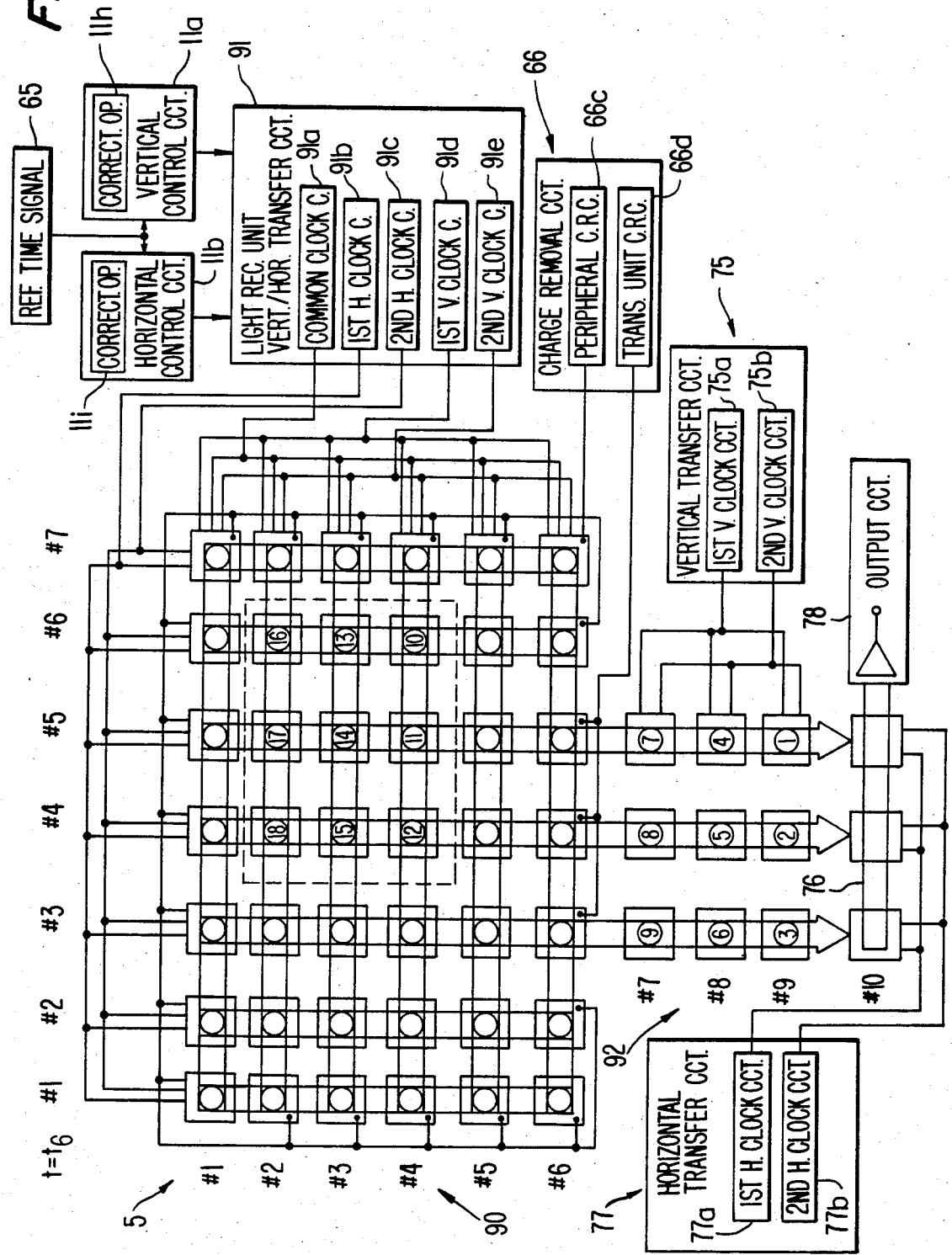
Figure 4A:
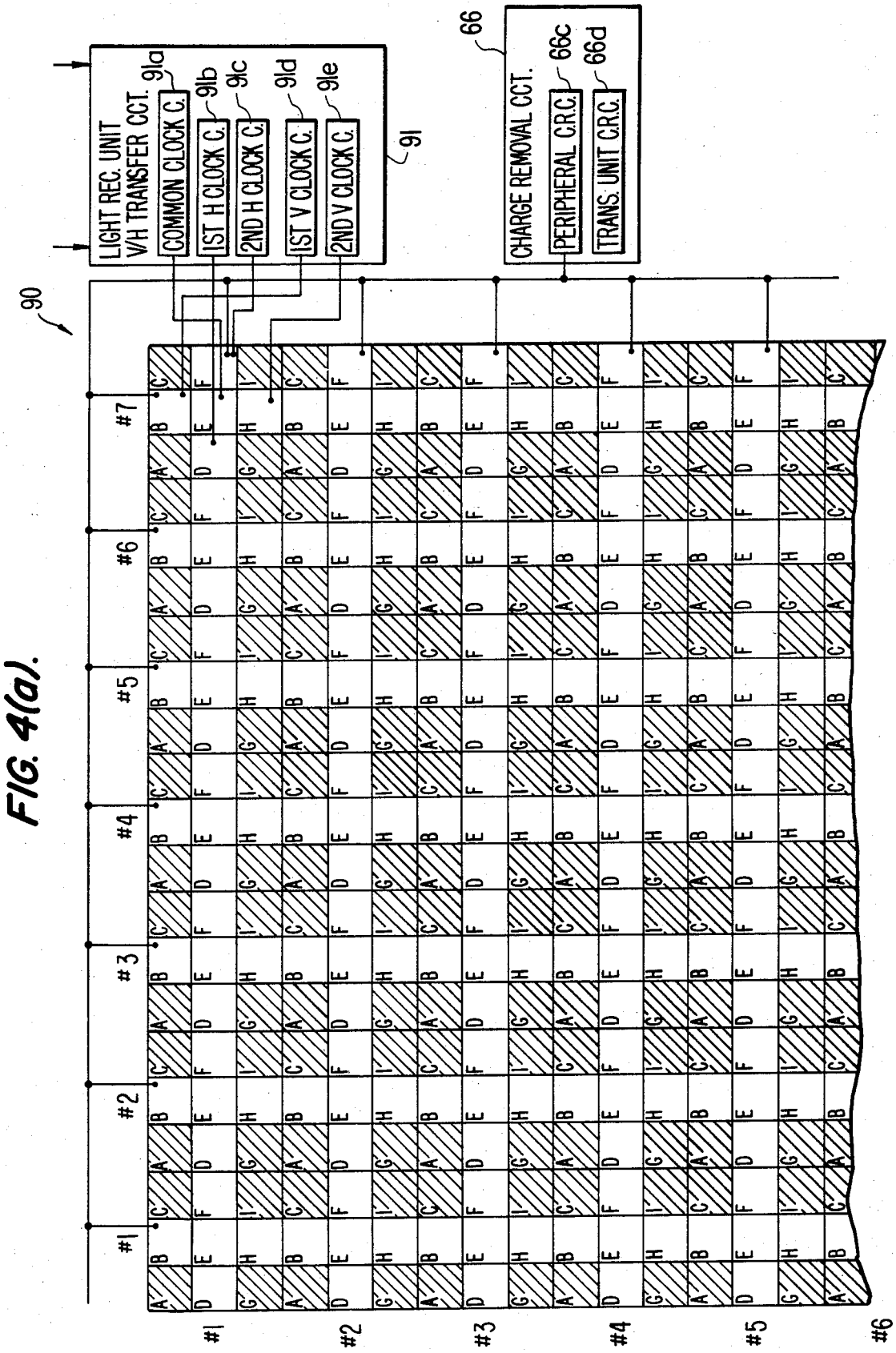
FIG. 4 (a) is an enlarged view of a light receiving unit of the image pickup device according to this invention.
Figure 4B:
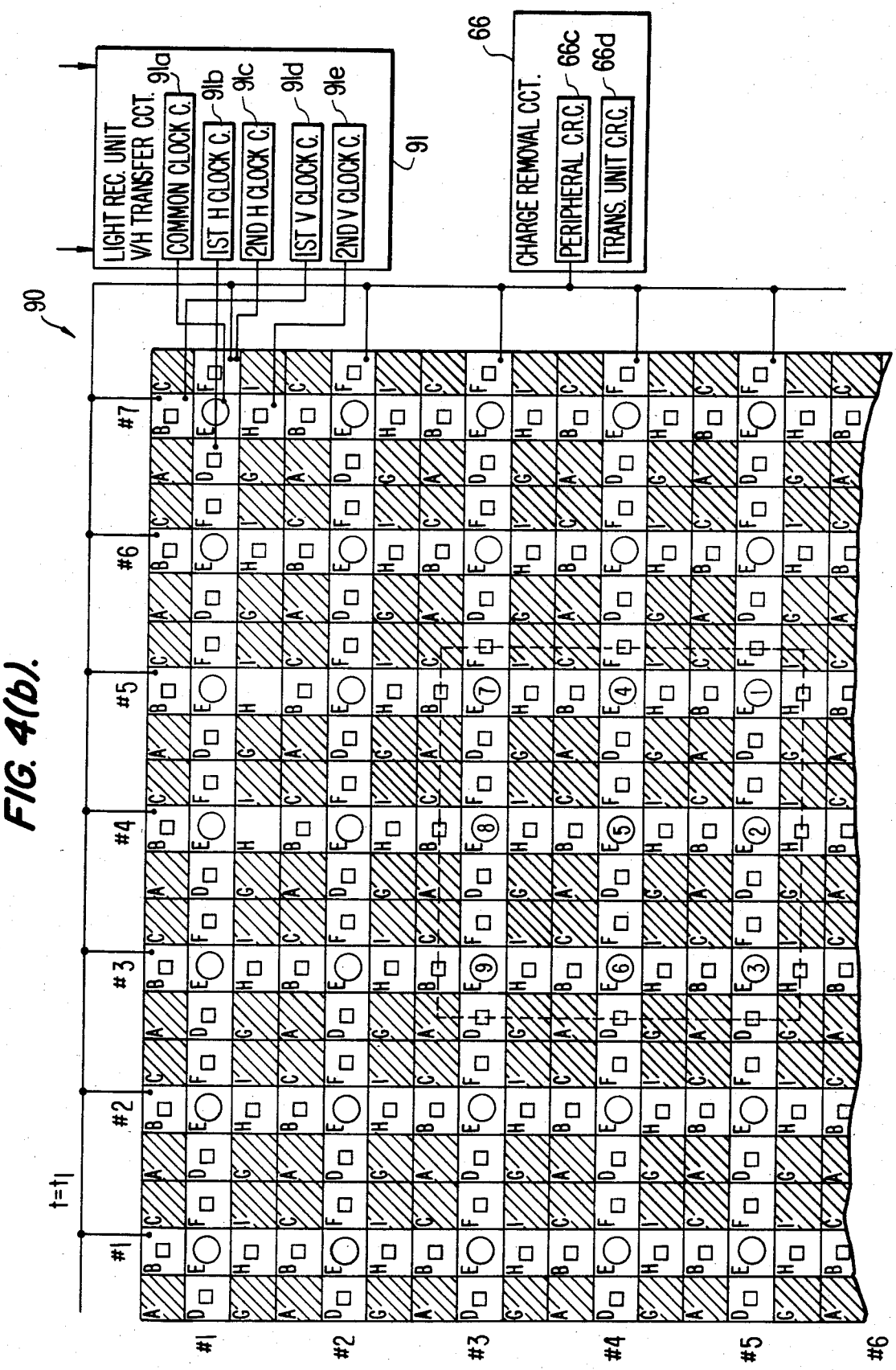
Figure 4C:
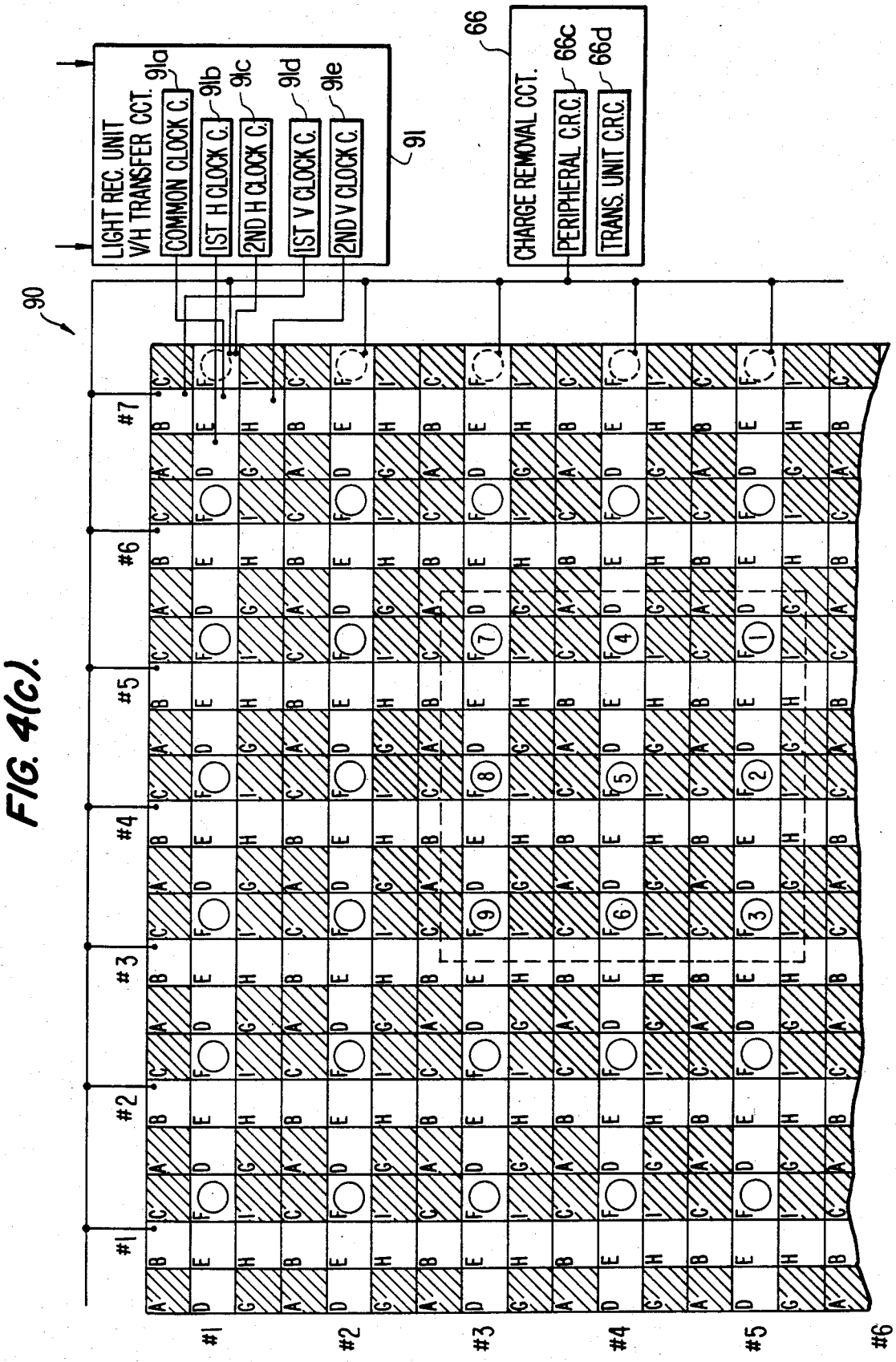
Figure 4D:
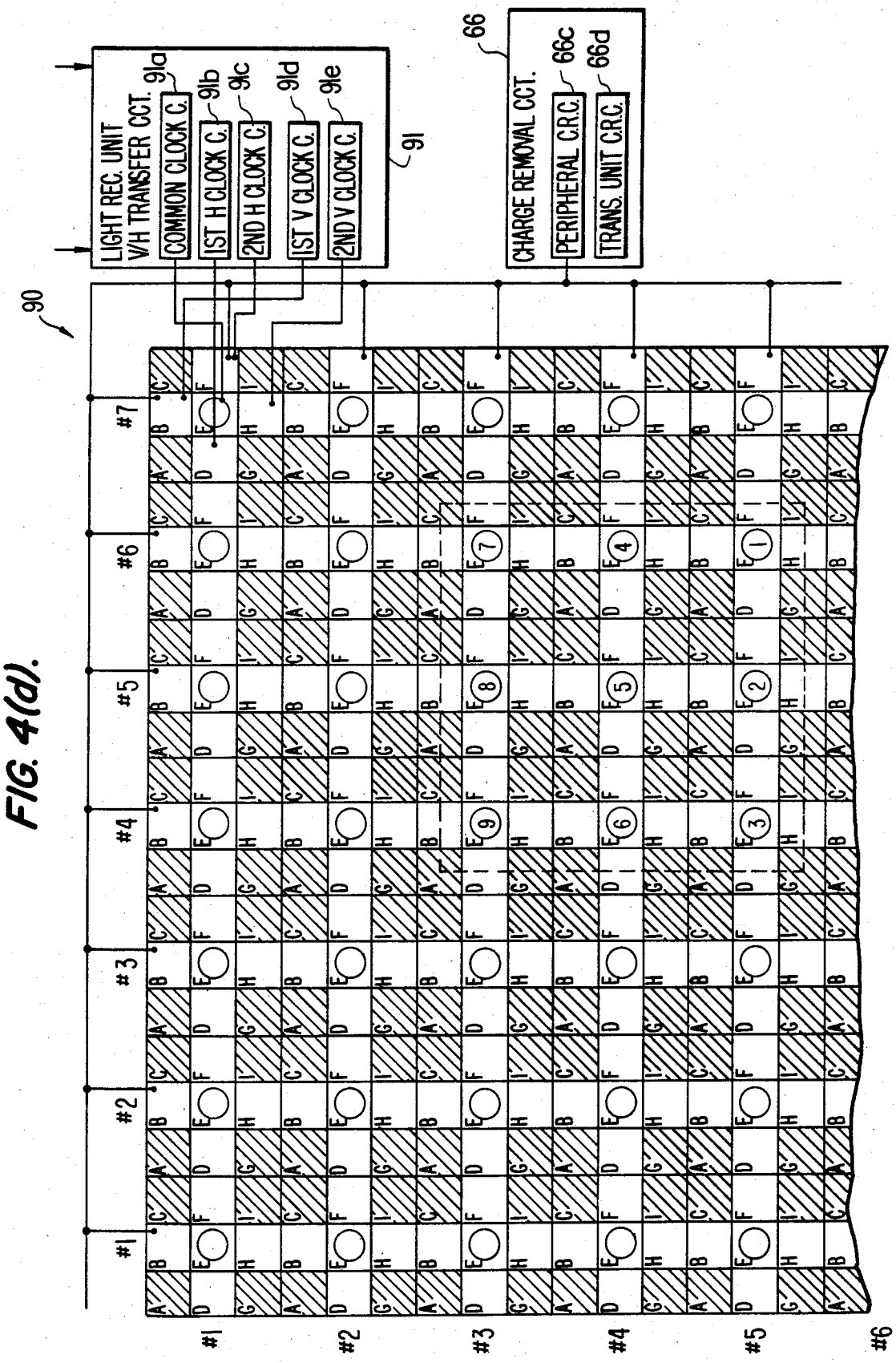
Figure 4E:
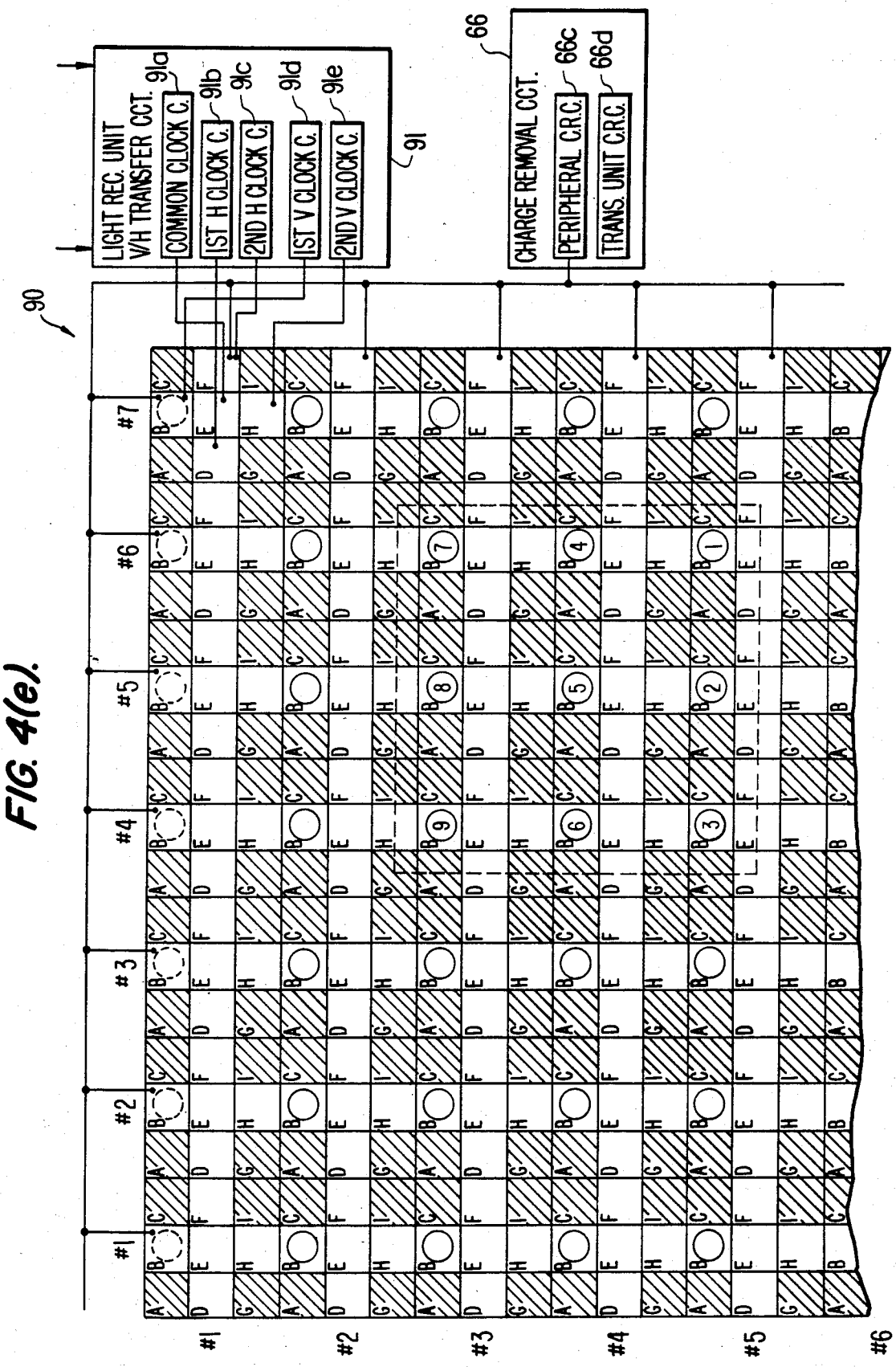
Figure 4F:
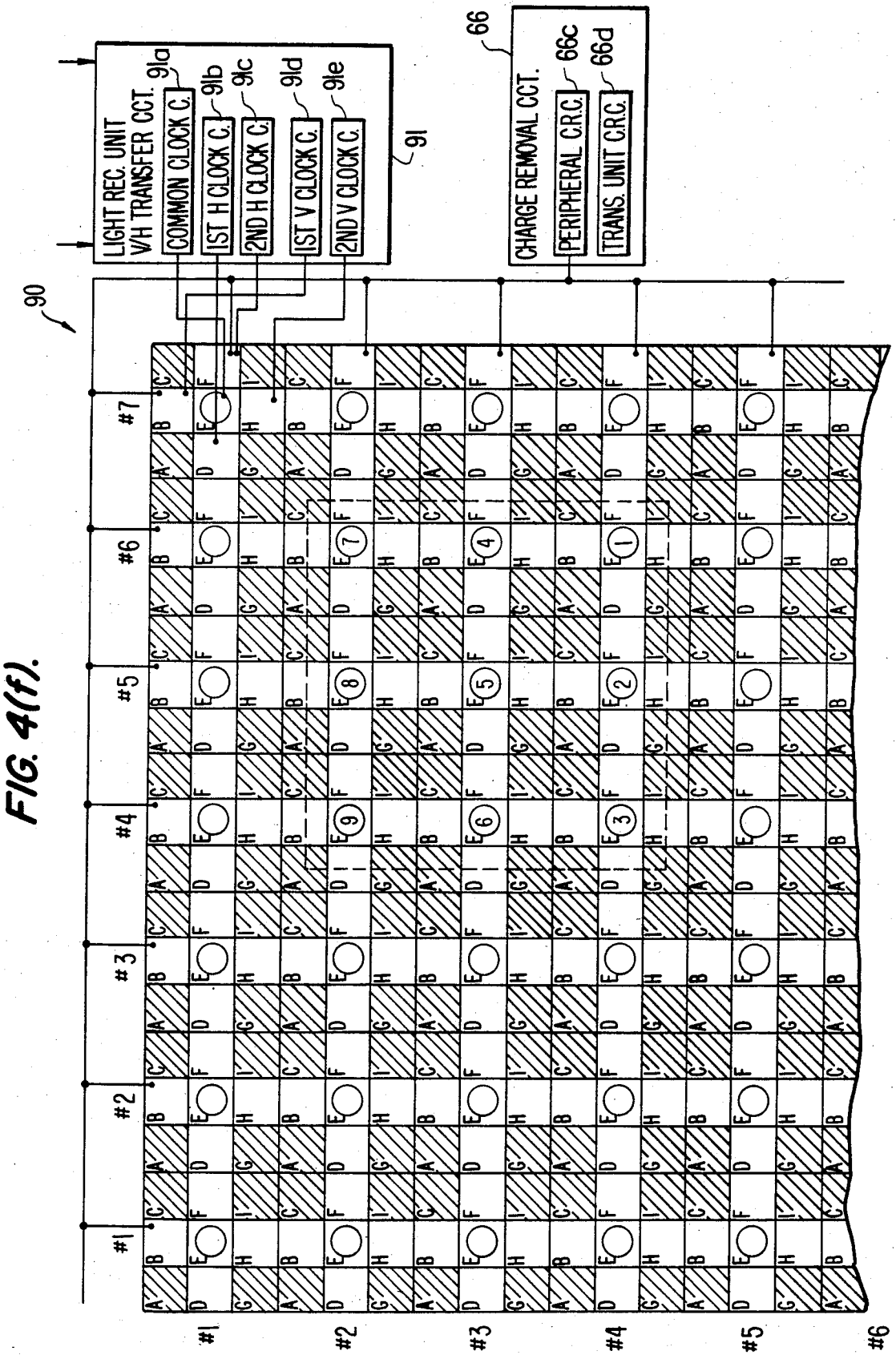

At $t = t_3$, scanning for the last scanning line is performed as shown in FIG. 3(d). At $t = t_4$, readout of all picture element information is completed for entering the vertical blanking period. Subsequently, charge mixture prevention, carried out by the transfer channel charge removal circuit (66d), which blocks entry of electric charge from the light receiving unit (90) to the accumulation unit (92), is suspended, permitting the transfer of electric charges from the light receiving unit (90) to the accumulation unit (92). At $t = t_5$, picture element information at the light receiving unit (90) is transferred by activating the vertical/horizontal transfer circuit (91) at the light receiving unit (90) and the vertical transfer circuit (75) as shown in FIG. 3(f). At $t = t_6$, transfer of the pieces of needed picture element information (identified by circles numbered 1 through 9 from the light receiving unit (90) is completed as shown in FIG. 3(g), and the transfer channel charge removal circuit (66d) is activated again to remove the charges accumulated in the cells at the coordinates (3, 6), (4, 6) and (5, 6) so as to block the inflow of electric charges from the light receiving unit (90) to the accumulation unit (92). Through these operations, the initial state of the field or frame scanning cycle at $t = t_1$ is restored; thereafter the light receiving unit (90) and the accumulation unit (92) perform separate charge transfer operations independently until the subsequent vertical blanking period comes round. As described above, neither the vertical transfer circuit (75) nor the horizontal transfer circuit (77) in the accumulation unit (92) in embodiment 3 has an image correction function to handle picture sway on its own; the control of the picture correction to compensate for sway is carried out via the vertical/horizontal transfer circuit (91) in the light receiving unit (90) during the light receiving period for one field or one frame.

Now, let us explain how picture correction control is done at the light receiving unit (90). When a change in the picture output control is desired, an electrical signal corresponding to the degree of optimum sway correction control for the image on the screen at the image pickup unit (5) is fed from the vertical control circuit (11a) and the horizontal control circuit (11b) to the vertical horizontal transfer circuit (91) at the light receiving unit.

In this instance, embodiment 3 of the invention differs greatly from embodiments 1 and 2; in the latter cases, no electric charges are transferred during the scanning period for one field or one frame in the vertical and horizontal directions for picture correction, which is accomplished chiefly by transferring electric charges to correction in the vertical and horizontal directions during the vertical blanking period. In embodiment 3, by contrast, real time electric charge transfer in four directions vertically (up and down and horizontally right and left) is carried out chiefly during the light receiving period of picture element information for one field or one frame, as shown in FIGS. 5(a) (a) through 5(e) (to be described later) by transferring well potential in the CCD board in response to the picture control signals, which control transfer in either the vertical or horizontal direction. Now, let the light receiving unit (90) comprise photosensitive picture elements (71) arranged in 7 columns horizontally and 6 rows vertically, and let there be at $t=t_1$ picture element information as indicated, with a total of $7\times 6=42$, picture elements marked with circles, with the image of the object intended formed within the range marked with the dotted line rectangle, i.e., on the picture elements numbered 1 through 9. In this case, photoelectric conversion takes place at photosensitive picture elements 1 to 9 of the photosensitive unit (71), the electric charges corresponding to each fraction of the picture information of the object being accumulated in the potential well in each picture element during exposure, as shown in FIG. 5 (b) (to be described later).

Suppose sway in the horizontal direction occurs before the completion of the time period for one field or one frame and before the next stage ($t=t_2$) is reached, causing the optically formed image of the object to move to the range defined with broken lines connecting the coordinates (4)–(6) in the horizontal direction and the coordinates (3)–(5) in the vertical direction. If nothing is done to counter this, one picture element, representing a plurality of pieces of element information that have passed through during the light receiving period, is mixed in, blurring the picture. In the present invention, the necessary amount of correction in the horizontal direction is output from the horizontal control circuit (11b). Based on this information, the vertical/horizontal transfer circuit (91) at the light receiving unit transfers electric charges in the associated picture elements in the horizontal direction only in the amount required for correction. As a result, the electric charges based on the picture element information, as indicated with the coordinates (3)–(5) in the horizontal direction and the coordinates (3)–(5) in the vertical direction, at $t=t_1$, as shown in FIG. 3 (b), are transferred in the horizontal direction (without being dumped, as in embodiments 1 and 2). In this way, movements of the intended object are followed up with charges being taken over by the adjacent cells in succession. As a result, even for swift picture range correction control signals directing transfer in the horizontal direction, there is no need to suspend the accumulation of electric charges resulting from the photoelectric conversion of the light received from the object, as with the former embodiments, so long as it falls within the range of the preset transfer speed. According to simple calculations on the assumption that the transfer speed is 100 ns per unit picture element, taking the number of picture elements making up one side of the ultimate output screen to be 500 and the sway amplitude to be 100% (or the worst value conceivable) it turns out that $10^7$ as many picture elements can be transferred within one second, which means that it can follow up control signals in the horizontal direction applied at an extremely high speed of 20,000 Hz over a 100% area of the screen, permitting remarkable improvement in the correction control frequency characteristic over conventional control methods. Yet, no reduction in sensitivity results. Since improved frequency characteristic in the vertical direction can be attained in the same manner, this leads to marked improvement in the correction control frequencies in both the vertical and horizontal directions, with no restrictions in this regard except for the limitation arising from the frequency characteristics of the means of correction amount detection. Diagonal sway can also be corrected at high speed by combining horizontal and vertical corrections. Such an ultra-high speed response offers various advantages if used for control, depending on the specific means of sway detection employed, in such applications as input unit for industrial picture perception systems or video cameras for home use, etc.

For example, in electronic cameras for home use, for which the movement for a unified product standard is now under way, blurred picture due to camera sway poses a problem with conventional solid-state image pickup devices, owing to the shutter time of 1/60 second or the scanning period for one field. Though shortened exposure time may be employed as a countermeasure, as explained in the former embodiments of the invention, this approach presents another problem, that of degraded sensitivity. The use of image pickup elements as disclosed with embodiment 3 of the invention, however, means the attainment of an equivalent shutter speed of $10^{-7}$ second at maximum, to cope with the problem of camera sway in taking pictures of still objects, thus achieving an electronic camera free from sway in practical application.

Of course, the shutter speed remains at 1/60 second for taking pictures of moving objects in the one field exposure method, provision of additional means becoming necessary to have the moving object stand still by either shortening exposure time electronically or by adding extra moving object sensing means. However, most sway results from unsecure holding of the camera. The problem of blurred picture commonly experienced with electronic cameras is also attributable rather to an unsecurely held camera than the movement of the object, as is often experienced pictures taken with telescopic lenses. Therefore, this problem can be minimized by providing means for detecting the positions of camera bodies. Thus, this type of image pick up device offers the possibility of realizing an electronic camera with such ultra-high speed response as to allow handheld pictures of still objects with a telescopic lens. The solid-state image pickup device in this embodiment can also be adapted to video cameras for use in broadcasting stations, as well as to video cameras for home use. As you may have experienced when slow motion viewing a videotaped night baseball game, for example, unit images drift when the camera is swung round, even though set on a rigid pedestal. By using the solid state image pickup elements of this invention, this problem can also be corrected, though such moving objects as baseballs etc. continue to drift as heretofore, still objects such as baseball fields, etc. can be corrected for clear pictures. Thus, the present invention offers the vantage, when adapted to video cameras for broadcasting stations, of providing clear pictures of still objects when broadcasting in slow motion or still pictures without any drifting or reduction in sensitivity, even if the video camera was swung in taking the pictures. As described above, this type of solid-state image pickup element works effectively when used in electronic cameras, video cameras for broadcasting, taking still pictures of scenery, backgrounds, buildings, etc.

By using separately arranged high speed image perception, moving objects can be followed up without the moving camera body and other optical systems mechanically. Thus, when such an image perception means can be made available at lower cost, it offers the possibility of effective correction of pictures of objects moving at high speed.

As to the operating principle, in order to enhance sensitivity, each of the transfer cells located between the light receiving cells for individual picture elements may be given a photoelectric conversion function by employing transparent electrodes. In this way, accumulated electric charge resulting from photoelectric conversion during one field or one frame is not suspended but carried over to adjacent cells in succession, lessening the reduction in sensitivity due to the control of picture reception range.

With the transferral of electric charges as shown in FIGS. 3 (b) to (c), electric charges located at the horizontal coordinate (6) and at the vertical coordinates (1)-(6) in FIG. 3 (b) are merged into those located at the horizontal coordinate (7) and the vertical coordinates (1)-(6); on some occasions they overflow, lowering picture quality due to the blooming effect, etc. To cope with this problem, electric charges at the peripheral positions are removed as transfer progresses through the charge removal channel provided at the peripheral picture elements, under the control of the charge removal circuit (66). By this means, overflow of electric charges at the periphery accompanying transfer is prevented, thus avoiding degradation of picture quality. Instead of such a charge removal circuit, a change dumping channel may be provided for the cells located at the periphery so as to discharge electric charges at all times onto the PC board, etc. It should be noted that the three picture elements at the coordinates (3, 6), (4, 6), and (5, 6) have an important function, as previously described, of preventing degration of output pictures due to leakage of electric charges by blocking charges via the charge removal circuit (66d) arranged for the transfer channels, thereby preventing inflow of charges into the picture element information accumulation unit (92), or effecting removal of such electric charges.

To further explain picture correction in the vertical direction, if the optical image of the object moves upward in the vertical direction (toward the top in the drawing) along the route shown with a broken arrow in FIG. 3 (d) during the time period from $t=t_2$ to $t=t_3$ within the same field or frame scanning period, information on the optimum correction amount is given from the vertical control circuit (11a) to the vertical/horizontal transfer circuit (91) for the light receiving unit, in the same manner as for correction in the horizontal direction. Units of picture element information (circles 1 through 9) that have undergone photoelectric conversion of the object image are transferred, as in the horizontal direction, to the associated parts of the object via the vertical/horizontal transfer circuit (91) for the light receiving unit as shown in FIG. 3 (d); thus the information, composed of individual picture elements of the object, is photoelectrically converted throughout the one field or one frame without stopping. When $t=t_4$ has been reached, after the repetitious controls in the vertical and horizontal directions to complete receiving of light for the picture element information for one field or one frame, the units of picture element information (numbered from 1 through 9) as shown in FIG. 3 (e) are transferred at high speed to the locations of the horizontal coordinates (3)-(5) via the vertical/horizontal transfer circuit (91) for the light receiving unit. Thereafter, they open the picture elements at the coordinates (3, 6), (4, 6) and (5, 6) that have been serving to block the transfer of electric charges by means of the transfer channel charge removal circuit (66d), thereby making it possible to transfer the picture element information to the accumulation unit (92) for the transfer of the units of picture element information (numbered from 1 to 9) in the vertical direction (toward the bottom in the drawing) by means of the vertical and horizontal transfer circuit (91) for the light receiving unit and the vertical transfer circuit (75). At $t=t_5$, units of picture element information of the object are transferred from the light receiving unit (90) to the accumulation unit (92) as shown in FIG. 3 (f). At $t=t_6$, transfer of all picture element information of the object to the accumulation unit (92) is completed within one vertical blanking period as shown in FIG. 3 (g). Since ingress of electric charges from the light receiving unit (90) to the accumulation unit (92) is blocked by the transfer channel charge removal circuit (66d), electric charges in the light receiving unit (90) are transferred separately from those in the accumulation unit (92). As shown in FIG. 3 (b), where $t=t_1$, units of the picture element information for the preceding field or frame in the accumulation unit (92) (numbered 1 to 9) are output as picture signals through the readout circuit (78) after transfer in the vertical and horizontal directions. At the light receiving unit (90), on the other hand, the image of the object is formed in the range indicated by the rectangle in FIG. 3 (g), electric charge accumulation commencing at the photosensitive picture elements (numbered 11 to 18) in the quantities of light received from the object at each of the corresponding picture elements. Also, as described before, as the camera body swings, the accumulated electric charges are transferred under control, via the vertical horizontal transfer circuit (91), in the direction of picture sway correction in the same manner as for the preceding field.

Figure 6:
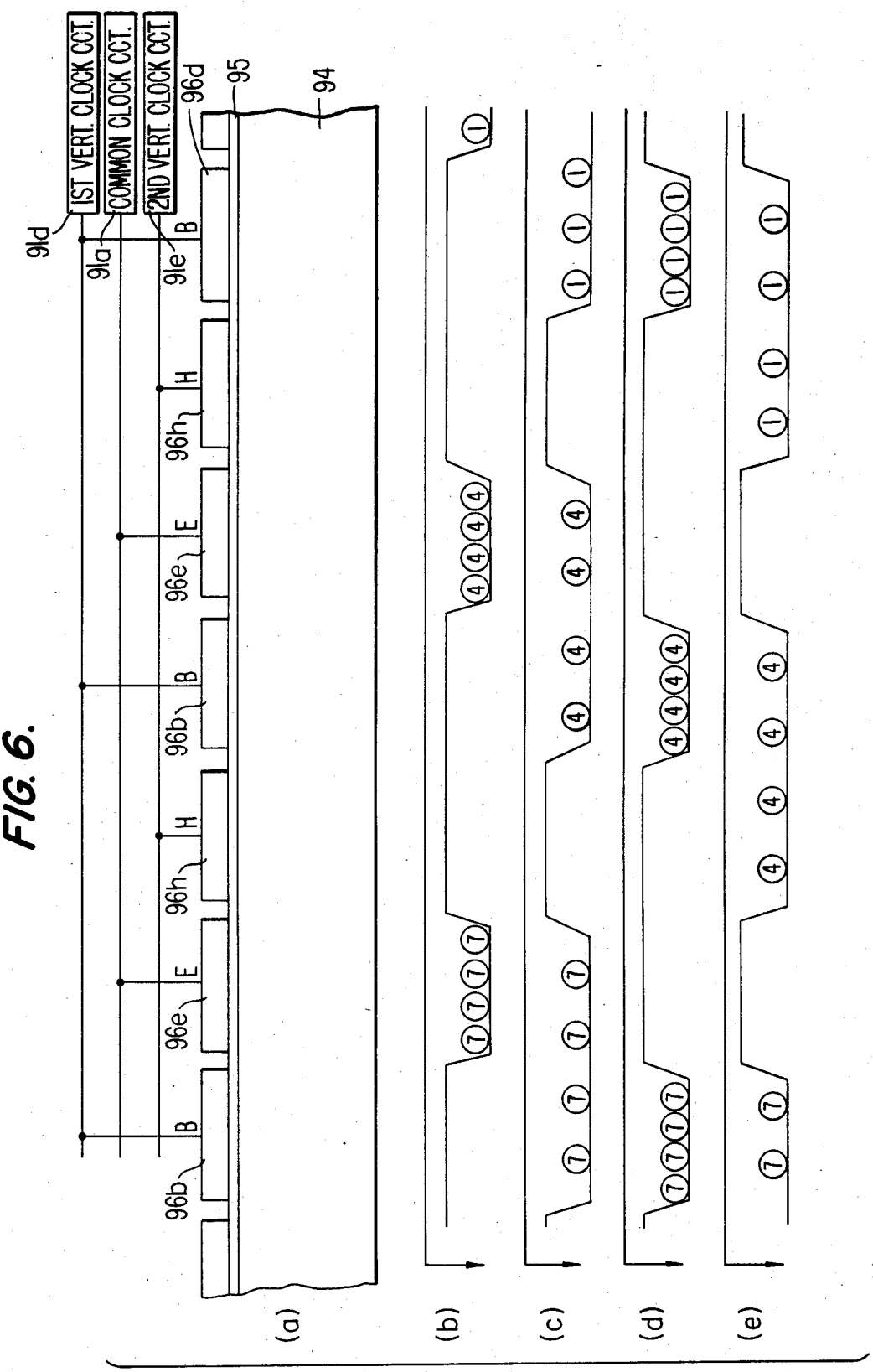
FIG. 6 (a) is a cross-sectional view in a vertical direction of the solid-state image pickup device.

Now, to explain the operating principle of the vertical/horizontal transfer circuit (91) in more detail, with reference to an enlarged view of the cells. FIG. 4 (a) is an enlarged view of picture elements arranged in 7 horizontal columns and 6 vertical rows, consisting of 9 sets of cells, A, B, C, D, E, F, H and I, as shown with coordinate (7, 1), each constructed to be symmetric. Of these, cells A, C, G and I constitute the charge transfer prohibition region (93), being equipped with channel stoppers produced by diffusing impurities of a P type or an N type. Cell E, a photosensitive picture element (71) for detecting light, has a cross-section of a P type or an N type semiconductor substrate (94), with the electrode (96e) provided on said substrate via a thin insulation layer (95) of SiO$_2$ or the like material, said electrode 96e being connected with the common clock circuit (91a). Cells D and F, for transfer in the horizontal direction, have electrodes 96d and 96f on their top faces for transfer in the horizontal direction, as shown in FIG. 5 (a); electrode 96d is connected with the first horizontal clock circuit (91b), while electrode 96f is connected with the second horizontal clock circuit (91c). The states of the electric charge-carrying wells, created by different interface potentials at different stages, are shown in FIGS. 5 (b) to (e). In FIG. 5 (b), electric charge is being accumulated, as shown with circles at cell E in the photosensitive unit, accompanying photoelectric conversion. Where P type substrate is in use, electrons serving as minority carriers are accumulated as a result of photoelectric conversion. Cells B and H are vertical transfer cells which perform transfer in the vertical direction (up and down), having respective electrodes 96b and 96h on the insulation layer (95), as shown in FIG. 6 (a), electric charges created after photoelectric conversion based on the optical image of the object being accumulated in the wells therein, as shown in FIG. 6 (b).

Now, to explain more specifically the transfer operation performed in four ways in both vertical and horizontal directions with reference to FIG. 4 (b), the enlarged view of the state at $t=t_1$ is shown in FIG. 3 (b). The rectangular section defined with a broken line over horizontal coordinates (3)–(5) and vertical coordinates (3)–(5) indicates the image forming range of the target object; each piece of the picture element information has been subjected to the photoelectric conversion, gaining electric charge as indicated with circles numbered 1 to 9. FIG. 5 (a) shows the cross-section at this state, while FIG. 5 (b) shows the state of potentials at the interface. As described above, electrons serve as carriers when a P type substrate is used, and the potential well becomes shallow when a LOW level voltage is applied across the electrode (96). In FIG. 5 (b), electrodes (96f) and (96d) are subject to a LOW voltage, while electrode (96e) is subject to a HIGH voltage, and units of picture element information, indicated with circles numbered 4 and 5, are accumulated in cell E and the adjacent cell E, respectively. FIG. 4 (b) is the top view of this state. As described above, transfer of electric charges can be blocked by applying a LOW level voltage across the associated electrodes. In the interest of brevity, electrodes supplied with a LOW voltage are indicated as squares as in the former embodiments. This means that in such cells in FIGS. 4 (b)–(f), transfer of electric charges are blocked. Units of picture element information numbered 1 to 9 in FIG. 4 (b) are surrounded with cells whose electrodes are subject to a LOW voltage (indicated by squares), which means that transfer of electric charges accumulated therein is blocked. FIG. 5 (a) is a cross-sectional view of the picture element at the coordinate (5, 4), marked with circle number 4, along the horizontal direction of the substrate of the image pickup unit (5). State of potentials at the interface is shown in FIG. 5 (b), where electric charge in each piece of the picture elements is entrapped in its charge well and cannot move in the horizontal direction. FIG. 6 (a) is a cross-sectional view of the same substrate in the vertical direction; FIG. 6 (b) shows the state of potentials, where each piece of the picture elements is entrapped in the charge well and thus cannot move in the vertical direction.

As can be understood from the above explanation, the electric charge for each picture element is held immobile at $t=t_1$ in both horizontal and vertical directions.

The operating principle of horizontal transfer of individual electric charges toward the right side has been explained; this can be accomplished by varying voltages applied across individual electrodes for the purpose of horizontal transfer of electric charges toward the right side in the drawing, which transfer is carried out following up the movement of the picture in the same direction when the picture of the target object moves toward the right due to the change in the external situation by the time $t=t_2$ is reached, as shown in FIG. 3 (c); it is detected by the horizontal direction detection device. The transfer of electric charge along the electrodes proceeds one cell at a time; first it proceeds from $t=t_1$ in FIG. 4 (b) by one cell to the state as shown in FIG. 4 (b) by one cell to the state as shown in FIG. 4 (c). In order to prevent leakage of charges in the vertical direction while they are being transferred in the horizontal direction, a LOW level voltage is generated in the first vertical clock circuit (91d) and the second vertical clock circuit (91e) to place the first vertical transfer electrode (96b) and the second vertical transfer electrode (96e) in FIG. 6 (a) at a LOW potential. This brings about the state of potential as shown in FIG. 6 (b), with wells being created at cell E, between cells D and F, electric charges in cells B and H having been transferred in the horizontal direction. Since this state is maintained throughout the period of transfer in the horizontal direction of charges, continuous horizontal transfer channels are formed electronically on the image pickup elements with cells D, E, F, D, E and F. Thereafter, operational voltages for the first horizontal clock circuit (91b), common clock circuit (91a) and the second horizontal clock circuit (91c) are varied as shown in FIGS. 5 (b)–(e) to vary potentials at the electrodes in cells D, E and F, respectively. At the initial state, where cells D and F are subject to LOW voltage and cells E are subject to HIGH voltage, electric charges based on the units of picture element information numbered 4 and 5 are held immobile in respective wells as shown in FIG. 5 (b). As the voltages applied to cells D are changed to a LOW level and that applied across cells E and F are changed to a HIGH level, the wells expand to the right, causing charges to shift to the right as shown in FIG. 5 (c). By lowering the potential for cells E gradually, electric charges are moved to the right. This changes the state of FIG. 5 (c) to the state shown in FIG. 5 (d), where cells D and E are subject to a LOW voltage, while cells F are subject to a HIGH voltage, wells being formed only at the locations beneath cells F to complete the horizontal transfer cycle for the charge for one cell from cell E to right adjacent cell F. Thereafter, the potential at cells D is switched to a HIGH level, thus making cells D and F subject to a HIGH level, cells E being subject to a LOW level, as shown in FIG. 5 (e), to expand wells toward the right for commencing the horizontal transfer cycle of electric charges from cell F to right adjacent cell D. As previously described, transfer of electric charge is transferred from cell F to right adjacent cell D. FIG. 4 (c) illustrates this state, showing follow-up of the optical image of the target object, a rectangle formed of a dotted line. If cells F and D, originally intended for charge transfer, are made photosensitive, like cells E, by employing light-transmissive type electrodes or the like means, photoelectric conversion will be maintained without interruption even while charges are under transfer, thus preventing the reduction in sensitivity inherent in the transfer of charges. Adapting this important effect to the image pickup device used in video cameras or electronic still cameras, makes possible an effective image pickup device with purely electronic image correction that can work even in a dark environment. As the next horizontal transfer cycle starts, electric charges of individual picture elements are transferred out from cell D to cell E, adjacent on the right, to complete the horizontal transfer cycle for charges corresponding to one picture element. Following up the optical image of the object formed, shown as a dotted-line rectangle in FIG. 4 (d), electric charges in each of the cells, corresponding to each unit of the picture elements of the object, is transferred to the right. If transfer is desired to the left, just reverse the aforementioned steps described for transfer to the right. To describe specifically the steps needed for the transfer cycle from cell F to cell E, adjacent on the left, a potential condition bringing cells D and E to a LOW level and cell F to a HIGH level is created on the signal timing chart as shown in FIG. 5 (d). It is then brought to the state in FIG. 5 (c) and then to the state in FIG. 5 (b) to complete the horizontal transfer cycle of charge to cell E adjacent on the left. In this way, horizontal transfer to the left becomes possible, as with to the right, and the image pickup elements attain correction of picture either way in the horizontal direction with no reduction in sensitivity. As described before, cells B and H are subject to LOW voltage, as shown in the potential diagram in FIG. 32 (b), to prevent leakage of electric charges to cells B and H in the vertical direction during the horizontal transfer cycle. By so doing, leakage of electric charges in the vertical direction is prevented during correction in the horizontal direction, thus retaining picture brightness (clearness) even after correction.

Now, to explain how electric charges are transferred vertically for picture correction in that direction. More specifically, description is given of the transfer cycle of electric charges vertically upward, following up the upward movement of the optical image of the object due to a change in the external conditions from the state of $t=t_2$ shown in FIG. 3 (c) to that shown in FIG. 3 (d). The operating principle here is fundamentally the same as that in the horizontal transfer cycle of electric charges except for the LOW potential of cells D and F, maintained during the vertical transfer cycle as shown in the potential diagram in the horizontal direction in FIG. 5 (b), which potential prevents leakage of charges under vertical transfer into the horizontal direction. This means that vertical transfer channels are formed on the image pickup elements electronically to allow transfer of electric charges in both up and down directions. FIG. 6 (b) shows potentials at picture elements 4 and 7 in the enlarged view of the light receiving unit shown in FIG. 4 (d). As shown in FIG. 6 (a), potentials are imparted by the first vertical clock circuit (91d), the common clock circuit (91a) and the second vertical clock circuit (91e) via the respective electrodes. In this case, cells B and H are subject to a LOW potential and cells E to a HIGH potential, electric charges at picture elements Nos. 1, 4 and 7 being held immobile within small wells in cells E. As described above, cells D and F are maintained at a LOW potential to prevent leakage of electric charges in the horizontal direction. By bringing cells B and E to a HIGH potential and cells H to a LOW potential, respectively, as shown in the potential diagram in FIG. 5 (c), wells present at cells E are expanded upward to cover adjacent cells B, accompanying the movement vertically upward of electric charges in picture elements Nos. 1, 4 and 7. By gradually imparting a LOW voltage to cells E as in the horizontal transfer cycle, electric charges in picture elements Nos. 1, 4 and 7 continue moving upward until they are nearly completely absorbed in cells B located above the initial locations at cells E, thus completing the vertical transfer cycle. An enlarged view of the light receiving unit in this state is shown in FIG. 4 (e). Subsequently, the vertical transfer cycle commences from cells B toward above-adjacent cells H to as shown in FIG. 6 (e) until the completion of the unit picture element, as shown in the enlarged view of the light receiving unit shown in FIG. 4 (f). The downward vertical transfer cycle is made possible by changing the timing chart for the transfer clock signals and then applying voltages to bring about the state shown in the potential diagram shown in FIG. 6 (d) and thereafter, by progressing to the state shown in FIG. 5 (c) and then to the state of potentials shown in FIG. 5 (b). A detailed explanation has already been given on the subsequent process in which electric charges, including picture element information in the light receiving unit (90), are transferred to the accumulation unit (92) and then delivered as picture element signals.

As explained above, use of the image pickup elements and control circuits according to this invention, makes possible solid-state image pickup device excellent correction effect, with no reduction in sensitivity, and which can follow up optically formed images accurately at far higher speeds than are conceivable with the optical image movements encountered in normal operation. As described in each of the embodiments of this invention, it also offers such advantageous effects as remarkably high frequency response and maintenance of high sensitivity by purely electronic means. Though an example of bidirectional transfer of picture elements in both the vertical and horizontal directions (four ways in total) is disclosed with reference to the embodiments, such transfer either vertically or horizontally (up/down or right/left) can also be accomplished mono-dimensionally. Further, other various changes and modifications are obviously possible within the scope of the present invention.

What is claimed is:

1. A solid-state image pickup device comprising:
a photosensitive picture element unit comprising photosensitive picture elements arranged in a matrix in horizontal and vertical directions to convert light containing picture element information into electrical charges corresponding to individual picture elements through photoelectric conversion;
a horizontal charge transfer means which transfers said electrical charges corresponding to individual picture elements in the horizontal direction; and
a vertical charge transfer means which transfers said electrical charges corresponding to individual picture elements in the vertical direction;
wherein at least one of said vertical charge transfer means and said horizontal charge transfer means is controlled in response to external control signals so that a part of said electrical charges corresponding to individual picture elemenfs in a specified part of said photosensitive picture elements are outputted as picture element output signals; and
wherein said horizontal charge transfer means has a plurality of output takeout outlets which are selectively actuated according to said external control signals.

2. A solid-state image pickup device comprising:
a photosensitive picture element unit comprising photosensitive picture elements arranged in a matrix in horizontal and vertical directions to convert light containing picture element information into electrical charges corresponding to individual picture elements through photoelectric conversion;
a horizontal charge transfer means which transfers said electrical charges corresponding to individual picture elements in the horizontal direction; and
a vertical charge transfer means which transfers said electrical charges corresponding to individual picture elements in the vertical direction;
wherein at least one of said vertical charge transfer means and said horizontal charge transfer means is controlled in response to external control signals so that part of said electrical charges corresponding to individual picture elements are outputted as picture element output signals; and wherein said horizontal charge transfer means transfers said electrical charges bidirectionally in the horizontal direction in response to said external control signals, and/or said vertical charge transfer means transfers said electrical charges bidirectionally in the vertical direction in response to said external control signals.

3. A solid-state image pickup device according to claim 2, wherein the horizontal transfer means and the vertical transfer of electrical charges by said vertical charge transfer means occur at different times.

4. A solid-state image pickup device according to claim 2, wherein said horizontal charge transfer means produces at least three different horizontal clock signals from said external control signals for transferring said electrical charges bidirectionally in the horizontal direction, and said vertical charge transfer means produces at least three different vertical clock signals from said external control signals for transferring said electrical charges bidirectionally in the vertical direction.

5. A solid-state image pickup device according to claim 2, wherein said horizontal charge transfer means produces at least two different horizontal clock signals from said external control signals for transferring said electrical charges bidirectionally in the horizontal direction, and said vertical charge transfer means produces at least two different vertical clock signals from said external control signals for transferring said electrical charges bidirectionally in the vertical direction.

6. A solid-state image pickup device according to claim 2, wherein said photosensitive picture element unit has a charge removal portion at a peripheral part of the matrix arranged picture element area for removing picture elements transferred thereto.

7. A solid-state image pickup device comprising:
a photosensitive picture element unit comprising photosensitive picture elements arranged in a matrix in horizontal and vertical directions to convert light containing picture element information into electrical charges corresponding to individual picture elements through photoelectric conversion;
a horizontal charge transfer means which transfers said electrical charges corresponding to individual picture elements bidirectionally in the horizontal direction in response to external control signals;
a vertical charge transfer means which transfers said electrical charges corresponding to individual picture elements bidirectionally in the vertical direction in response to said external control signals;
a storage means for storing a part of said electrical charges corresponding to individual picture elements in a specified part of said photosensitive picture elements, said part of said electrical charges being transferred in the vertical direction from said photosensitive picture element unit to said storage unit; and
a means for outputting said electrical charges stored in said storage means as picture element output signals.

8. A solid-state image pickup device according to claim 7, wherein said output means outputs said picture element output signals independently of the horizontal transfer of electrical charges by said horizontal charge transfer means or the vertical transfer of electrical charges by said vertical charge transfer means.

9. A solid-state image pickup device according to claim 7, further comprising a means for calculating a deviation of a desired part of said electrical charges from said specified part of said photosensitive picture elements; wherein at least one of said horizontal charge transfer means and said vertical charge transfer means is responsive to said calculated deviation so as to transfer said desired part of said electrical charges to said specified part of said photosensitive picture elements, said desired part of said electrical charges which are transferred to said specified part being thereafter transferred to said storage means.

10. A solid-state image pickup device according to claim 7, wherein said horizontal charge transfer means produces at least three different horizontal clock signals from said external control signals for transferring said electrical charges bidirectionally in the horizontal direction, and said vertical charge transfer means produces at least three different vertical clock signals from said external control signals for transferring said electrical charges bidirectionally in the vertical direction.

11. A solid-state image pickup device according to claim 3, wherein said horizontal charge transfer means produces at least two different horizontal clock signals from said external control signals for transferring said electrical charges bidirectionally in the horizontal direction, and said vertical charge transfer means produces at least two different vertical clock signals from said external control signals for transferring said electrical charges bidirectionally in the vertical direction.

12. A solid-state image pickup device according to claim 7, wherein said photosensitive picture element unit has a charge removal portion at a peripheral part of the matrix arranged picture element area for removing picture elements transferred thereto.

* * * * *